US012594562B2

(12) United States Patent
Ball

(10) Patent No.: US 12,594,562 B2
(45) **Date of Patent: *Apr. 7, 2026**

(54) VARIABLE FLOW RATE HAND SHOWERS AND SHOWERHEADS

(71) Applicant: Kohler Co., Kohler, WI (US)

(72) Inventor: Matthew Ball, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 288 days.

This patent is subject to a terminal disclaimer.

(21) Appl. No.: 18/362,806

(22) Filed: Jul. 31, 2023

(65) Prior Publication Data

US 2023/0405615 A1 Dec. 21, 2023

Related U.S. Application Data

(63) Continuation of application No. 17/873,866, filed on Jul. 26, 2022, now Pat. No. 11,712,705, which is a (Continued)

(51) Int. Cl.
*B05B 1/30* (2006.01)
*A47K 3/28* (2006.01)
(Continued)

(52) U.S. Cl.
CPC .............. *B05B 1/3026* (2013.01); *A47K 3/28* (2013.01); *B05B 1/18* (2013.01); *B05B 15/62* (2018.02); *B05B 15/654* (2018.02)

(58) Field of Classification Search
CPC ..... B05B 1/3026; B05B 15/62; B05B 15/654; B05B 1/18; E03C 1/06; A47K 3/28
(Continued)

(56) References Cited

U.S. PATENT DOCUMENTS

| | | | |
|---|---|---|---|
| 3,893,628 | A | 7/1975 | McCollum |
| 5,111,994 | A | 5/1992 | Gonzalez |

(Continued)

FOREIGN PATENT DOCUMENTS

| | | | |
|---|---|---|---|
| CN | 103372506 | A | 10/2013 |
| CN | 203239977 | U | 10/2013 |

(Continued)

OTHER PUBLICATIONS

First Chinese Office Action on CN Appl. Ser. No. 202010511128.X dated Aug. 9, 2021 (16 pages).

(Continued)

*Primary Examiner* — Steven J Ganey
(74) *Attorney, Agent, or Firm* — Foley & Lardner LLP

(57) ABSTRACT

A shower device includes an elongated hollow waterway, a spray head configured to emit water, and a valve. The elongated hollow waterway extends in a longitudinal direction and has a first end configured to receive water, a second end, and an internal fluid passage extending from the first end to the second end. The second end has a port extending in a radial direction from the internal fluid passage through the waterway. The valve is configured to control a water flow rate from the internal fluid passage of the waterway to the spray head. The valve includes a valve body that surrounds the port and a control member operatively coupled to the valve body and surrounding at least a portion of the valve body. Rotation of the control member and valve body relative to the waterway provides a variable adjustment of the water flow rate to the spray head.

20 Claims, 35 Drawing Sheets

Related U.S. Application Data continuation of application No. 16/884,930, filed on May 27, 2020, now Pat. No. 11,406,994.

(60) Provisional application No. 62/858,725, filed on Jun. 7, 2019.

(51) Int. Cl.

| | |
|---|---|
| ***B05B 1/18*** | (2006.01) |
| ***B05B 15/62*** | (2018.01) |
| ***B05B 15/654*** | (2018.01) |

(58) Field of Classification Search
USPC ...... 239/273, 282, 525, 530, 581.1, DIG. 11
See application file for complete search history.

(56) References Cited

U.S. PATENT DOCUMENTS

| | | | | |
|---|---|---|---|---|
| 5,154,355 | A | 10/1992 | Gonzalez | |
| 5,845,851 | A | 12/1998 | Shfaram | |
| 6,557,785 | B1 | 5/2003 | Knapp | |
| 6,594,832 | B2 | 7/2003 | Yang | |
| 6,964,380 | B1 | 11/2005 | Chen | |
| 6,981,661 | B1 | 1/2006 | Chen | |
| 7,360,723 | B2 | 4/2008 | Lev | |
| 7,665,676 | B2 | 2/2010 | Lev | |
| 7,789,326 | B2 | 9/2010 | Luettgen et al. | |
| 7,837,133 | B2 | 11/2010 | Zhou | |
| 7,900,295 | B2 | 3/2011 | Lev | |
| 8,028,935 | B2 | 10/2011 | Leber | |
| 8,066,204 | B2 | 11/2011 | Petrovic et al. | |
| 8,109,450 | B2 | 2/2012 | Luettgen et al. | |
| 8,146,838 | B2 | 4/2012 | Luettgen et al. | |
| 8,205,846 | B2 | 6/2012 | Glunk | |
| 8,297,538 | B2 | 10/2012 | Zhou | |
| 8,479,772 | B2 | 7/2013 | Petrovic et al. | |
| 8,584,972 | B2 | 11/2013 | Luettgen et al. | |
| 8,640,973 | B2 * | 2/2014 | Gansebom | B08B 3/026 239/394 |
| 8,967,497 | B2 | 3/2015 | Luettgen et al. | |
| 9,149,817 | B2 | 10/2015 | Lev | |
| D760,348 | S | 6/2016 | McCutcheon et al. | |
| D761,935 | S | 7/2016 | McCutcheon et al. | |
| 9,438,977 | B2 | 9/2016 | Wang et al. | |
| 9,587,383 | B2 | 3/2017 | Wu et al. | |
| 9,623,424 | B2 | 4/2017 | Luettgen et al. | |
| 9,623,425 | B2 | 4/2017 | Luettgen et al. | |
| 9,636,694 | B2 | 5/2017 | Luettgen et al. | |
| 9,828,752 | B2 | 11/2017 | Genord et al. | |
| 9,849,471 | B2 | 12/2017 | Lin et al. | |
| 9,919,331 | B2 | 3/2018 | Scheffer et al. | |
| 9,943,863 | B2 | 4/2018 | Huffington et al. | |
| 10,017,923 | B2 | 7/2018 | Genord et al. | |
| 10,046,341 | B2 | 8/2018 | Wu et al. | |
| 10,441,960 | B2 | 10/2019 | Rogers | |
| 10,449,558 | B2 | 10/2019 | Thurgood | |
| 11,406,994 | B2 * | 8/2022 | Ball | B05B 1/18 |
| 11,712,705 | B2 * | 8/2023 | Ball | A47K 3/28 239/283 |
| 2007/0022528 | A1 | 2/2007 | Gilbert | |
| 2008/0272203 | A1 | 11/2008 | Leber | |
| 2009/0007330 | A1 | 1/2009 | Genord et al. | |
| 2010/0043135 | A1 | 2/2010 | Patterson et al. | |
| 2013/0299608 | A1 | 11/2013 | Spangler et al. | |
| 2015/0048184 | A1 | 2/2015 | McCutcheon | |
| 2015/0165452 | A1 * | 6/2015 | Luettgen | B05B 1/185 239/447 |
| 2017/0173603 | A1 | 6/2017 | Lin et al. | |
| 2017/0216854 | A1 | 8/2017 | Thurgood | |
| 2018/0126407 | A1 | 5/2018 | Winter et al. | |
| 2018/0193851 | A1 | 7/2018 | L'Henaff et al. | |
| 2018/0200736 | A1 | 7/2018 | Huffington et al. | |
| 2018/0291601 | A1 | 10/2018 | Genord et al. | |

FOREIGN PATENT DOCUMENTS

| | | |
|---|---|---|
| CN | 107260038 A | 10/2017 |
| EM | 004557775-0003 | 1/2018 |

OTHER PUBLICATIONS

Kohler 2016 Faucets Price Book; pp. 129-143 (15 pages).
Non-Final Office Action on U.S. Appl. No. 17/873,866 Dtd Feb. 16, 2023.
Non-Final Office Action on U.S. Appl. No. 16/884,930 dated Nov. 10, 2021 (4 pages).
Notice of Allowance on U.S. Appl. No. 17/873,866 Dtd Mar. 15, 2023.
Second Chinese Office Action on CN Appl. Ser. No. 202010511128.X dated Feb. 22, 2022 (33 pages).

* cited by examiner

VARIABLE FLOW RATE HAND SHOWERS AND SHOWERHEADS

CROSS-REFERENCE TO RELATED APPLICATIONS

The present application is a continuation of U.S. patent application Ser. No. 17/873,866, filed Jul. 26, 2022, which is a continuation of U.S. patent application Ser. No. 16/884,930, filed May 27, 2020 (now U.S. Pat. No. 11,406,994), which claims priority to and the benefit of U.S. Provisional Patent Application No. 62/858,725, filed on Jun. 7, 2019, the entire disclosures of which are incorporated by reference herein.

BACKGROUND

The present application relates generally to the field of shower devices, such as hand showers and showerheads for use in bathing and showering. More specifically, this application relates to hand showers and showerheads having improved docking systems, valves, and controls, among other things.

Current low flow rate showerheads on the market lack the ability to perform sufficiently at rinsing a bather and/or keeping them warm. Several aftermarket adapter/devices are aimed at reducing the flow of water, but these have mounting issues, since the hand shower either does not fit into or becomes unstable when docked in a typical holder/cradle (conical in shape) due to the additional offset weight due to their size. Aftermarket solutions for showerheads are also cumbersome in nature and unsightly.

SUMMARY

One exemplary embodiment of the present disclosure relates to a shower device. The shower device includes an elongated hollow waterway, a spray head configured to emit water, and a valve. The elongated hollow waterway extends in a longitudinal direction and has a first end configured to receive water, a second end, and an internal fluid passage extending from the first end to the second end. The second end has a port extending radially relative to the longitudinal direction from the internal fluid passage through the waterway. The valve is configured to control a water flow rate from the internal fluid passage of the waterway to the spray head. The valve includes a valve body that surrounds the port and a control member operatively coupled to the valve body and surrounding at least a portion of the valve body. The valve body and the waterway together define a fluid path in fluid communication with the spray head. Rotation of the control member about the longitudinal direction relative to the waterway rotates the valve body relative to the waterway to provide a variable adjustment of the water flow rate to the spray head by changing a relative alignment between the fluid path and the port in the waterway.

Another exemplary embodiment of the present disclosure relates to a shower device. The shower device includes an elongated hollow waterway, a spray head configured to emit water, and a valve. The elongated hollow waterway extends in a longitudinal direction and has a first end configured to receive water, a second end, and an internal fluid passage extending from the first end to one or more ports in the second end. Each port extends radially relative to the longitudinal direction from the internal fluid passage through the second end. The valve operatively couples the spray head to the waterway and is configured to control a water flow from the internal fluid passage of the waterway to the spray head. The valve includes a valve body that surrounds each port, a control member that surrounds at least a portion of the valve body, and one or more seals. The valve body and the second end together define a fluid path in fluid communication with the spray head. The control member is operatively coupled to a portion of the valve body so that rotation of the control member rotates the valve body. Each of the one or more seals associates with one port and is carried by one or more projections extending inwardly from the valve body toward the waterway. The rotation of the control member relative to the waterway rotates each seal between a closed position, in which each seal covers the associated port to fluidly disconnect the fluid path from the internal fluid passage, and an open position, in which each seal uncovers the associated port to fluidly connect the internal fluid passage to the spray head through the fluid path and associated port.

Another exemplary embodiment of the present disclosure relates to a shower device. The shower device includes an elongated hollow waterway, a spray head configured to emit water, and a valve. The elongated hollow waterway extends in a longitudinal direction and has an inlet end configured to receive water, an outlet end, and an internal fluid passage extending from the inlet end to the outlet end. The outlet end has a plurality of ports extending through the waterway. The valve is configured to control a water flow rate from the internal fluid passage of the waterway to the spray head. The valve includes a valve body that surrounds the plurality of ports and a control member that surrounds at least a portion of the valve body. The control member is operatively coupled to the portion of the valve body such that rotation of the control member rotates the valve body. Rotation of the valve body relative to the waterway provides a variable adjustment of the water flow rate to the spray head by changing a relative alignment between the fluid path and the plurality of ports in the waterway.

DETAILED DESCRIPTION

Referring generally to the FIGURES, disclosed in this application are hand showers and showerheads that, among other things, allow users to change a flow rate of water dispensed or emitted on-demand through an integral, rotating collar, built into the handle of the hand shower or neck of the showerhead. This allows users to determine when and how much water they are willing to conserve (e.g., by turning down the device to a lower flow rate or pause while lathering, shaving, etc.). The design of the hand shower and showerhead also allow a user to change their effective mounting heights without requiring aftermarket components, while providing an improved aesthetic.

Further, if a hand shower/showerhead is to use (flow) less water, then directing the water closer to the bather is more effective. Accordingly, the showerheads can feature a ball joint offset from a center of the showerhead body, allowing adjustment of the height of the showerhead by rotating the showerhead higher or lower. Similarly, the hand showers can feature adjustability (e.g., height adjustment) by mounting the shaft of the handle (e.g., cylindrical handle) into a holder (e.g., cradle) via one or more magnets that allows the handle to slide in the cradle. Thus, a user can slide the hand shower up or down within the holder, rotate the hand shower along an axis, and/or pivot the holder to provide a relatively larger range of motion to position the spray(s) from the hand shower. The hand showers/showerheads can include an integral valve that allows a user to quickly and easily adjust a flow rate of water through the device, such as to turn the amount of water delivered from full rated flow all the way down to a trickle (ADA mode; <=0.5 gallons per minute (gpm)), with one hand in an ergonomic manner. A T-shaped holder can be provided to improve aesthetics as it has no visible seams, covers/caps, fasteners or driving features as it is constructed with blind assembly techniques.

In some embodiments, the showerhead and/or hand shower also includes an air inductor element or venturi to introduce and/or mix air with the water before ejecting the water-air mixture into a shower enclosure. Among other benefits, the introduction of air into the flow stream can further reduce overall water consumption by the showerhead and/or hand shower without significantly impacting cleaning performance.

Figure 2:
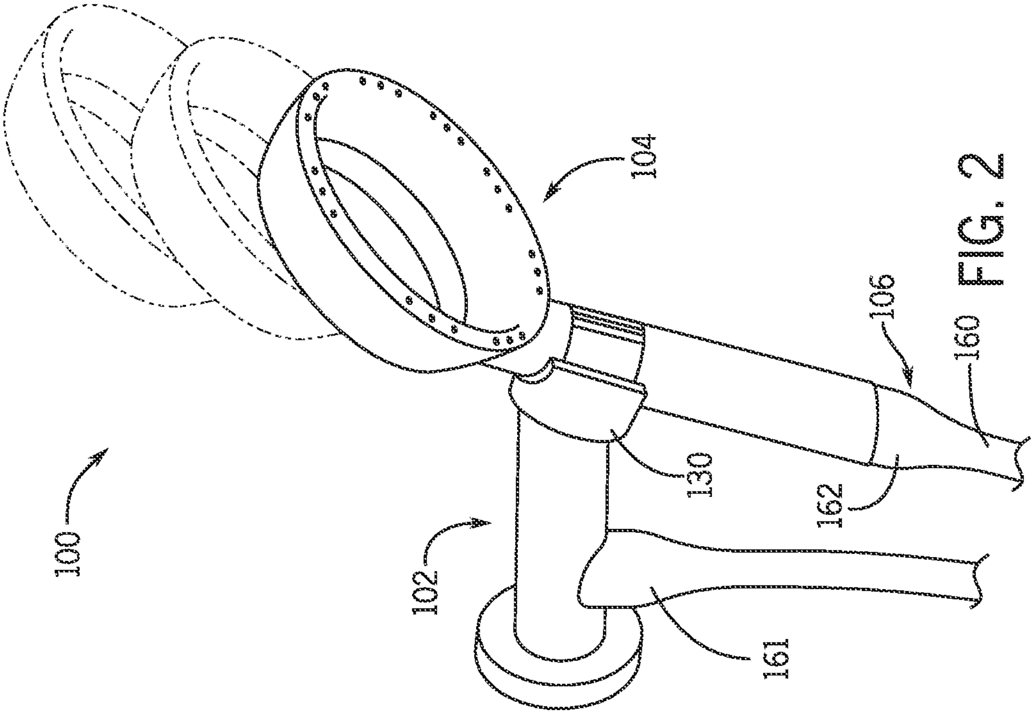
FIG. 2 is another perspective view of the shower assembly shown in FIG. 1 showing a height adjustment of the hand shower relative to the holder.
Figure 4:
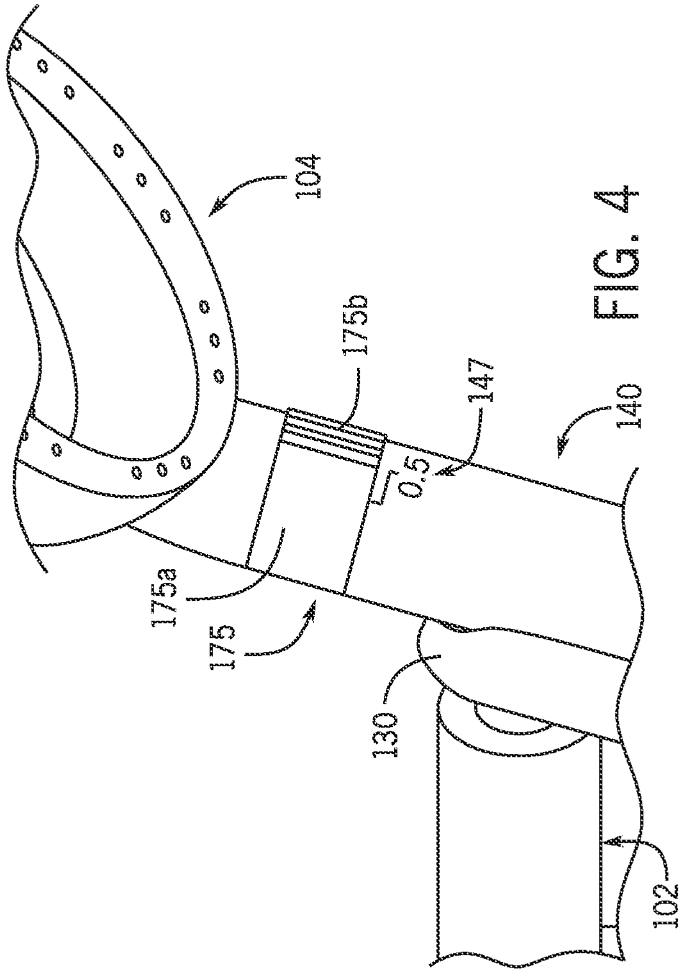
FIG. 4 is a perspective view of a portion of the hand shower shown in FIG. 1.
Figure 3:
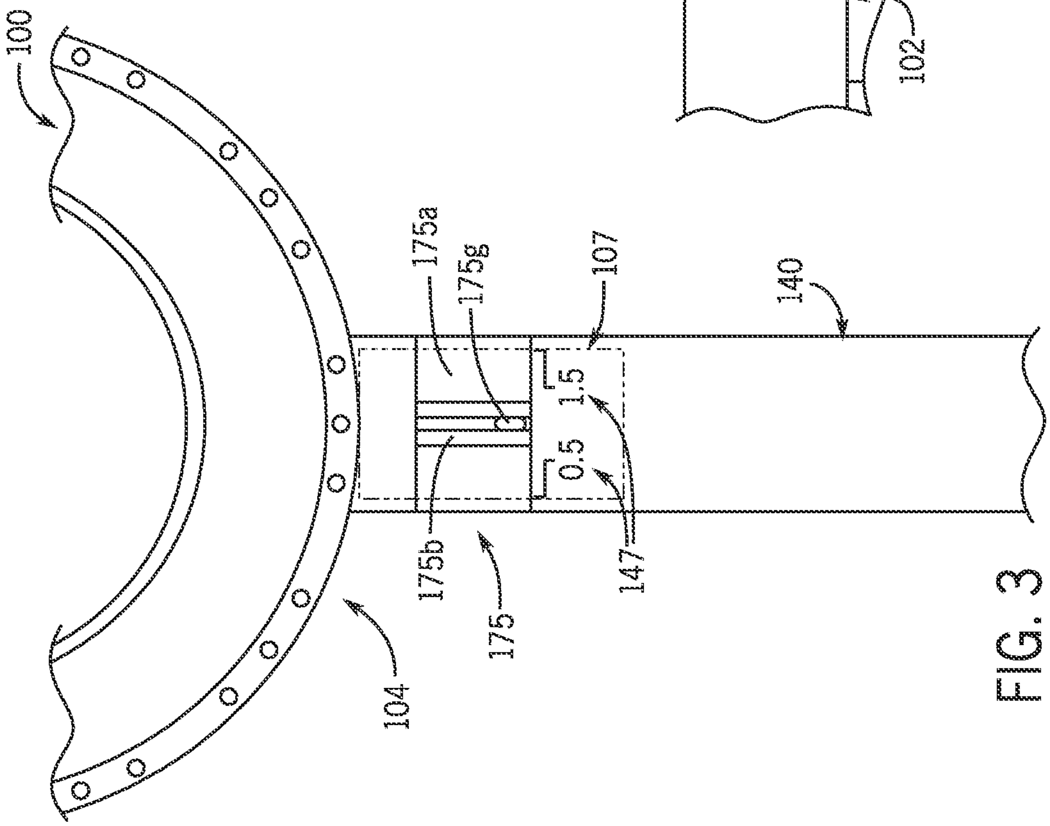
FIG. 3 is a front view of a portion of the hand shower shown in FIG. 1.

FIGS. 1-4 illustrate an exemplary embodiment of a shower assembly 100 that includes a fixed part 102, a hand shower 104, and a hose 106 fluidly connecting the hand shower 104 to the fixed part 102. The hand shower 104 detachably and slideably couples to the fixed part 102, such that a height of the hand shower 104 can be adjusted relative to the fixed part 102 in a docked or coupled position. As shown in FIG. 2, the height of the hand shower 104 is adjustable by about 3.5 inches, although the adjustment height is tailorable, such as based on the length of the handle of the hand shower 104. According to at least one embodiment, a magnetic connection provides the height adjustment (as discussed herein in more detail). In an undocked or detached position, the hand shower 104 can freely move to redirect the spray. As shown in FIGS. 3 and 4, the hand shower 104 also includes an actuator or a control member 175 that controls a variable flow rate of water (as discussed herein in more detail).

Figure 1:
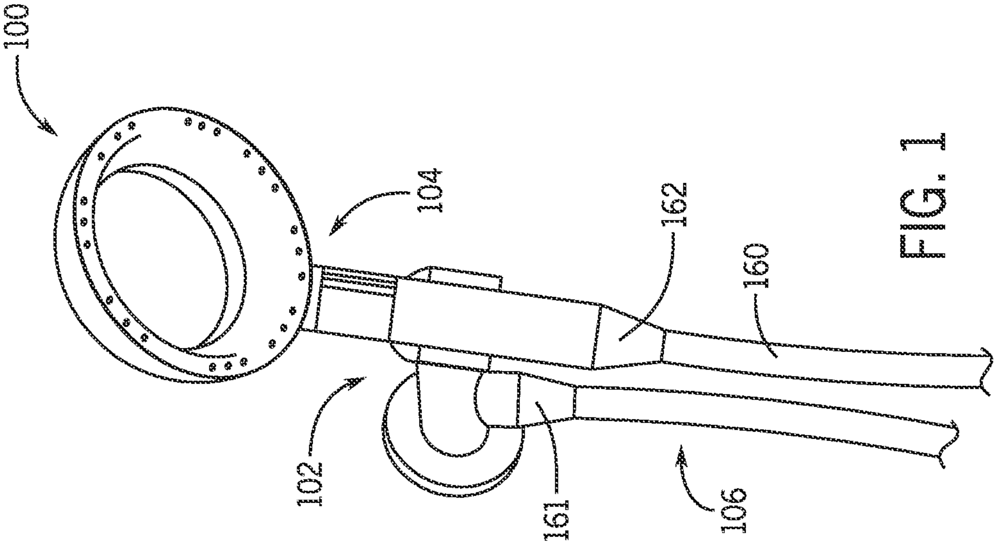
FIG. 1 is a perspective view of an embodiment of a shower assembly having a hand shower slideably coupled to a holder.

The illustrated hose 106 is flexible so that the hand shower 104 is freely moveable relative to the fixed part 102 (within the length of the hose 106) when detachably coupled from the fixed part 102, such as to control (e.g., move, change, etc.) the direction of spray from the hand shower 104. As shown in FIGS. 1 and 2, a body 160 (e.g., hollow body) of the hose 106 conveys fluid and extends between a first end 161 and a second end 162. The first end 161 couples to the fixed part 102 through mechanical fastening (e.g., threaded connection) or any suitable connection; and the second end 162 couples to the hand shower 104 through mechanical fastening (e.g., threaded connection) or any suitable connection. Thus, the hose 106 supplies water to the hand shower 104 from the fixed part 102.

Figure 25:
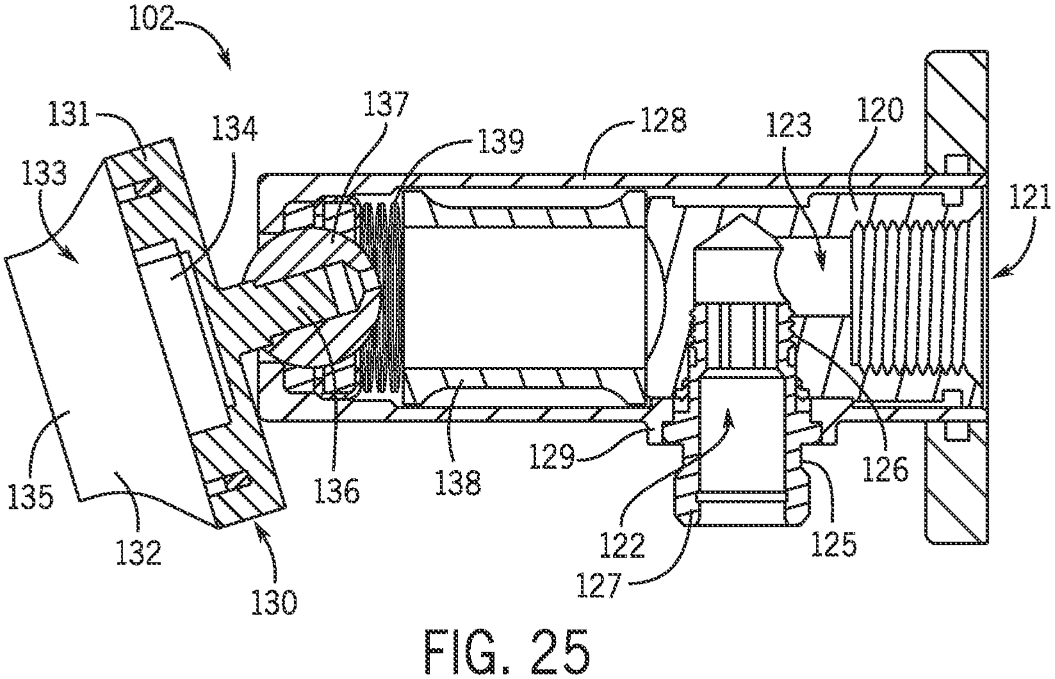
FIG. 25 is a cross-sectional view of the holder shown in FIG. 24.

As shown best in FIG. 25, the fixed part 102 includes a generally cylindrical (fluid) body 120 having a water inlet 121 in one end and a water outlet 122, which extends transversely to a longitudinal axis of the body 120 and is fluidly connected to the water inlet 121 through an internal fluid bore 123 (e.g., channel, etc.). As shown, the body 120 has internal threads in the end having the water inlet 121, such as to screw to a threaded pipe. Securely disposed in the water outlet 122 is a connector 125 having a generally tubular shape with external threads, which are proximate a first end 126 for coupling to internal threads proximate the water outlet 122. The connector 125 also has a second end 127, which securely couples to the first end 161 of the hose 106, and an internal fluid passage extending between the first and second ends 126, 127.

Figure 24:
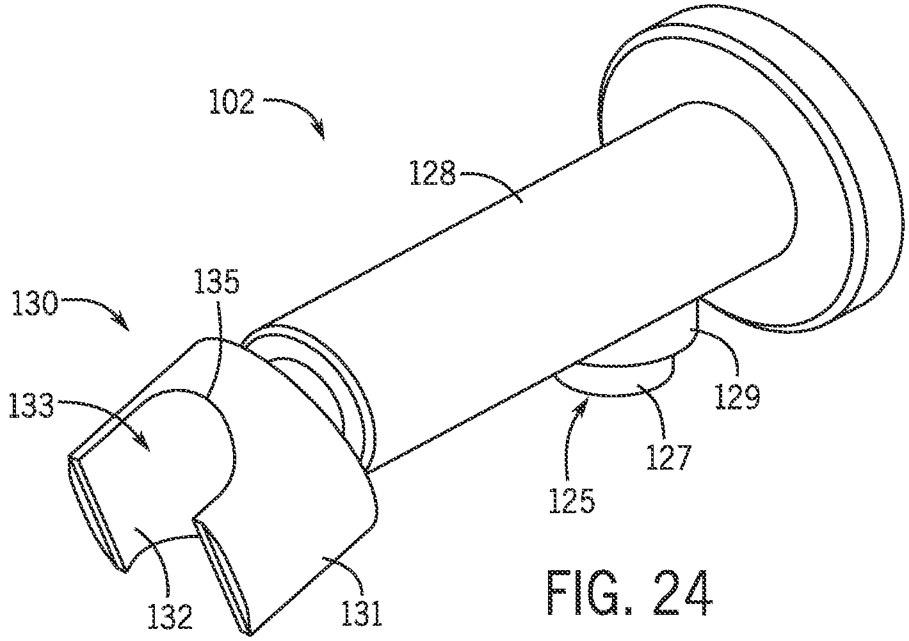
FIG. 24 is a perspective view of an embodiment of a holder for a hand shower, such as the hand shower holder shown in FIGS. 1-4.

As shown in FIGS. 24 and 25, the fixed part 102 includes an outer sleeve 128 that surrounds (e.g., encircles) the body 120. The outer sleeve 128 can provide a tailored aesthetic (e.g. different material/finish as the body 120) as well as functionally secure other components of the fixed part 102 in place or together. For example, the outer sleeve 128 can include an annular projection 129, which extends from a bottom side to receive a portion of the connector 125. Also for example, the outer sleeve 128 can include an open proximal end for receiving the body 120 and a distal end for receiving a ball joint (e.g., spherical element). The outer sleeve 128 can include an end wall extending radial inward from the distal end and defining an opening, where the end wall retains the ball joint and the opening allows access to the ball joint from outside the outer sleeve 128.

As shown best in FIGS. 2 and 4, the fixed part 102 includes a holder 130 (e.g., holding mechanism, cradle, dock, etc.) that slideably receives the hand shower 104 to allow height adjustment of the hand shower 104 relative to the holder 130, such as through a magnetic connection. As shown in FIGS. 24 and 25, the holder 130 includes a base 131 having a receiving surface 132, which defines a generally semi-cylindrical bore 133 having a shape that receives a handle of a hand shower (e.g., the hand shower 104). One or more docking elements 134 are disposed in the base 131, where each docking element 134 includes a rare earth magnet that magnetically attracts to a ferro-magnetic (or ferromagnetic) material (e.g., a steel) in a handle of the hand shower to provide magnetic docking with height adjustability. One or more magnets could be located in both the handle and the docking element 134, although this solution could be more expensive. Locating powerful magnets in the handle of hand shower 104 is not ideal as a strong magnetic field could potentially interfere with biomedical implants, such as pacemakers. The holder 130 can, optionally, include a coating or layer of material to protect against damaging (e.g., scratching) the hand shower during sliding and/or detaching the hand shower. For example, a relatively thin layer 135 can be disposed over the inside of the receiving surface 132 of the base 131 to protect the hand shower finish from scratching when the hand shower is docked/undocked, slid up/down or rotated within the holder 130. By way of non-limiting example, the layer 135 can include at least one of a polymer, a silicone, a thermoplastic elastomer (TPE), a thermoplastic vulcanisate (TPV), and/or any other similarly suitable material.

The holder 130 can be coupled (e.g., fixedly, movably) to the outer sleeve 128. As shown best in FIG. 25, the holder 130 includes a threaded post 136 extending from a back side of the base 131, which is opposite the receiving surface 132. The threaded post 136 screws into a threaded opening in a ball joint 137 (e.g., spherical or semi-spherical element), which is retained within the distal end of the outer sleeve 128, such as by the end wall. The ball joint 137 is freely rotatable relative to the outer sleeve 128 to allow adjustment of the position of the holder 130 relative to the other components (e.g., outer sleeve 128, body 120, etc.) of the fixed part 102.

The fixed part 102, optionally, can include other components/elements. As shown in FIG. 25, an optional inner sleeve 138 is located within the outer sleeve 128 and extends between the body 120 and the ball joint 137 or another element disposed between the ball joint 137 and the inner sleeve 138. For example, an optional spring element 139 (e.g., helical spring, extension spring, etc.) can be disposed between the ball joint 137 and the inner sleeve 138 to impart a biasing load on the ball joint 137 that retains the ball joint 137 (and holder 130) in place (i.e., in any location relative to the outer sleeve 128). The spring element 139 can impart the biasing force directly into the ball joint 137 or indirectly through two or more separate compressible elements disposed around the ball joint 137 within the outer sleeve 128.

Figure 43:
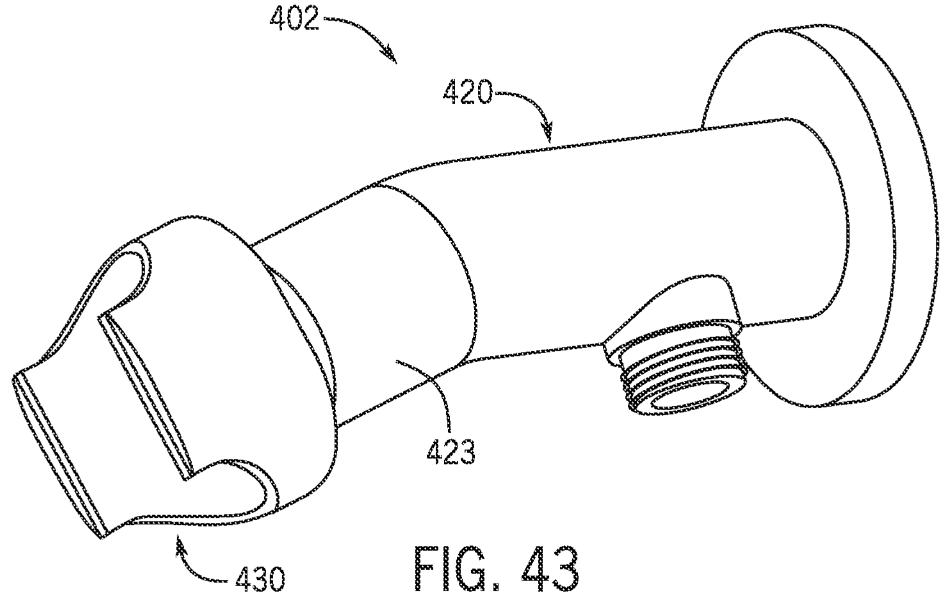
FIG. 43 is a perspective view of an embodiment of a holder for a hand shower.
Figure 44:
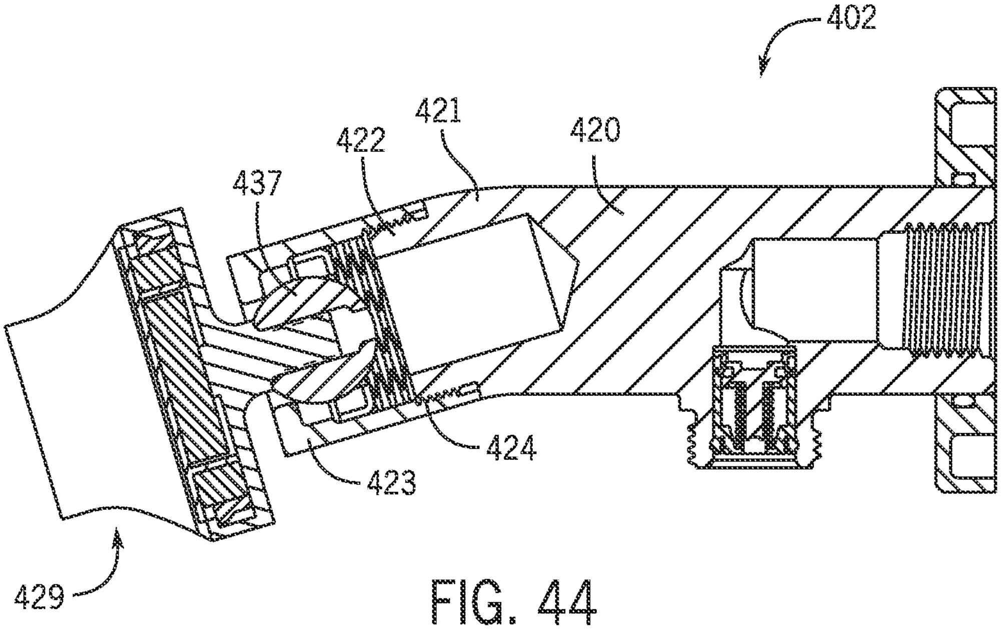
FIG. 44 is a cross-sectional view of the holder shown in FIG. 43.
Figure 45:
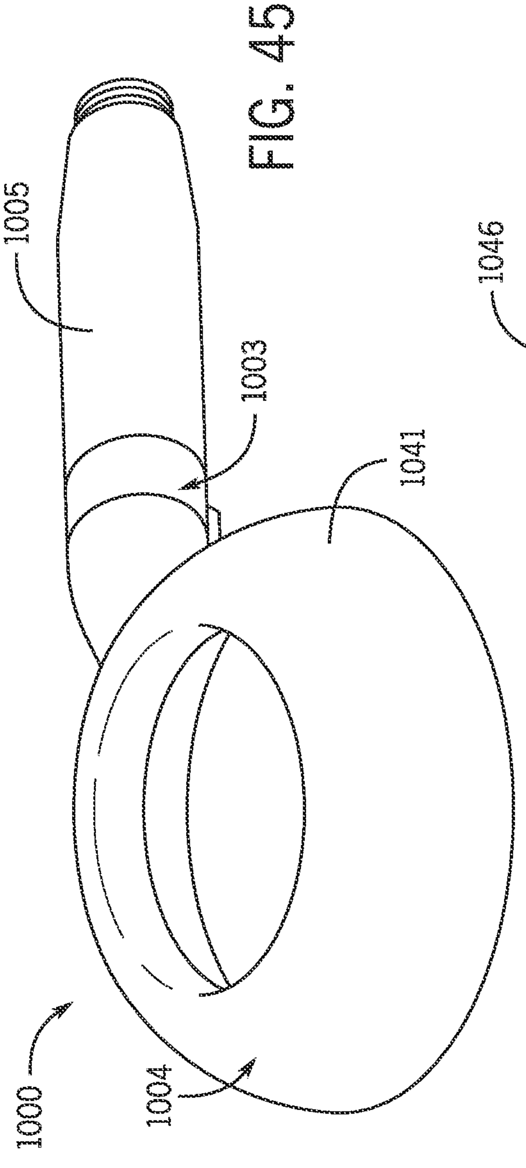
FIG. 45 is a top perspective view of another embodiment of a hand shower.
Figure 46:
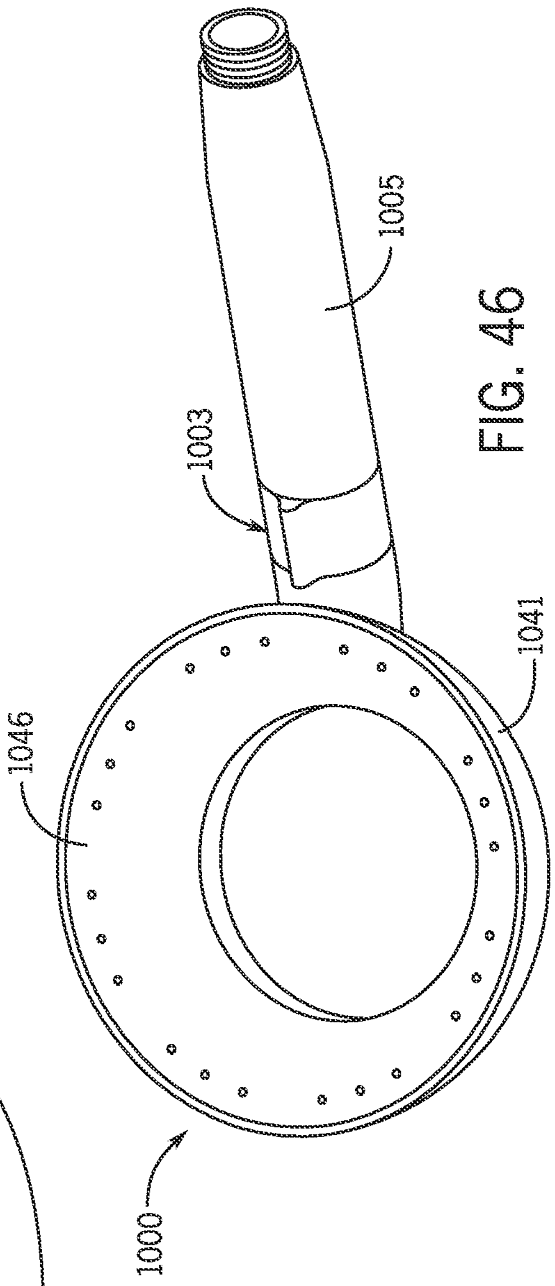
FIG. 46 is a bottom perspective view of the hand shower of FIG. 45.

FIGS. 43 and 44 illustrate an exemplary embodiment of a fixed part 402 for detachably receiving/holding a hand shower, such as the hand showers described herein. The fixed part 402 is configured similar to the fixed part 102, so the differences are mainly discussed here. For example, the body 420 of the fixed part 402 includes basically the body, inner sleeve and outer sleeve of the fixed part 102, all of which are integrally formed as the body 420, except one end

421 (e.g., the outlet end) of the body 420 is an open cylindrical end with threads 422. The end 421 of the body 420, as shown, extends at an angle relative to the other end of the body 420, which couples the fixed part 402 in place. A cap 423, which is shown cup shaped, has threads 424 that thread to the threads 422 of the body 420 to retain a ball joint 437 between the end 421 of the body 420 and the inside of the cap 423. A holder 429 operatively couples to the ball joint 437, such that the holder 429 can freely pivot relative to the ball joint 437. The holder 429 and/or the ball joint 437 can be configured the same as, similar to, or different than the holders/ball joints discussed herein, such as above.

Figure 7:
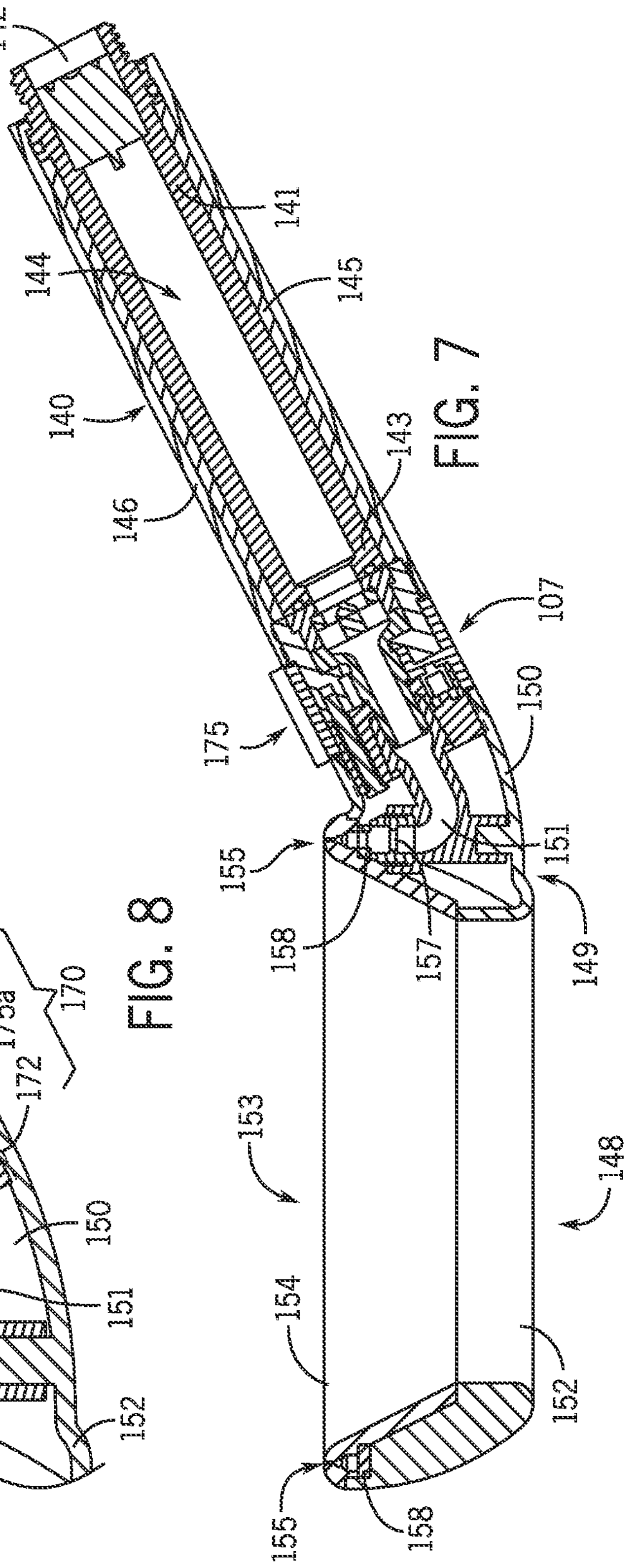
FIG. 7 is a cross-sectional view of an embodiment of a hand shower.
Figure 8:
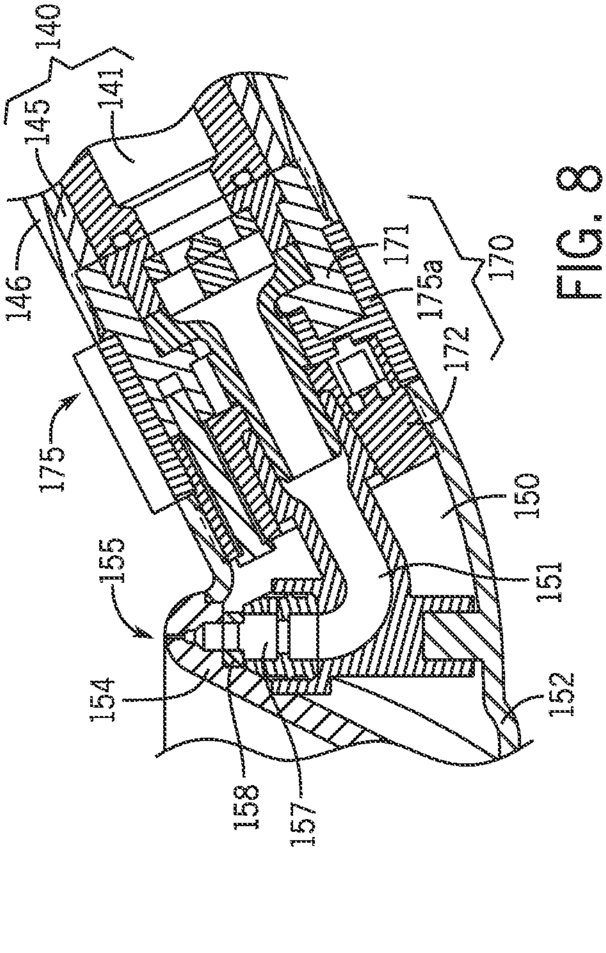
FIG. 8 is a detail view of a portion of the hand shower shown in FIG. 7.

As shown best in FIGS. 1-4, the hand shower 104 includes a handle assembly 140, a spray head 148, and a valve 107 interconnecting the handle assembly 140 and the spray head 148. As shown best in FIGS. 7 and 8, the handle assembly 140 includes an elongated body or waterway 141 extending between and including an inlet end 142 (e.g., a first end, etc.) and an outlet end 143 (e.g., a second end, etc.). The illustrated inlet end 142 includes a threaded connection for coupling to the second end 162 of the hose 106; and the illustrated second end 143 fluidly connects to the valve 107. An internal fluid channel 144 fluidly connects the inlet end 142 and the outlet end 143. One or more additional layers can be disposed around the waterway 141. As shown in FIG. 7, an intermediate layer 145 surrounds the waterway 141, and an outer layer 146 surrounds the intermediate layer 145. One or more of the waterway 141, the intermediate layer 145, and the outer layer 146 can include either a ferromagnetic material or a magnetic material for magnetic docking with the holder 130. For example, the intermediate layer 145 can include either a ferromagnetic material or a magnetic material, and the outer layer 146 can define a handle or grip of the hand shower 104. As shown in FIGS. 7 and 8, the intermediate layer 145 is a tube including a steel that magnetically attracts to the magnetic docking element 134, and the outer layer 146 forming the handle includes a material that provides durability and/or ergonomic feel to a user holding the handle. The outer layer 146 can include a plating or a coating using a plastic, a composite, and/or any ferromagnetic material for magnetic docking with the holder 130. The outer layer 146 may also use a material that does not significantly interfere with the transmission of the magnetic field to allow the intermediate layer 145 to dock with holder 130 magnetically.

Also shown in FIGS. 7 and 8, the spray head 148 includes a base 149 and a head 153 mounted on the base 149. The illustrated base 149 includes an outer body 150 and an inner body 151 disposed within the outer body 150. The outer body 150 couples to the valve 107 at one end through internal threads, while the other end of the outer body 150 couples to or defines part of the head 153. As shown in FIG. 7, the outer body 150 includes an annular member 152 extending from the end opposite the valve 107 to define a rear part of the head 153. The head 153 includes a sprayface 154 that couples to the annular member 152 to form a generally annular head 153 having an inwardly sloped inside frusto-conical surface (moving from front to rear). The sprayface 154 includes one or more nozzles 155 arranged around the ring in a predetermined pattern to provide one or more predetermined spray patterns of water. The illustrated sprayface 154 includes twenty-four (24) nozzles that are grouped in a halo design and are configured to direct water to form two concentric ring shaped spray patterns at a length (e.g., approximately 18 inches) from the sprayface. The inner body 151 fluidly connects an outlet of the valve 107 to the sprayface 154. Thus, the inner body 151 is a waterway (e.g., a second waterway) supplying water to the plurality of nozzles 155.

The spray head 148 can include other components/elements. As shown in FIGS. 7 and 8, a venturi 157 is located between an outlet of the inner body 151 and a ring plate 158, where the ring plate 158 is located between the sprayface 154 and an outlet of the venturi 157. If provided, the venturi 157 includes a converging inlet and diverging outlet, to increase the velocity of water and cause a pressure drop, drawing air into the water stream. The ring plate 158 is secured to the back side of sprayface 154 (e.g., ultrasonically-welded, solvent welded, etc.) to form the waterway loop of the head 153 and is connected to the venturi 157 (if present) or to the inner body 151. The ring plate 158 can help couple or align the sprayface 154 and the annular member 152 together. According to at least one example, the ring plate 158 is a snap-ring or other similar device.

The valve 107 interconnects the handle assembly 140 and the spray head 148 (e.g., the base 149) and is configured to variably control a flow rate of water to the spray head 148. As shown in FIGS. 7-8 and 12-20, the valve 107 includes a housing 170 having a first housing part 171 (e.g., first valve part) and a second housing part 172 (e.g., second valve part). The second housing part 172 is separate from and coupled to the first housing part 171 through a mechanical fastener 173 (e.g., screw, rivet, stud, bolt, etc.) that passes through the second housing part 172 and threads to the first housing part 171 to form the housing 170.

Figure 12:
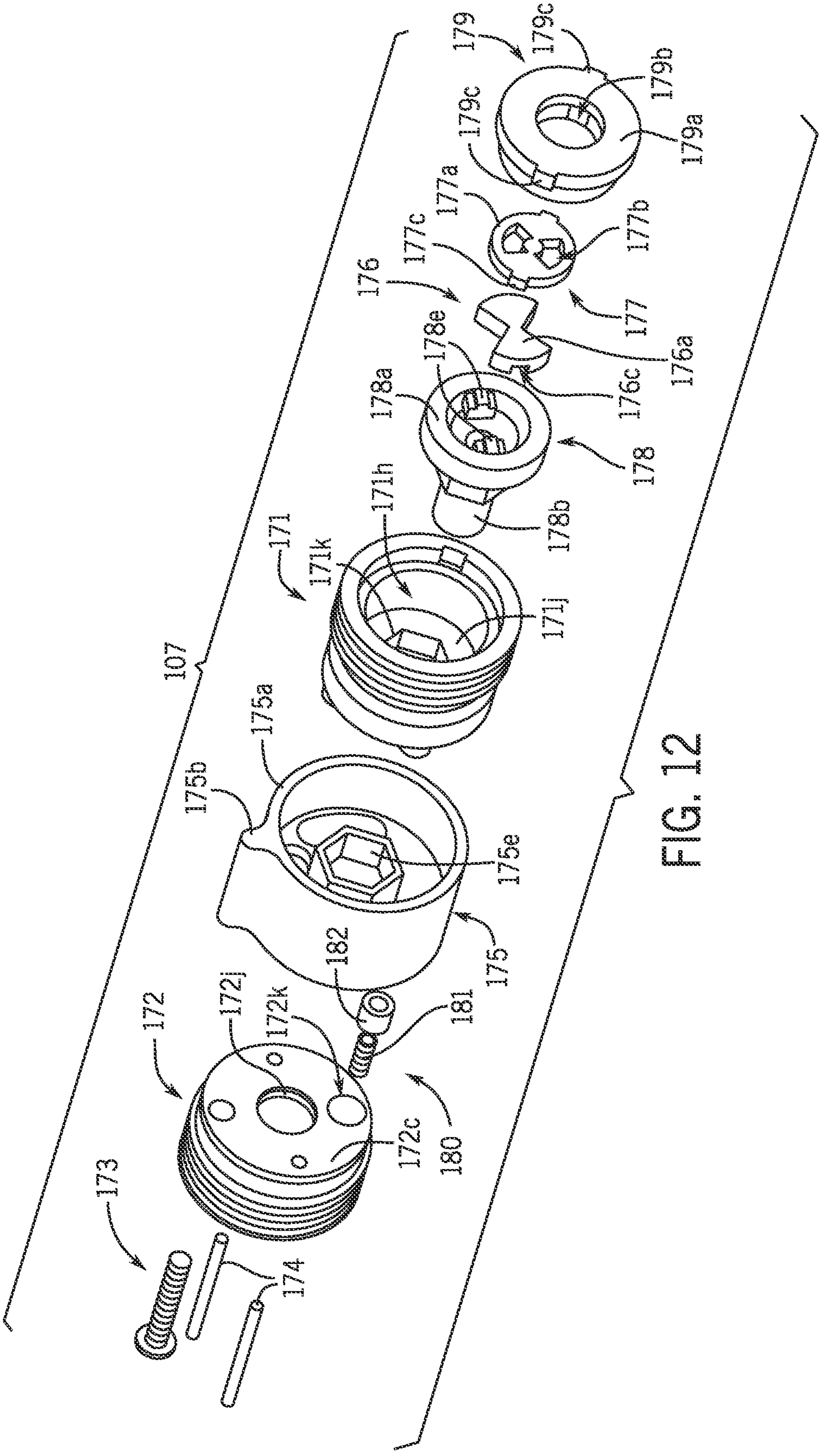
FIG. 12 is an exploded perspective view of an embodiment of a valve for use in a showerhead and/or a hand shower, such as the hand shower shown in FIG. 7.
Figure 13:
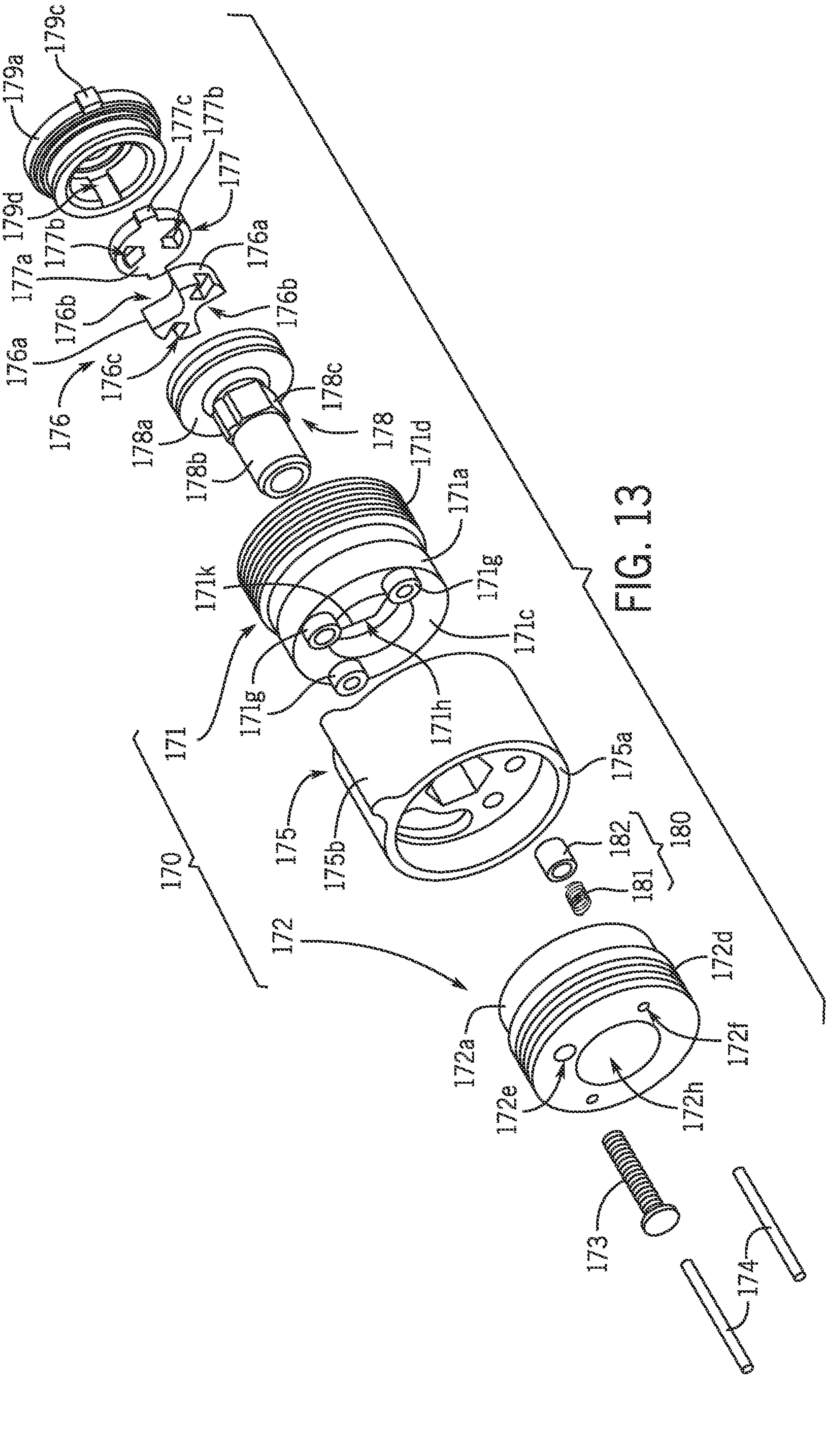
FIG. 13 is another exploded view of the valve shown in FIG. 12.
Figure 14:
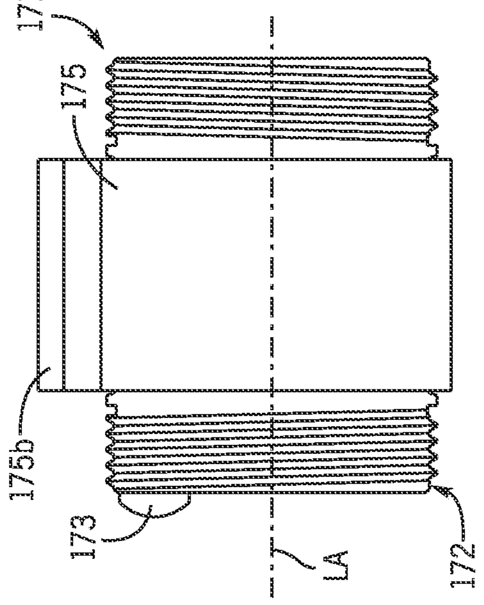
FIG. 14 is a side view of the valve shown in FIG. 12.
Figure 15:
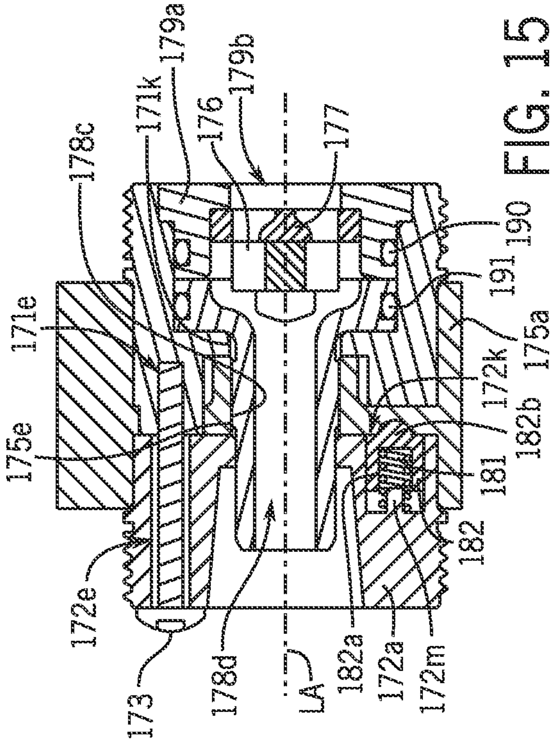
FIG. 15 is a cross-sectional view of the valve shown in FIG. 12.

The illustrated first housing part 171 includes a generally annular body **171*a* extending along a longitudinal axis between a first end 171*b* and a second end 171*c*. The first end 171*b* includes external threads 171*d* that thread to the handle assembly 140 (e.g., internal threads of the outer layer 146). The second end 171*c* includes a bore 171*e* (e.g., the threaded bore shown in FIG. 15) that receives the fastener 173 and, optionally, one or more bores 171*f* (e.g., the through bores shown in FIG. 16), with each bore 171*f* receiving one pin 174 (e.g., dowel pin), which is also optional (e.g., to improve assembly). As shown in FIG. 13, each of the bore 171*e* and the bores 171*f* is concentric with one annular projection 171*g* extending from the second end 171*c*, such that the bore extends into the associated projection 171*g*. Each projection 171*g* extends proud of the end face of the second end 171*c* to engage a slot in the control member 175 (discussed below in more detail). An internal through bore or passage 171*h* (e.g., fluid passage) extends through the body 171*a*; and an inner wall 171*j* extends radially inward from the body 171*a* into the passage 171*h*. The inner wall 171*j* defines a central female keyway 171*k* that is shown best in FIGS. 12 and 13 as having a hexagonal shape (e.g., a hexagon with five straight sides and a sixth side with a concave or arcuate section for alignment). The keyway 171*k* is configured to facilitate installation of the valve (e.g., insertion of the driving member 178 through the keyway 171*k*), but not to drive rotation. As shown in FIG. 15, the male keyway 178*c* of the driving member 178 inserts into and through the female keyway 171*k* in the first housing part 171 to engage with the female keyway 175*e* of the control member 175**.

Figure 16:
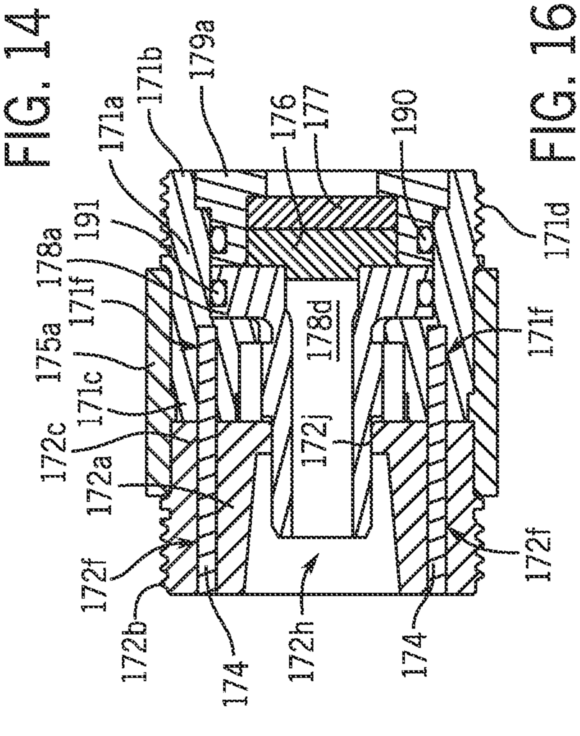
FIG. 16 is a cross-sectional view of the valve shown in FIG. 12.

The illustrated second housing part 172 includes a generally annular body **172*a* extending along a longitudinal axis (e.g., the longitudinal axis of the first housing part 171) between a first end 172*b* and a second end 172*c*. The first end 172*b* includes external threads 172*d* that thread to the spray head 148 (e.g., the internal threads of the outer body 150 of the base 149). The second end 172*c* is proximate to or abuts the second end 171***c* of the first housing part 171 when the valve 107 assembled, as shown in FIGS. 15 and 16. Disposed in the body 172*a* is a first through hole 172*e* (FIGS. 13 and 15) that receives the fastener 173 and, optionally, one or more second through holes 172*f* (FIGS. 13 and 16), with each second through hole 172*f* receiving one pin 174 if provided. An internal through bore or passage 172*h* extends through the body 172*a*, and the second end 172*c* (or a wall therefrom) extends radially inward from the body 172*a* into the passage 172*h* defining a bearing surface 172*j* (FIGS. 12 and 16). Disposed in an end surface of the second end 172*c* is a bore 172*k* (FIGS. 12 and 15) that receives a detent assembly 180 (discussed below in more detail). As shown in FIG. 15, a shoulder 172*m* protrudes into the bore 172*k* to act as a guide for the detent assembly.

The illustrated valve 107 also includes a control member 175 that controls operation of the valve 107 by allowing a user of the hand shower 104 to adjust, variably, a flow rate of water through the valve 107 to the spray head 148. As shown in FIGS. 12-16, the control member 175 operatively couples to the housing 170. For example, the first and second housing parts 171, 172 can retain the control member 175 therebetween. The illustrated control member 175 includes a ring or collar 175*a* that extends along a longitudinal axis LA (e.g., the longitudinal axis of the first and/or second housing parts 171, 172) and is disposed around an external portion of the housing 170 (e.g., a part of each of the first and second housing parts 171, 172). As shown in FIG. 8, the collar 175*a* is disposed between the outer body 150 of the base 149 and the outer layer 146 of the handle assembly 140. An outer diameter of the collar 175*a* is shown substantially the same (i.e., within manufacturing tolerances) as an outer diameter of the outer layer 146 at the end proximate the collar 175*a* and/or an outer diameter of the outer body 150 at the end proximate the collar 175*a*. This arrangement advantageously provides an improved aesthetic (e.g., by the valve and control member appearing seamlessly integrated into the handle assembly and the base of the spray head) as well as potentially reducing accidental actuation of the control member 175. An actuating projection or lever 175*b* extends from the outer diameter of the collar 175*a* to a predetermined height above the collar 175*a* (e.g., to a radius larger than the outer diameter of the collar 175*a*). The lever 175*b* facilitates rotation of the collar 175*a*, such as by actuation by a user of the hand shower 104, to change the flow rate of water, as discussed below in more detail. The lever 175*b*, as shown, is a radial rib that extends the length of the collar 175*a*, although the lever 175*b* can have other configurations.

The illustrated control member 175 includes an inner wall 175*c* that extends radially inward from and within the collar 175*a*. As shown best in FIG. 20, three slots 175*d* (e.g., slotted holes, ports, slotted ports, etc.) are provided in the inner wall 175*c* at a common radial distance from a center of the collar 175*a* (e.g., the longitudinal axis LA). The two outboard slots 175*d* are approximately 180° (one-hundred and eighty degrees) apart with the middle slot 175*d* being located approximately equidistant from each of the two outboard slots 175*d*. Each slot 175*d* is shown having a kidney shape that adjustably (e.g., rotatably) receives one annular projection 171*g* of the first housing part 171 therein. Thus, rotation of the control member 175 about an axis (e.g., the longitudinal axis LA) relative to the housing 170 results in each slot 175*d* moving relative to the associated stationary projection 171g, where the ends of the slot 175*d* act as travel stops to control the relative range of motion and, therefore, control the range of the variable flow rate. The inner wall 175*c* defines a central female keyway 175*e* that is shown best in FIGS. 12, 13, and 20 as having a hexagonal shape (e.g., a hexagon with five straight sides and a sixth side with a concave or arcuate section for alignment). The inner wall 175*c* includes two coined or lanced indentations or indents 175*f* formed therein, but not punched or pierced all the way through the inner wall. As discussed below in more detail, the indents 175*f* cooperate with the detent assembly 180 to provide positive stops to the control member 175 of the valve 107. Notably, the valve 107 can include a different number of positive stops, such as by having a different number of indents 175*f*.

The valve 107 can also include additional components/elements that help to control the flow rate of water through the valve 107 to the spray head 148. By way of example, the illustrated valve 107 includes a moveable (e.g., rotatable) disk 176, a stationary disk 177, a driving member 178, a valve cap 179, the detent assembly 180, and/or one or more O-rings 190. Notably, the valve 107 can include either fewer or additional components/elements.

The illustrated rotatable disk 176 includes two generally triangular elements 176*a* that are generally planar and symmetrically opposite (e.g., forming a "bowtie" shape) with two semicircular ports 176*b* (e.g., voids) located opposite one another and between the triangular elements. Each triangular element 176*a* has a notch 176*c* located in a side facing downstream (as the water flows through the valve 107), where each notch 176*c* receives a feature (e.g., of the driving member 178) to drive or facilitate rotation of the rotatable disk 176. The disk 176 can include a ceramic and/or any other suitable material.

The illustrated stationary disk 177 includes a circular and planar body 177*a* having two generally triangular and symmetrically opposite ports 177*b* extending through the body 177*a*. Water received by the valve 107 flows through the ports 177*b* in the stationary disk 177 (and through the ports 176*b* in the rotatably disk 176 depending on the relative rotational positions between the disks). The stationary disk 177 can include one or more tabs 177*c* that extend radially outward from an outer diameter of the body 177*a*, where each tab 177*c* engages a notch in valve cap 179 to prevent relative rotation between the disk 177 and valve cap 179. As shown best in FIGS. 12 and 13, the disk 177 has two tabs 177*c* that extend from two opposite sides of the body 177*a*, but the disk 177 can include fewer or additional tabs.

The illustrated driving member 178 transfers (e.g., translates) motion (e.g., rotation) of the control member 175 into the rotatable disk 176, while providing a fluid passage for water to flow through. As shown best in FIGS. 12 and 13, the driving member 178 includes an annular base 178*a* and an elongated shoulder 178*b* extending from a side of the base 178*a* that faces downstream. Extending radially outward from the shoulder 178*b* is a male keyway 178*c* that is shown best in FIG. 13 as having a hexagonal shape (e.g., a hexagon with five straight sides and a sixth side with a convex or outwardly arcuate section for alignment). As shown in FIG. 15, the male keyway 178*c* engages the female keyway 175*e* in the control member 175, such that rotation of the control member 175 drives a corresponding rotation of the driving member 178. A passage 178*d* (e.g., fluid passage) extends through the base 178*a* and the shoulder 178*b*, and the passage 178*d* fluidly connects the fluid channel in the inner body 151 to the internal fluid channel 144 of the waterway 141 when assembled, as shown in FIG. 7. As shown in FIG. 12, two opposing ribs 178*e* engage the two notches 176*c* in the rotatable disk 176, such that rotation of the driving member 178 in-turn rotates the rotatable disk 176 by a corresponding rotation.

The illustrated valve cap 179 is disposed in the passage 171*h* of the first housing part 171 to retain the disks 176, 177 in close proximity (e.g., abutment) to one another in the valve 107. For example, the valve cap 179 can couple to the first housing part 171 to secure the disks 176, 177 in the passage 171*h* between the driving member 178 and the valve cap 179. The valve cap 179 includes an annular body 179*a* having an internal bore 179*b* extending through the body 179*a* for receiving the disks 176, 177 (FIGS. 15 and 16) and allowing water to flow through to the disks 176, 177. As shown best in FIG. 12, two tabs 179*c* extend radially out from opposite sides of the body 179*a* to engage recesses in the body 171*a* of the first housing part 171 to prevent relative rotation between the valve cap 179 and the first housing part 171. As shown best in FIG. 13, two notches 179*d* (only one is shown) are formed in the inside of the body 179*a* at opposing sides, where each notch 179*d* is configured to receive one tab 177*c* of the disk 177 to prevent relative rotation between the valve cap 179 and the disk 177.

As shown in FIGS. 12 and 13, the illustrated detent assembly 180 includes a spring 181, in the form of an extension or compression spring, and a detent member 182. As shown in FIG. 15, a first end of the spring 181 is disposed around the shoulder 172*m* of the second housing part 172, while a bore in one end of an annular body 182*a* of the detent member 182 receives a second end of the spring 181. A detent 182*b* (e.g., convex projection, bump, raised surface, etc.) extends from the other end of the body 182*a* and is configured to selectively engage the control member 175 (e.g., the inner wall 175*c* or one of the indents 175*f*, depending on the position of the valve 107).

As shown in FIGS. 15 and 16, the valve includes a first O-ring 190 and a second O-ring 191. The first O-ring 190 is disposed in a groove (e.g., an annular channel) around an outside of the body 179*a* of the valve cap 179 to seal between the first housing part 171 and the valve cap 179. The second O-ring 191 is disposed in a groove around an outside of the base 178*a* of the driving member 178 to seal between the first housing part 171 and the driving member 178.

According to one exemplary method, the valve 107 can be assembled using a five step process. The first step involves aligning the first and second housing parts 171, 172 with the control member 175, which is located between the two valve parts, and securing the first and second housing parts 171, 172 together with the control member 175 therebetween. The first step can involve aligning the three components using the pins 174, and can involve securing the valve parts using the fastener 173. The first step can also include positioning the spring 181 and the detent member 182 in the bore 172*k* of the second housing part 172. The second step involves inserting the driving member 178 into housing 170, such that the male keyway 178*c* of the driving member engages the female keyway 175*e* of the control member 175. The third step involves coupling the rotatable disk 176 to the driving member 178, such that each notch 176*c* in the disk 176 receives one rib 178*e* of the driving member 178. The fourth step involves coupling the stationary disk 177 to the valve cap 179, such that each notch 179*d* in the valve cap 179 receives one tab 177*c* of the disk 177. The fifth step involves coupling the valve cap 179 (with the disk 177) to the first housing part 171, such that the disks 176, 177 are adjacent one another within the fluid passage of the valve 107.

Figure 17:
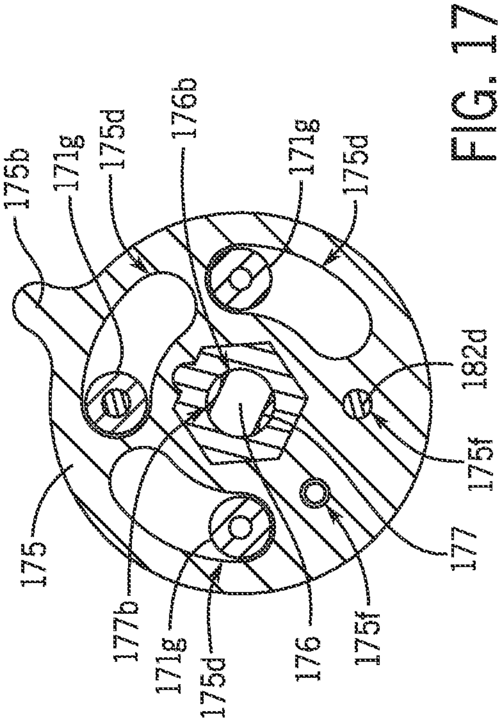
FIG. 17 is a cross-sectional view of the valve shown in FIG. 12 in a first position.
Figure 19:
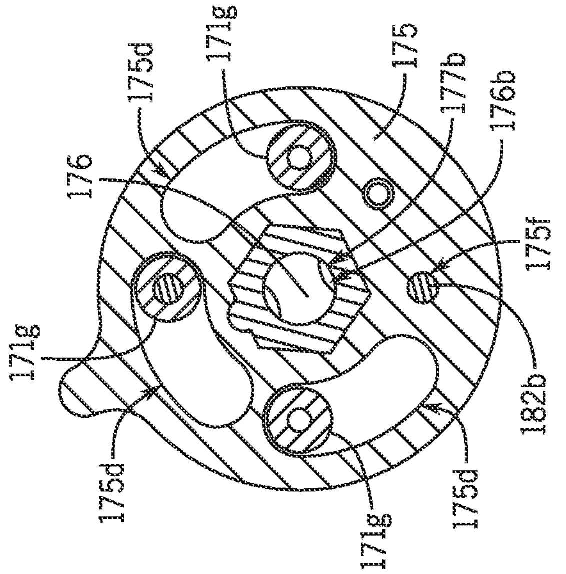
FIG. 19 is a cross-sectional view of the valve shown in FIG. 12 in a third position.
Figure 20:
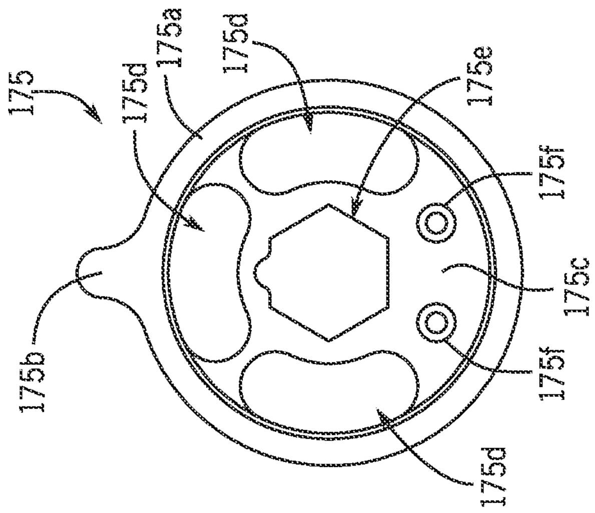
FIG. 20 is a plan view of an embodiment of a control for a valve, such as the valve shown in FIG. 12.

To operate or control the valve 107, such as to variably adjust a flow rate of water through the valve 107 to the spray head 148, a user needs only to rotate the control member 175 about the longitudinal axis LA relative to the housing 170. As shown in FIGS. 3 and 4, the lever 175*b* protrudes or extends proud of the collar 175*a* and the handle assembly 140 to allow a user to rotate the control member 175 through the lever 175*b*. Also shown, the handle assembly 140 can include a marking 147, such as lettering or numbering (e.g., “0.5” representing 0.5 gpm, “1.5” representing 1.5 gpm, etc.), on part of the handle assembly 140, such as the outer layer 146, that is proximate the control member 175. Aligning the lever 175*b* (or a marking 175*g* thereon) with one marking 147 indicates to the user the setting or mode of the hand shower 104. As shown in FIGS. 3 and 4, when the marking 175*g* aligns with the 0.5 gpm marking 147, the hand shower 104 and the valve 107 are in a first mode that delivers, for example, a maximum of 0.5 gpm of water to the spray head 148. When the marking 175*g* aligns with the 1.5 gpm marking 147, the hand shower 104 and the valve 107 are in a second mode that delivers, for example, a maximum of 1.5 gpm of water to the spray head 148. FIGS. 17 and 19 are cross sectional views showing the valve 107 in the first and second modes, respectively. As shown in FIG. 17, when the valve 107 is in the first mode, each projection 171*g* of the first housing part 171 is located in (e.g., proximate to) a first side of the associated slot 175*d* (corresponding to a clockwise most rotation of the control member 175 relative to the first housing part 171) and the detent 182*b* aligns (e.g., engaging) with one of the indents 175*f*. Also shown, the rotatable disk 176 is positioned in the first mode, such that the ports 176*b* of the disk 176 barely overlap with the ports 177*b* of the stationary disk 177, which results in a reduced or minimum flow (e.g., 0.5 gpm) of water passing through the valve 107 to the spray head 148. As shown in FIG. 19, when the valve 107 is in the second mode, each projection 171*g* is located in a second side of the associated slot 175*d* (corresponding to a counterclockwise most rotation of the control member 175 relative to the first housing part 171) and the detent 182*b* is aligned (e.g., engaging) with the other indent 175*f*. Also shown, the rotatable disk 176 is positioned in the second mode, such that the ports 176*b* of the disk 176 fully or completely overlap with the ports 177*b* of the stationary disk 177, which results in an increased or maximum flow (e.g., 1.5 gpm) of water passing through the valve 107 to the spray head 148. It should be clear that the lengths of the slots 175*d* and their position relative to the other valve components influences the overall range of flow rate that the valve 107 is able to pass and, accordingly, the slots 175*d* can be reconfigured to provide a different range (e.g., less than 0.5 gpm, greater than 1.5 gpm).

Figure 18:
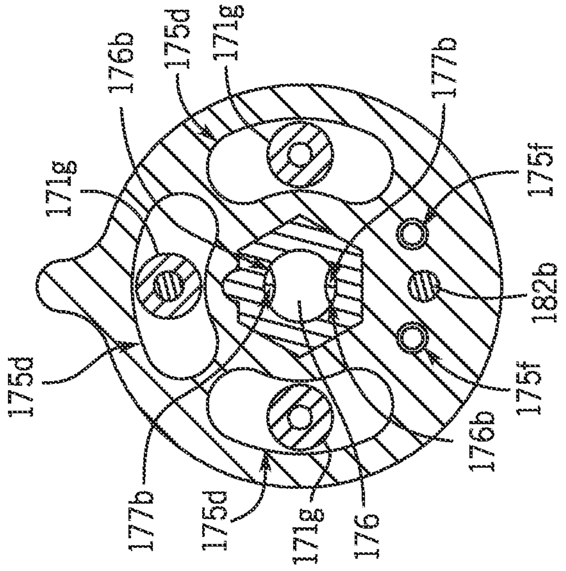
FIG. 18 is a cross-sectional view of the valve shown in FIG. 12 in a second position.

The valve 107 further is configured to provide a variably (e.g., infinitely) adjustable flow rate of water to the spray head 148 upon rotation of the control member 175 (and the rotatable disk 176) relative to the stationary disk 177 between the first and second modes. In this way, the valve 107 provides approximately an infinite number of operating modes. FIG. 18 illustrates one such operating mode located between the first and second modes. As shown, each projection 171*g* is located toward a central portion of the associated slot 175*d*, and the detent 182*b* is between the two indents 175*f* (e.g., on a smooth surface part of the control member 175. Also shown, the rotatable disk 176 is positioned in a mode between the first and second modes, such that the ports 176*b* of the disk 176 partially overlap with the ports 177*b* of the stationary disk 177. This results in a flow rate of water between the minimum and maximum rates (e.g., 1.0 gpm) passing through the valve 107 to the spray head 148.

According to one exemplary method, the hand shower 14 shown in FIG. 7 can be assembled using a nine step process. The first step involves assembling the valve 107, for example, as described above. The second step involves assembling the ring plate 158, such as through welded, to the sprayface 154. The third step involves assembling the venturi 157, such as through welded, to the ring and sprayface assembly. The fourth step involves inserting the inner body 151 (e.g., the J-tube) into the head 153. The fifth step involves coupling (e.g., snapping) the ring and sprayface assembly onto the head 153 containing the inner body 151. The sixth step involves sliding the intermediate layer 145 (e.g., the steel tube) over the waterway 141. The seventh step involves sliding the outer layer 146 (e.g., the handle) over the coupled waterway 141 and intermediate layer 145. The eighth step involves coupling the outer layer 146 to the valve 107, such as by threading the handle onto the first housing part 171. The ninth step involves coupling the handle and valve assembly to the spray head 148, such as by threading the second housing part 172 to the outer body 150 of the spray head 148.

Figure 5:
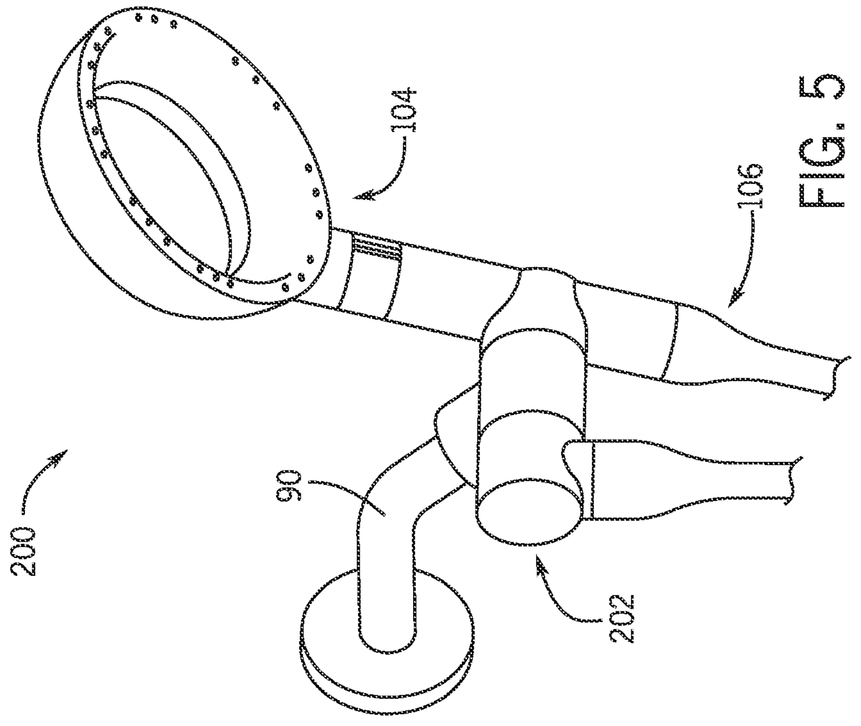
FIG. 5 is a perspective view of another embodiment of a shower assembly.

FIG. 5 illustrates another exemplary embodiment of a shower assembly 200 that includes a hand shower 104 that detachably mounts to a fixed part 202 and receives water from the fixed part 202 through a hose 106. Thus, the hand shower 104 and the hose 106 can be the same as or similar to those components already described herein. The fixed part 202, however, differs from the fixed part 102 in several ways (discussed below).

Figure 29:
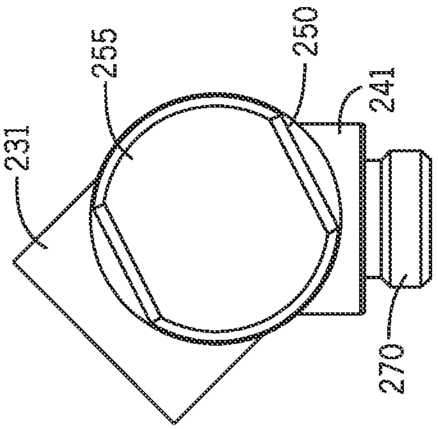
FIG. 29 is a side view of the holder shown in FIG. 28.
Figure 28:
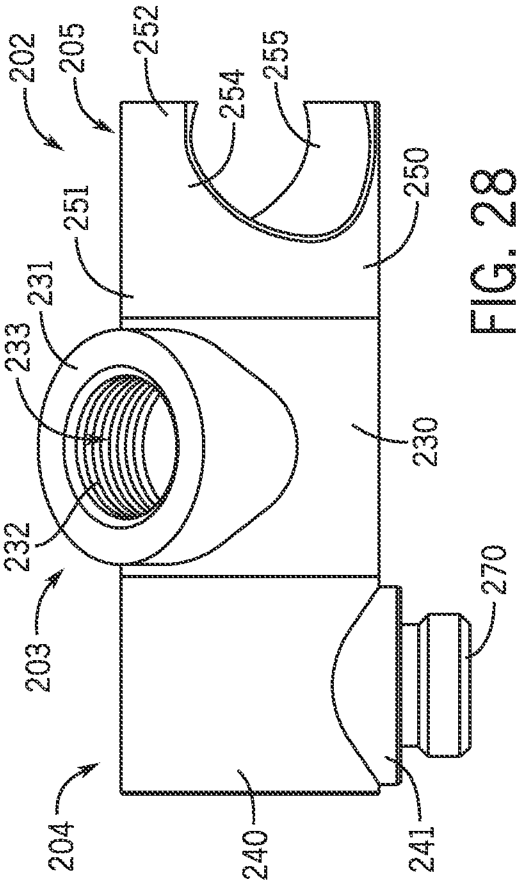
FIG. 28 is a perspective view of another embodiment of a holder, such as the hand shower holder shown in FIG. 5.
Figure 30:
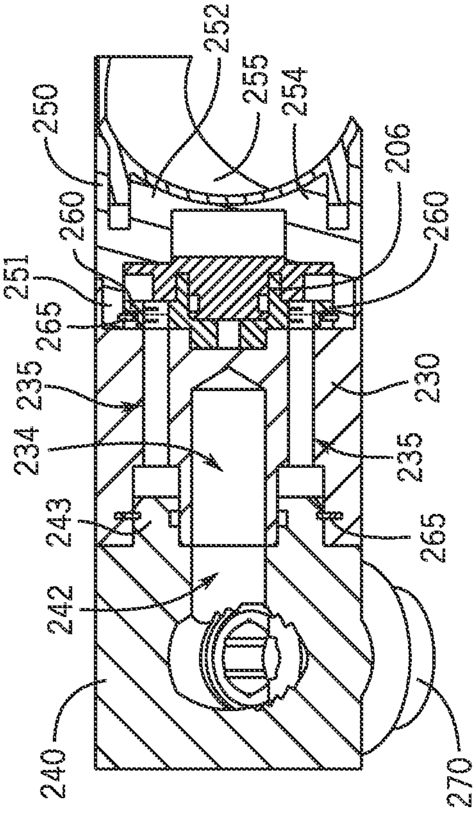
FIG. 30 is a cross-sectional view of the holder shown in FIG. 28.

As shown in FIGS. 28-30, the fixed part 202 includes an inlet 203, an outlet 204, and a holder 205. The inlet 203 includes a generally cylindrical body 230 with an inlet projection 231 extending transversely to a longitudinal direction of the body 230. The inlet projection 231 includes internal threads 232 that thread to an inlet pipe 90 (shown in FIG. 5) and partially define an internal bore 233 that is part of a fluid passage 234 for delivering water from the inlet pipe to the outlet 204. As shown in FIG. 30, two counterbores 235 are disposed in the body 230 for securing the inlet 203 to the holder 205 and the outlet 204.

The illustrated holder 205 is configured to slideably receive the hand shower 104, as shown in FIG. 5, to allow height adjustment of the hand shower 104 relative to the holder 205, such as through a magnetic connection. As shown in FIGS. 28-30, the holder 205 includes a base 250 having a first side 251 and a second receiving side 252, which has a shape that complements the shape of the handle of the hand shower 104, such as having a generally open semicircular shape. One or more docking elements 254 are disposed in the base 250, where each docking element 254 includes a rare earth magnet that magnetically attracts to a ferromagnetic material or magnets in a handle of the hand shower 104 to provide magnetic docking with height adjustability. The holder 205 can, optionally, include a surface 255 that aids in preventing damaging the hand shower 104 when coupled together, such as by including a polymer, a silicone, a TPE, a TPV, and/or any other similarly suitable material. According to at least one example, the surface 255 is formed in place, such as through an over-molding process, or formed separately from the base 250 and coupled thereto. The illustrated holder 205 rotatably couples to the inlet 203. As shown in FIG. 30, a bracket 206 is secured to the end of the inlet 203 (that is proximate the first side 251 of the holder 205) using fasteners that pass through the counterbores 235 and thread to the bracket 206. The bracket 206 includes a flange 260 (e.g., a radial flange) that extend past a recess located between the flange 260 and the inlet 203, where each recess receives a mechanical fastener, such as a (e.g., first) snap ring 265 shown in FIG. 30, and each flange 260 retains the snap ring 265 in place in the recess. The snap ring 265 is secured into the first side 251 of the holder 205, which includes an inwardly extending radial channel in the inside surface for receiving the snap ring 265.

The outlet 204 includes a generally cylindrical body 240 having an outlet projection 241 extending transversely to a longitudinal direction of the body 240. An internal fluid passage 242 fluidly connects to the fluid passage 234 when the outlet 204 couples to the inlet 203. An annular shoulder 243 extends from the body 240 on the side having the inlet into the fluid passage 242. As shown in FIG. 30, the shoulder 243 includes an inwardly extending radial channel in an outside surface for receiving another (e.g., a second) snap ring 265. The snap ring 265 also engages an inwardly extending radial channel in an inside surface of the body 230 that defines part of the counterbore 235 (e.g., the larger diameter part) to couple the outlet 204 to the inlet 203. The shoulder 243 can include a bore that receives a shoulder of the body 230 of the inlet 203. A mechanical connector 270 can couple to the outlet projection 241, such as through a bore therein, where the mechanical connector 270 includes a fluid passage for fluidly connecting the hose 106 to the fixed part 202. Alternatively, the threaded feature of the mechanical connector 270 can be part of the body 240.

Figure 6:
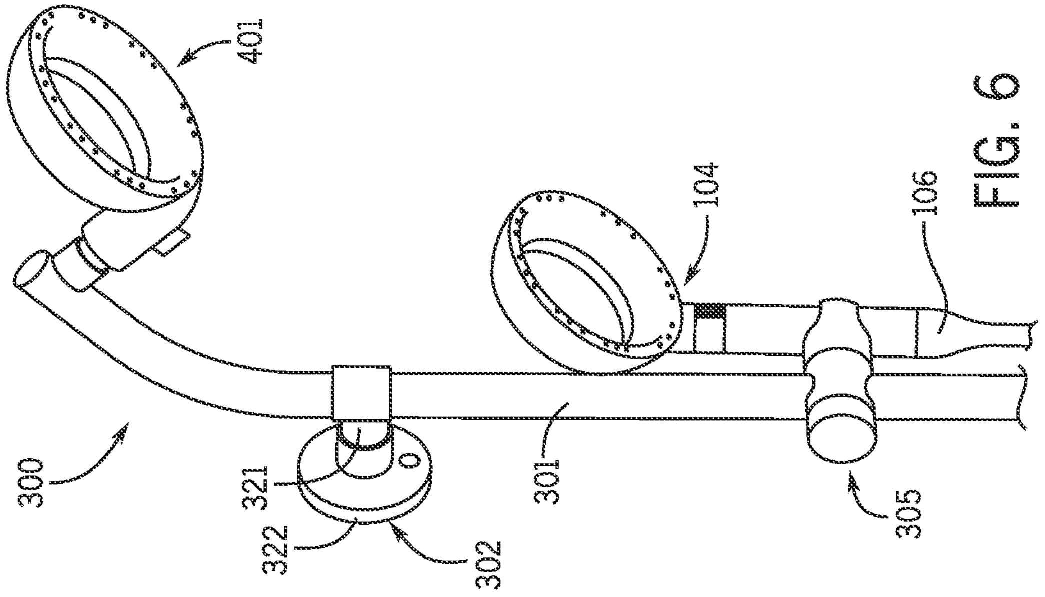
FIG. 6 is a perspective view of another embodiment of a shower assembly.

FIG. 6 illustrates another exemplary embodiment of a shower assembly 300 that includes a hand shower 104 and a showerhead 401. The hand shower 104 detachably and slideably mounts to a holding assembly 305, which is adjustably (e.g., slideably) mounted on a handrail 301 that receives water from a fixed part 302 that is configured to mount to a shower wall. The fixed part 302 includes an inlet pipe 321 and an escutcheon 322 disposed around the inlet pipe 321. The handrail 301 receives water from the inlet pipe 321, directs the water to the showerhead 401 through an upper part, and directs water to the hand shower 104 through a lower part. The holding assembly 305 can include a magnetic docking feature, such as the holder 205, 130, for the hand shower 104, as well as another magnetic docking feature that slideably mounts the holding assembly 305 to the handrail 301. A hose 106 can fluidly connect the hand shower 104 to the handrail 301. The hand shower 104 and the hose 106 shown in FIG. 6 can be the same as or similar to those components already described herein.

Figure 9:
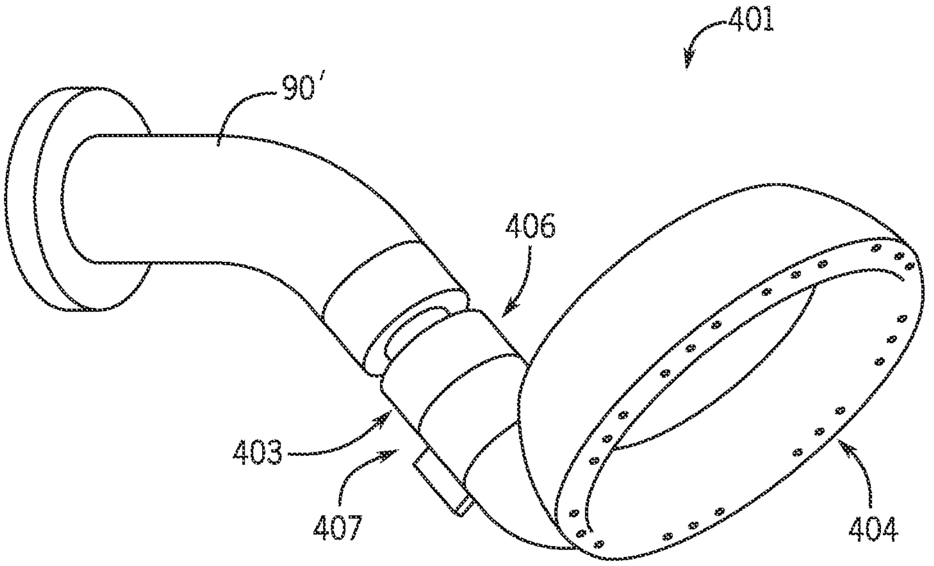
FIG. 9 is a perspective view of an embodiment of a showerhead.
Figure 10:
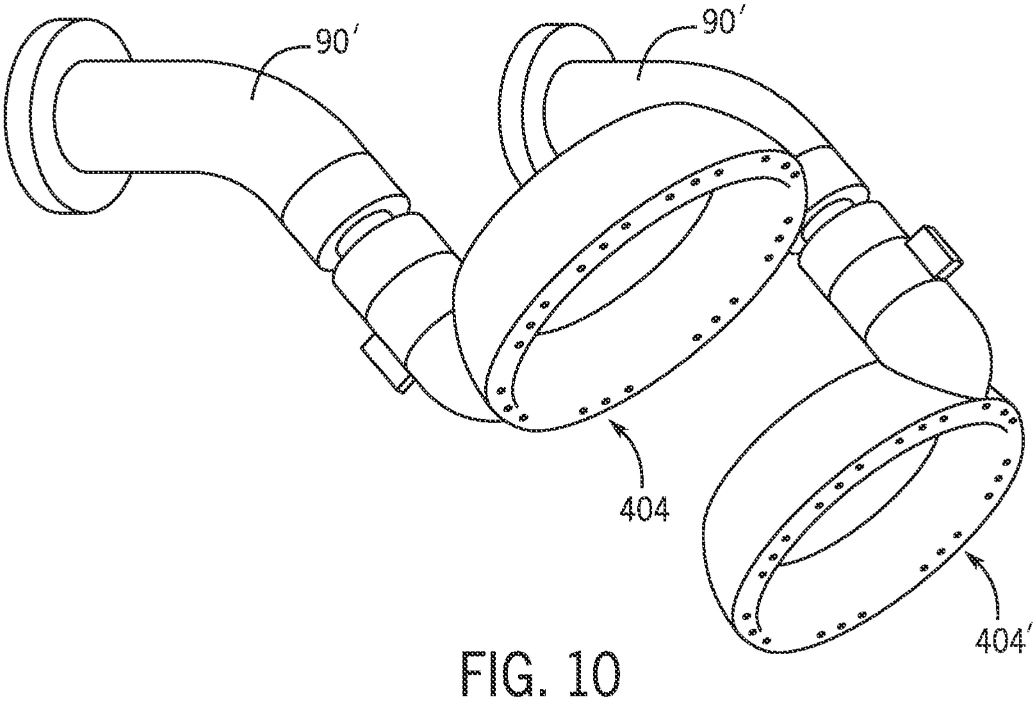
FIG. 10 is another perspective view of the showerhead shown in FIG. 9 showing an adjustment of the showerhead.
Figure 11:
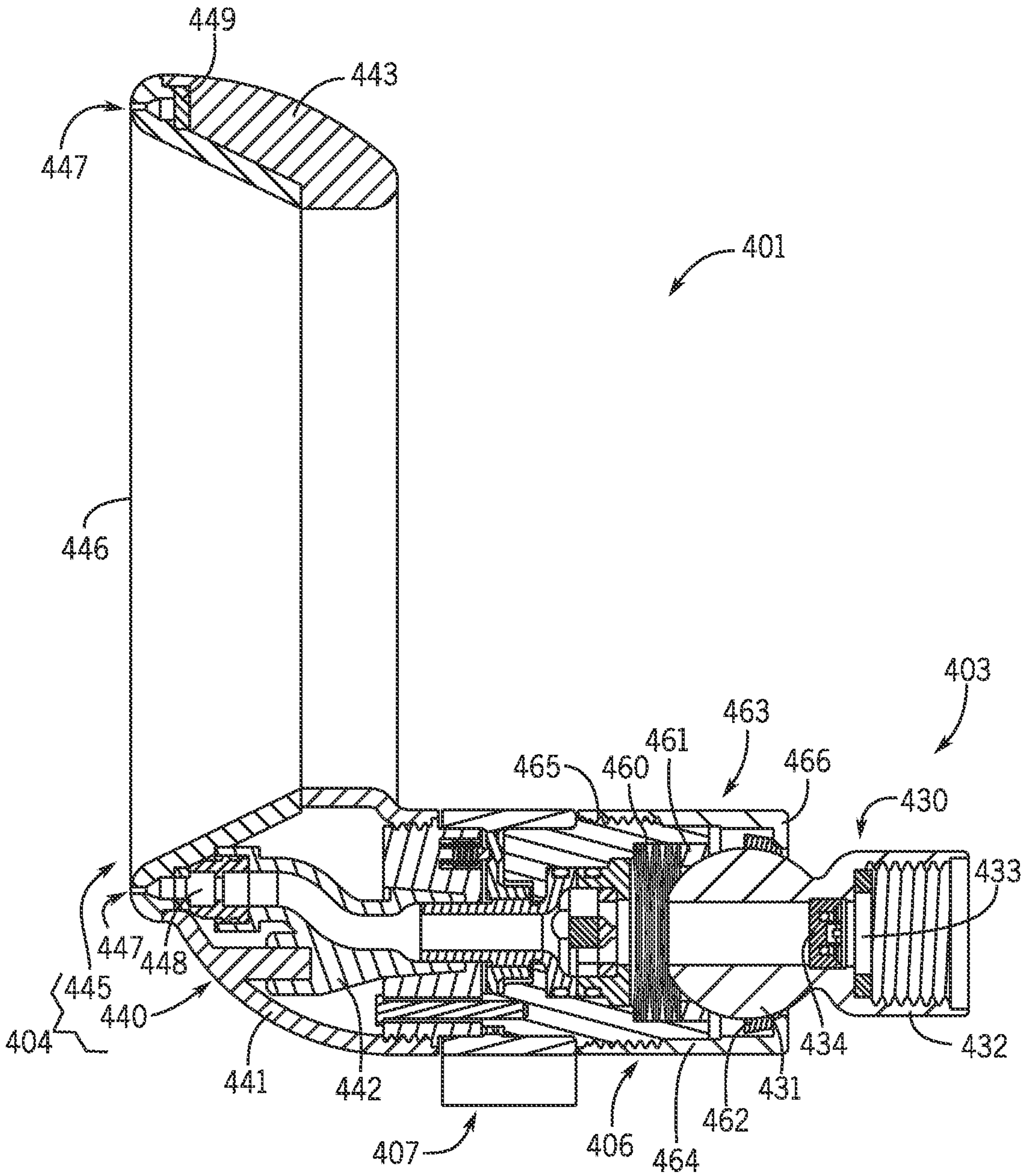
FIG. 11 is a cross-sectional view of the showerhead shown in FIG. 9.

FIGS. 9-11 illustrate an exemplary embodiment of a showerhead 401 that is configured to mount to an inlet pipe 90' (FIG. 9), a handrail (e.g., the handrail 301 shown in FIG. 6), or another suitable fluid delivery component. The illustrated showerhead 401 includes an inlet assembly 403, a spray head 404, and a valve 407 (FIG. 11) interconnecting the inlet assembly 403 and the spray head 404. As shown in FIG. 10, the spray head 404 is adjustable relative to the inlet pipe 90' and the inlet assembly 403. For example, the spray head 404 is rotatable about a central axis of the inlet assembly 403 between a vertically upward position (e.g., a "twelve o'clock position") and a vertically downward position (e.g., a "six o'clock position"), which is shown as the spray head 404' in FIG. 10. The illustrated spray head 404 provides a 4.0" (four inch) vertical adjustment between the upward and downward positions. The spray head 404 can be rotated a full 360° (three-hundred and sixty degrees). Also for example, the illustrated spray head 404 is freely pivot-able about the spherical element 431 (discussed below). That is, the spray head 404 can pivot about a centerpoint of the spherical element 431.

As shown in FIG. 11, the inlet assembly 403 includes a ball joint 430 having a spherical element 431 attached to a cylindrical connector 432. The cylindrical connector 432 includes internal threads that screw to an inlet pipe or other fluid delivery component. A fluid passage 433 extends through the spherical element 431 and the cylindrical connector 432 to supply water to the valve 407. The illustrated inlet assembly 403 also includes a flow regulator 434 and a screen, which filters particulates over a predetermined size, in the fluid passage 433.

Also shown in FIG. 11, a valve bracket assembly 406 couples the valve 407 to the ball joint 430, such that the spray head 404 is freely rotatable about the ball joint 430. The illustrated valve bracket assembly 406 includes a biasing member or spring 460, a first compressible member 461, a second compressible member 462, and a bracket 463. The bracket 463 includes an outer wall 464 in the form of a longitudinally extending sleeve having threads 465 at one end for screwing to threads of the valve 407 (discussed below). The bracket 463 includes an annular inner wall 466 extending radially inward from the end of the outer wall 464 opposite the threads, where the inner wall 466 has an opening that receives the inlet assembly 403. The spring 460 is disposed in a bore of the valve 407 and exerts a force that biases the first compressible member 461 toward and into contact with a front of the spherical element 431. The second compressible member 462 is disposed between a rear of the spherical element 431 and the inner wall 466. In this way, the spring 460 biases the first compressible member 461 into the spherical element 431, which in-turn loads the second compressible member 462 between the bracket 463 and the spherical element 431. This loading induces friction, which is tailorable to maintain the spray head 404 in any moved position by a user. The first and second compressible members 461, 462 can be made of or include a resilient/compressible material, such as an elastomer or other suitable material.

The illustrated spray head 404 includes a base 440 and a head 445 mounted on the base 440. The illustrated base 440 includes an outer body 441 and an inner body 442 disposed within the outer body 441. The outer body 441 couples to the valve 407 at one end through internal threads, while the other end of the outer body 441 couples to or defines part of the head 445. As shown in FIG. 11, the outer body 441 includes an annular member 443 extending from the end opposite the valve 407 to define a rear part of the head 445. The head 445 includes a sprayface 446 that couples to the annular member 443 to form a generally annular head 445 having an inwardly sloped inside frusto-conical surface (moving from front to rear). The sprayface 446 includes one or more nozzles 447 arranged around the ring in a predetermined pattern to provide one or more predetermined spray patterns of water. The illustrated sprayface 446 includes a plurality of nozzles 447 that has a halo design to direct water to form two concentric ring shaped spray patterns at a length from the sprayface 446. The inner body 442 fluidly connects an outlet of the valve 407 to the sprayface 446. Thus, the inner body 442 is a waterway (e.g., a second waterway) supplying water to the plurality of nozzles 447. Also shown in FIG. 11, the spray head 404 further includes a venturi 448 that is located between an outlet of the inner body 442 and a ring plate 449, where the ring plate 449 is located between the sprayface 446 and an outlet of the venturi 448. The venturi 448 is configured the same as the venturi 157 (described above).

Figure 21:
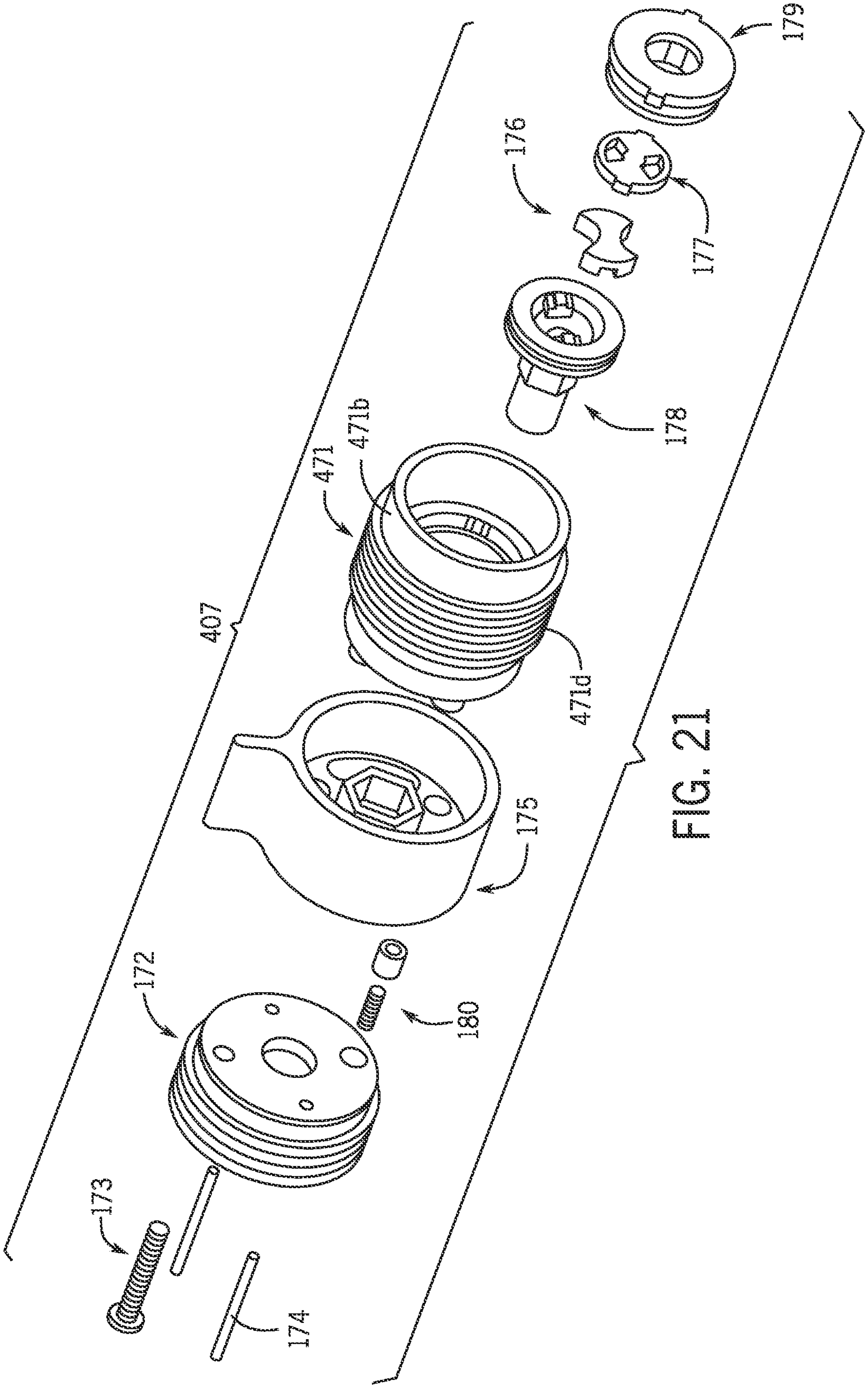
FIG. 21 is an exploded perspective view of an embodiment of a valve for use in a showerhead and/or a hand shower, such as the showerhead shown in FIG. 11.
Figure 22:
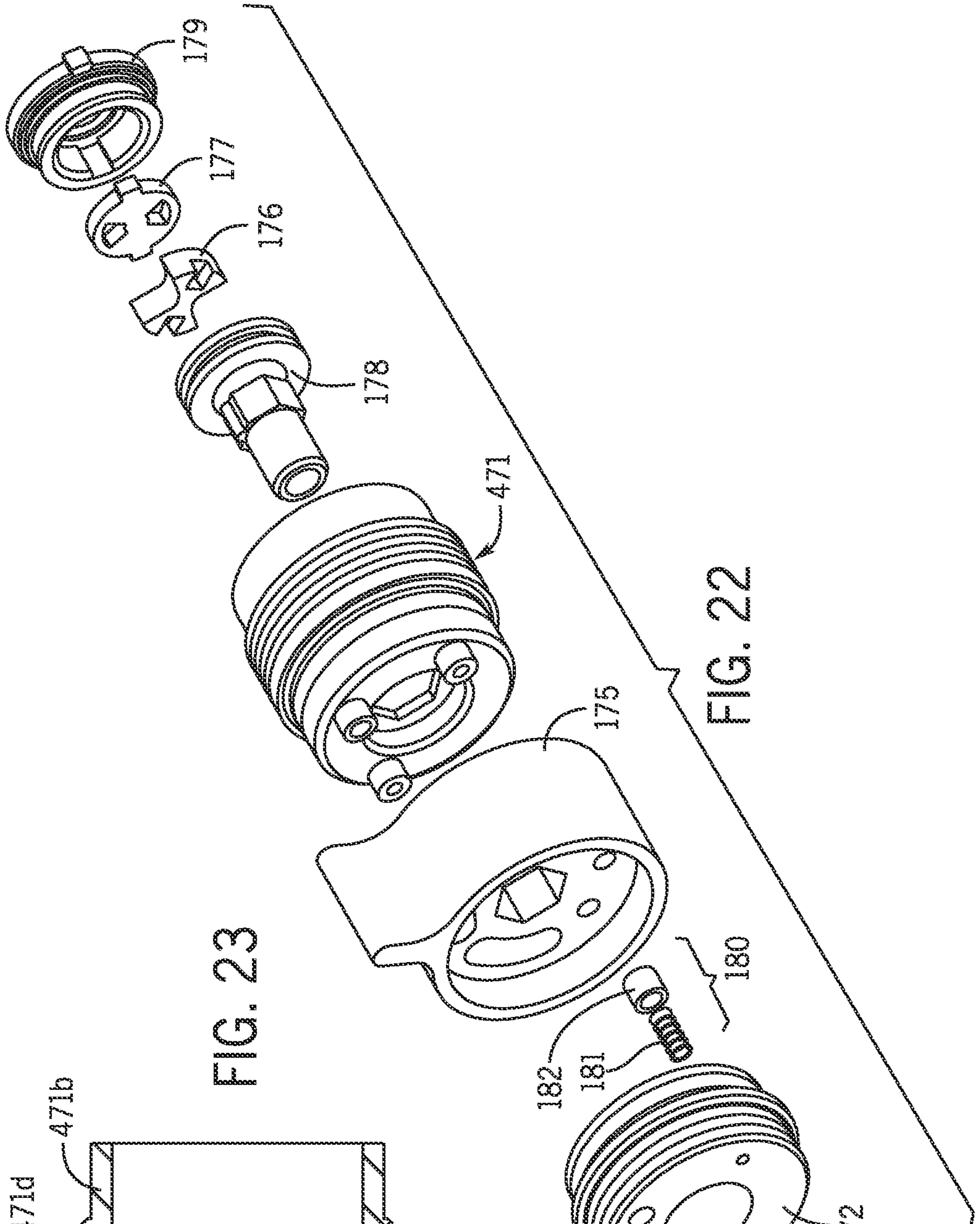
FIG. 22 is another exploded view of the valve shown in FIG. 21.
Figure 23:
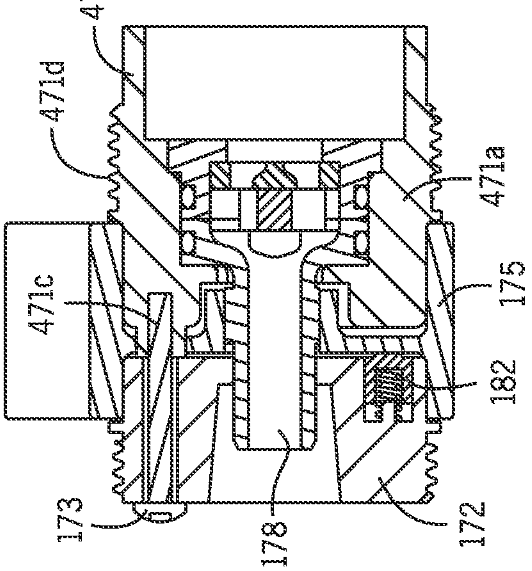
FIG. 23 is a cross-sectional view of the valve shown in FIG. 21.

The valve 407 of the showerhead 401 can be configured the same as or similar to the valve 107 of the hand shower 104. As shown in FIGS. 21-23, the valve 407 includes the same basic components as the valve 107, in that, the valve 407 includes the second housing part 172, a fastener 173, two pins 174, the control member 175, the rotatable disk 176, the stationary disk 177, the driving member 178, the valve cap 179, and the detent assembly 180. Each of which is, basically, the same as the elements described above for the valve 107. The illustrated valve 407 also includes a first valve part 471, which is similar to the first housing part 171 of the valve 107, but is different where noted. For example, the first end **471*b* of the body 471*a* extends farther or longer and the threads 471*d* are located along the body 471*a* between the first end 471*b* and the second end 471*c* (FIG. 23). The longer first end 471*b* creates a longer internal bore in the body 471*a*, such that the internal bore receives the spring 460 and first compressible member 461, as shown in FIG. 11. It is noted that the elements of the first valve part 471 (e.g., the body 471*a*) are described using a letter convention that is the same as the corresponding element of the valve 107 (e.g., the body 171*a*) for ease of understanding the elements. Accordingly, any features described for the valve 107 and/or the first housing part 171 and not described for the valve 407 and the first valve part 471** are incorporable in these latter elements.

Figure 26:
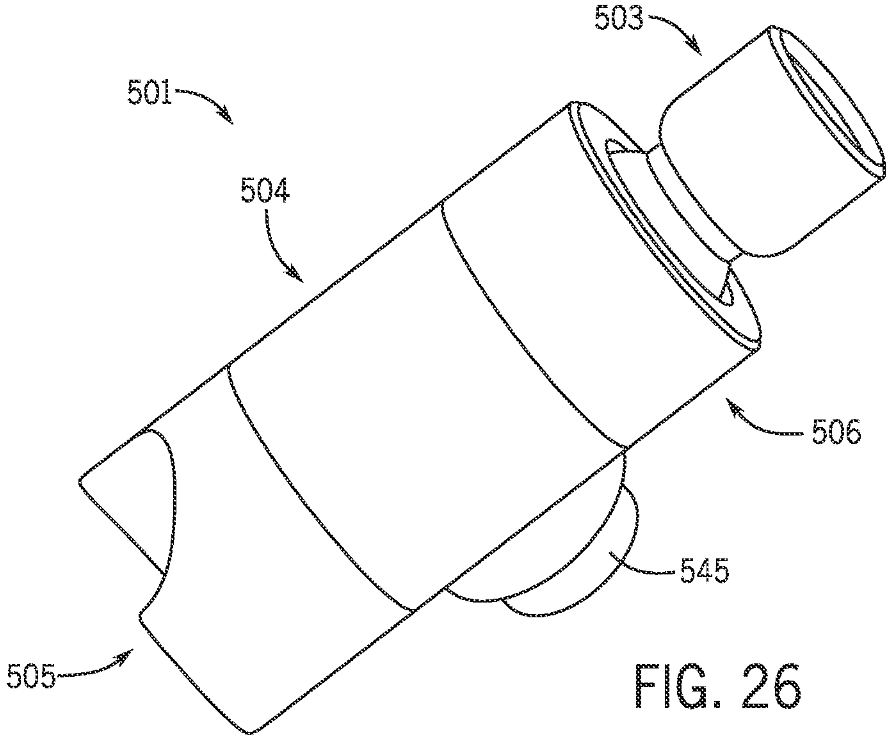
FIG. 26 is a perspective view of another embodiment of a holder.
Figure 27:
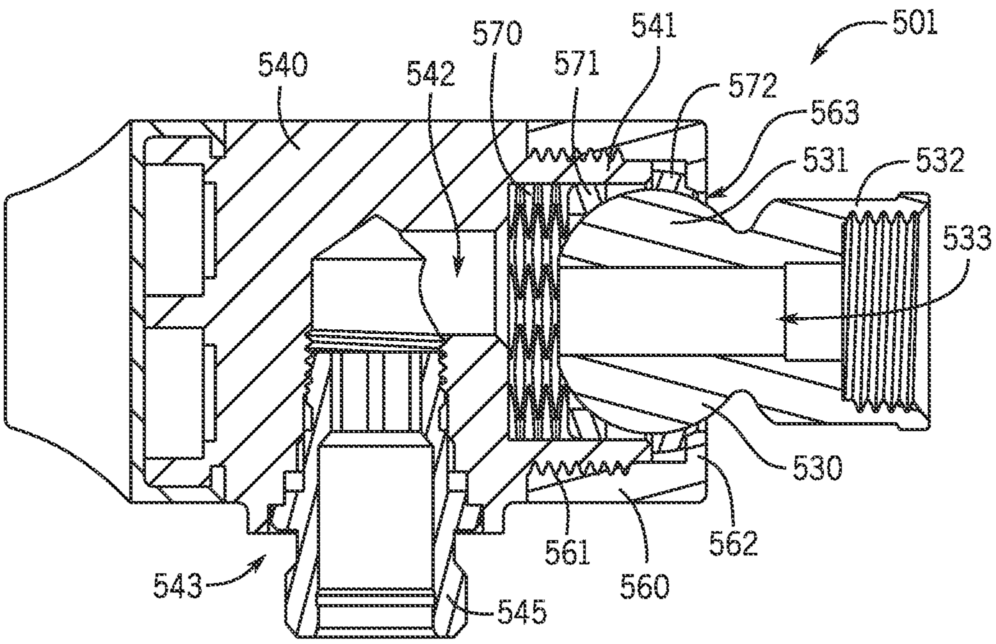
FIG. 27 is a cross-sectional view of the holder shown in FIG. 26.

FIGS. 26 and 27 illustrate another exemplary embodiment of a fixed assembly 501. The fixed assembly 501 includes an inlet assembly 503 for operatively coupling to a water pipe, a flow body 504 coupled to the inlet assembly 503 for directing water flow, a holder 505 configured to slideably receive a hand shower, and a bracket 506 for securing the flow body 504 and the inlet assembly 503 together.

As shown, the inlet assembly 503 includes a ball joint 530 having a spherical element 531 attached to a cylindrical connector 532. The cylindrical connector 532 includes internal threads that screw to an inlet pipe or other fluid delivery component. A fluid passage 533 extends through the inlet assembly 503 (e.g., the spherical element 531, the cylindrical connector 532) to supply water to the flow body 504.

As shown, the flow body 504 includes a generally annular member 540 and a threaded shoulder 541 extending from one end of the annular member 540. A fluid passage 542 opens into the threaded shoulder 541 and exits an outlet 543, which as shown receives a fluid connector 545 that detachably couples to a hose or other fluid conduit.

The holder 505 can be configured the same as or similar to any other holder disclosed herein, such as the holder 130, the holder 205, the holding assembly 305, etc. That is, a hand shower or other shower device can dock to the holder 505, such as through a magnetic coupling, and slide within the holder 505 to adjust the relative position of the hand shower or other shower device. The holder 505 rotatably couples to the flow body 504.

As shown, the bracket 506 includes an outer wall 560, in the form of a longitudinally extending sleeve having threads 561 at one end for screwing to the threaded shoulder 541. The bracket 506 includes an annular inner wall 562 extending radially inward from the end of the outer wall 560 opposite the threads, where the inner wall 562 has an opening 563 that receives the ball joint 530 of the inlet assembly 503.

Also shown in FIG. 27, a spring 570 is disposed in an inlet bore of the fluid passage 542 and exerts a force that biases a first compressible member 571 toward and into contact with a front of the spherical element 531. Also shown, a second compressible member 572 is disposed between a rear of the spherical element 531 and the inner wall 562 of the bracket 506. In this way, the spring 570 biases the first compressible member 571 into the spherical element 531, which in-turn loads the second compressible member 572 between the bracket 506 and the spherical element 531. This loading induces friction, which is tailorable to maintain the flow body 504, the holder 505, and a hand shower supported by the holder 505 in any position, in which the holder 505 moves to. The first and second compressible members 571, 572 can be made of or include a resilient/compressible material, such as an elastomer or other suitable material.

Figure 32:
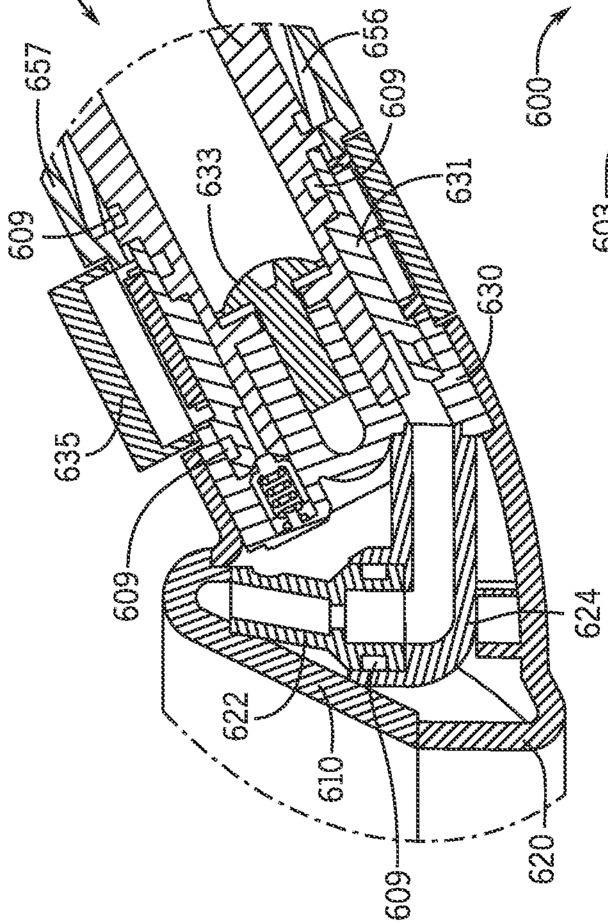
FIG. 32 is a detail view of a portion of the hand shower shown in FIG. 31.
Figure 31:
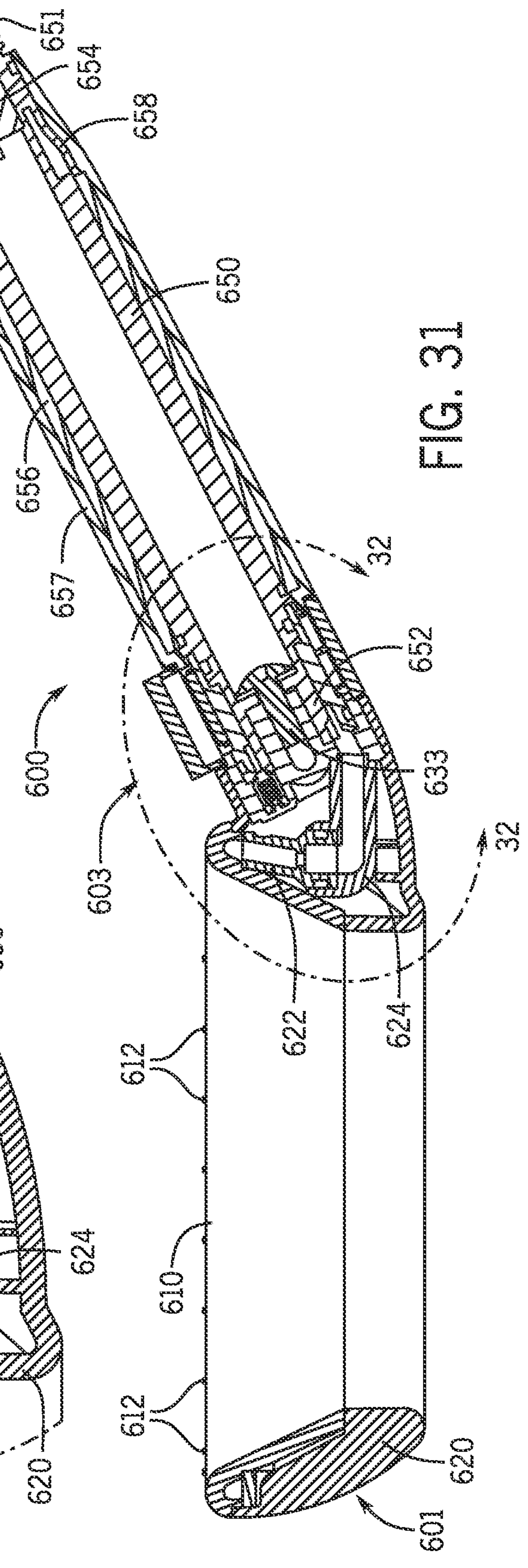
FIG. 31 is a cross-sectional view of an embodiment of a hand shower.

FIGS. 31 and 32 illustrate an embodiment of a hand shower 600 having an internal valve that controls water flow from an inlet in a handle to nozzles in a sprayface. The illustrated hand shower 600 includes a spray head 601 (e.g., spray head assembly), a valve 603 (e.g., valve assembly), and a handle 605 (e.g., handle assembly), where the valve interconnects the spray head and handle assemblies.

The illustrated spray head 601 includes a sprayface 610 and a head 620 coupled to a backside of the sprayface 610. The coupled sprayface 610 and head 620 complement one another forming an annular spray head 601 with a central opening. Disposed in a front side of the sprayface 610 are a plurality of nozzles 612 through which water discharges in one or more operational modes of the hand shower 600. Each nozzle 612 fluidly connects to the valve 603 through an internal flow path of the spray head 601, which defines by the sprayface 610 and/or the head 620, among other elements. A base of the spray head 601, which is definable by the sprayface 610 and/or the head 620, couples to the valve 603, such as through threads or another suitable fastening device/method, to secure together and fluidly connect the spray head 601 and the valve 603. As shown, the base is part of the head 620. The spray head 601 can include other components/elements, such as those discussed herein (e.g., for the spray head 148).

The illustrated hand shower 600 includes a waterway cap 622 and a connector 624 fluidly connecting the valve 603 and the spray head 601. The waterway cap 622 couples to the sprayface 610 and defines an elongated fluid bore with a venturi having a decrease in size (e.g., diameter) to increase water velocity and/or provide a pressure drop to draw air into the water stream. The connector 624 couples to the head 620 and fluidly connects a plug 630 of the valve 603 to the waterway cap 622 through a fluid bore.

As shown, the handle 605 includes an elongated hollow waterway 650 extending between and including a first or inlet end 651, which includes a threaded connection for coupling to a hose (e.g., hose 106) or other fluid conduit, and a second or outlet end 652, which is coupled to the valve 603. As shown in FIG. 31, a bore of the valve receives the outlet end 652, which couples to the plug 630 through a fastener. In this way, the waterway 650 couples to and directs water to the valve 603 through an internal fluid channel or bore extending between the inlet and outlet ends 651, 652. A flow regulator 654 is shown (in FIG. 31) retained in the inlet end 651 by a retaining clip 655.

The handle 605 can include one or more additional layers disposed around the waterway 650. As shown in FIG. 31, an intermediate layer 656 in the form of a tube including a ferromagnetic material (e.g., steel) surrounds at least a portion of the waterway 650, and an outer layer 657 in the form of an overmolded handle grip surrounds the intermediate layer 656. In this way, the steel tube can retain the handle 605 in place to a docking element through magnetic forces from one or more magnets in the docking element, while the handle grip provides improved comfort in holding the handle 605 and/or improved aesthetics. Notably, the intermediate and outer layers 656, 657 are configurable differently than that described here.

The valve 603 interconnects the handle 605 and the spray head 601 while variably controlling the flow rate of water to the spray head 601 from the handle 605. As shown best in FIG. 32, the valve 603 includes the plug 630 (e.g., a first housing part) and a valve body 631 (e.g., a second housing part). The plug 630 couples to the outlet end 652 of the waterway 650 via a screw 633, and the plug 630 fluidly connects to the connector 624. The valve body 631 is disposed around the outlet end 652 of the waterway 650 to control the flow of water to the plug 630, such as upon rotation of an actuator (e.g., control member) of the valve. The valve 603, optionally, includes a detent assembly, such as the detent assembly 180 discussed herein. If provided, the detent assembly is disposed between the plug 630, the valve body 631, and the waterway 650.

Rotation of the actuator (e.g., the control member 635) relative to the handle 605 by a user of the hand shower 600 controls operation of the valve 603. Such rotation variably adjusts a flow rate of water through the valve 603 to the spray head 601. The illustrated control member 635 is operatively coupled to and disposed around the valve body 631 and is located between the base of the spray head 601 and part of the handle 605 (e.g., an end of the outer layer 657). Rotation of the control member 635 relative to the handle 605 adjusts the flow rate of water by adjusting the valve 603, such as by rotating the valve body 631 (and/or other element(s)) relative to the plug 630. For example, rotation of the control member 635 can in-turn rotate one of first and second disks (e.g., a movable disk) relative to the other disk (e.g., a fixed disk), such as to change an overlapping area between ports in the disks to adjust flow rate between the disks. The valve body 631 can rotate with the control member 635 or remain stationary, such as with the stationary disk. Notably, the control member 635 can be configured, basically, the same as the control member 175 discussed above.

According to one example, assembly of the hand shower 600 involves the following method/process. A first step or process involves coupling the connector 624 to the plug 630, such as using a welding or other suitable process. A second step or process involves coupling the coupled plug/connector to the base of the spray head 601, such as using a welding or other suitable process to couple part of the connector 624 to the base of the head 620. A third step or process involves inserting a detent and a detent spring of the detent assembly into the pocket of the plug 630. Notably, this third step is optional, since the features may or may not be present. An optional fourth or earlier step involves lubricating and installing an O-ring 609 into a small gland of the waterway 650, one or more of the larger two glands of the waterway 650, and/or a gland of the valve body 631. A fifth or earlier step involves coupling the control member 635 to the valve body 631 by aligning alignment features (e.g., "U" shaped pockets) and sliding the control member 635 over the valve body 631. A sixth or earlier step involves sliding the coupled valve body 631 and control member 635 onto the outlet end 652 of the waterway 650, then aligning the coupled subassembly to the plug 630 via splines and pressing them together until the waterway 650 fully seats onto the plug 630. A seventh or earlier step involves coupling the plug 630 and the waterway 650 together using the screw 633. During this step, an optional washer (e.g., a fiber washer) can be inserted onto the threaded portion of the screw 633 prior to inserting the screw 633 through the bore in the waterway 650 and threading it into a threaded bore in a boss in the plug 630. An eighth or earlier step involves aligning the coupled intermediate and outer layers 656, 657 (e.g., the handle grip over-molded onto the steel tube) with the waterway 650 through alignment features (e.g., polygonal, octagonal inner/outer profiles, etc.). Then the coupled intermediate and outer layers 656, 657 slide onto the waterway 650 until two retaining barbs 658 of the waterway 650 snap into recesses in the over-molded handle grip sub-assembly to retain the handle grip onto the waterway 650. A ninth or earlier step involves installing the flow regulator 654 and the retaining clip 655 into the inlet end 651 of the waterway 650. A tenth or earlier step involves coupling the waterway cap 622 to the sprayface 610, such as using a welding or other suitable process. An optional eleventh step involves lubricating and installing an O-ring 609 into a gland of the waterway cap 622. A twelfth or earlier step involves assembling the sprayface sub-assembly to the other sub-assembly, such as by inserting a stem of the waterway cap 622 into an outlet pocket of the plug 630 and coupling the sprayface 610 to the head 620, such as through snap features or other mechanical fasteners, and/or non-mechanical fasteners (e.g., adhesives).

Figure 33:
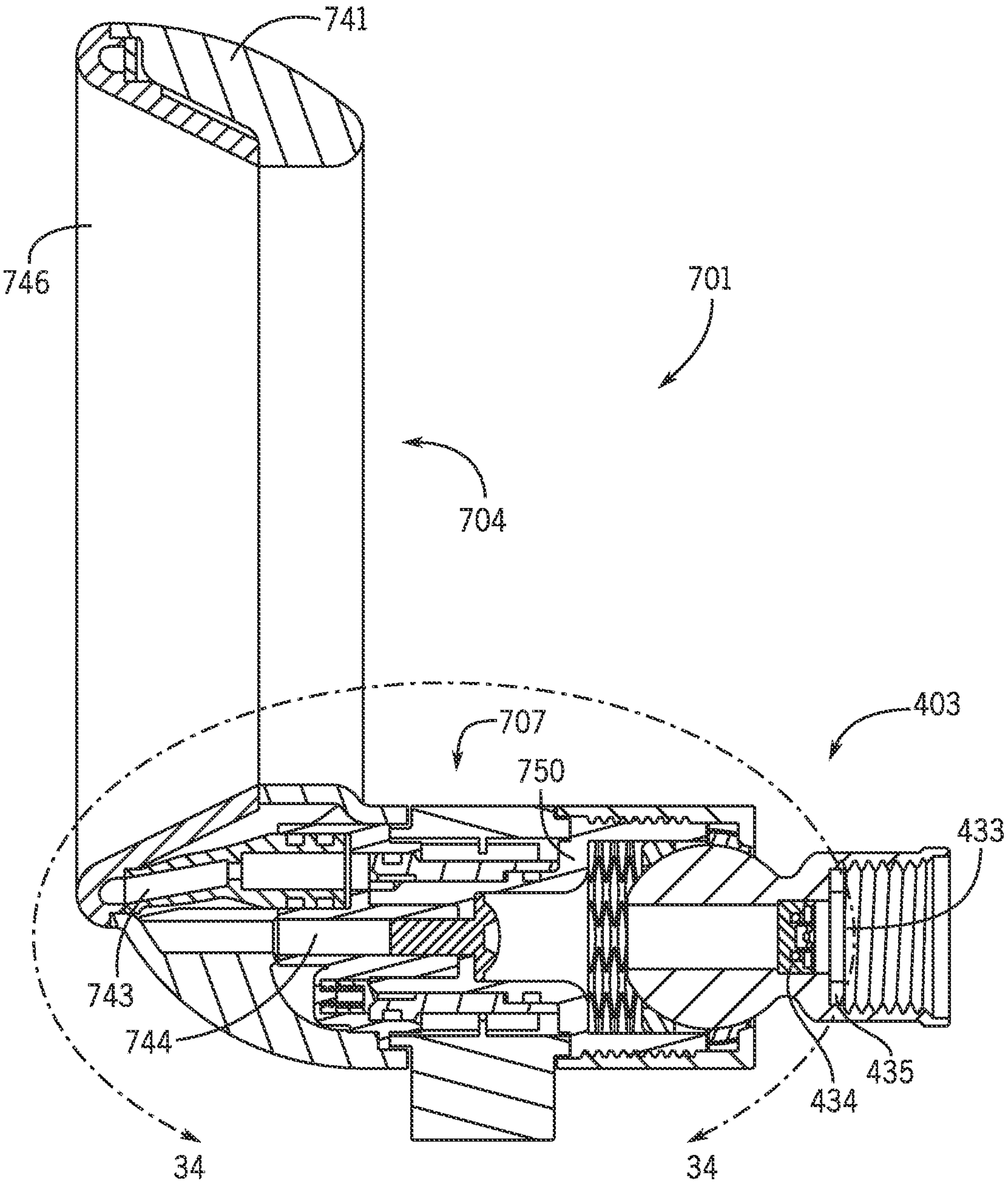
FIG. 33 is a cross-sectional view of an embodiment of a showerhead.
Figure 34:
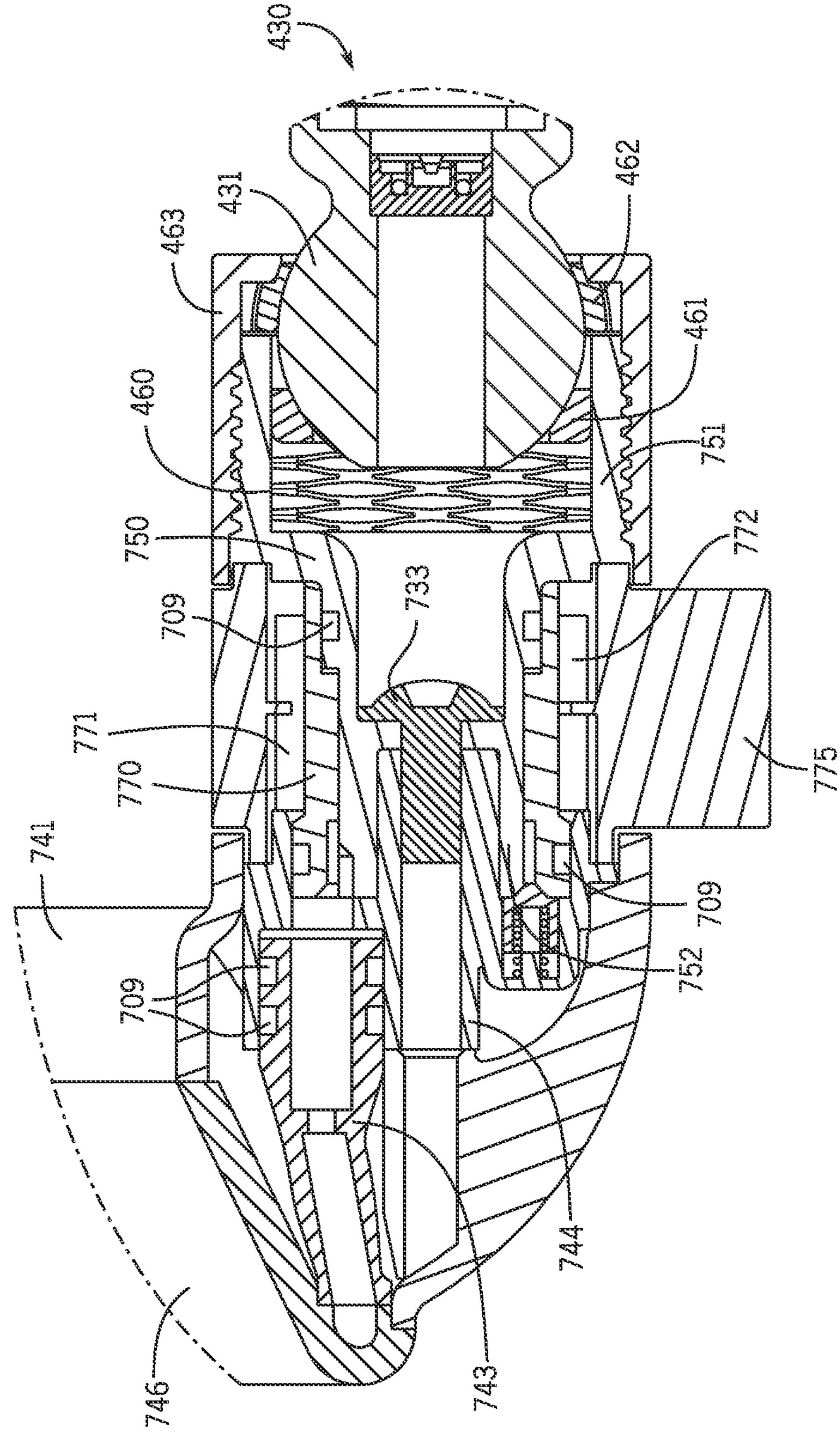
FIG. 34 is a detail view of a portion of the showerhead shown in FIG. 33.

FIGS. 33 and 34 illustrate an exemplary embodiment of a showerhead 701 that is mountable to an inlet (e.g., the inlet pipe 90' shown in FIG. 9), a handrail (e.g., the handrail 301 shown in FIG. 6), or another suitable fluid delivery component. The illustrated showerhead 701 includes an inlet assembly 403, a spray head 704, and a valve 707 interconnecting the inlet assembly 403 and the spray head 704. The configuration of the illustrated inlet assembly 403 is the same as that described above for FIG. 11. Thus, the inlet assembly 403 includes a ball joint 430 pivotally coupling the showerhead 701 to a fluid delivery component through free rotation, including a full 360° (three-hundred and sixty degrees) rotation about a longitudinal axis of the fluid passage 433 and pivoting about the spherical element 431 of the ball joint 430. A flow regulator 434 and a screen 435, which filters particulates over a predetermined size, are disposed in the fluid passage 433 of the inlet assembly 403.

Also shown, a bracket 463 threads to an inlet end of a waterway 750 thereby pivotally securing the waterway 750 and the valve 707 to the spherical element 431 of the ball joint 430, such that the spray head 704 is freely rotatable about the ball joint 430. The illustrated showerhead 701 includes a biasing member or spring 460, a first compressible member 461, and a second compressible member 462 operatively coupled to the waterway 750 via the bracket 463. The spring 460 is disposed in a bore of the waterway 750 and exerts a force that biases the first compressible member 461 toward and into contact with a front of the spherical element 431. The second compressible member 462 is disposed between a rear of the spherical element 431 and an inner wall of the bracket 463. In this way, the spring 460 biases the first compressible member 461 into the spherical element 431, which in-turn loads the second compressible member 462 between the bracket 463 and the spherical element 431. This loading induces friction, which is tailorable to maintain the spray head 704 in any moved position by a user. The first and second compressible members 461, 462 can be made of or include a resilient/compressible material, such as an elastomer or other suitable material.

The illustrated spray head 704 includes a head 741 (e.g., body, rear body, etc.) and a sprayface 746 mounted on the head 741. The head 741 includes an annular portion, which supports the sprayface 746 and together define a fluid passage for delivering water to nozzles of the sprayface 746, and a base, which couples the spray head 704 to the valve 707. A waterway cap 743 and a plug 744 direct water from the valve 707 to the fluid passage of the spray head 704. The waterway cap 743 is located in the base of the head 741, is in fluid communication with the fluid passage, and includes a venturi, which is similar to those described above. The plug 744 is located in the base of the head 741 and is in fluid communication with the waterway cap 743 and the valve 707. A detent assembly, such as the detent assembly 180 discussed herein, can be disposed in the showerhead 701, such as between the plug 744, the valve body 770, and the waterway 750.

The valve 707 of the showerhead 701 controls the flow of water from the waterway 750 to the spray head 704. As shown in FIG. 34, the waterway 750 includes an inlet end 751 and an outlet end 752. The inlet end 751 fluidly connects to the inlet assembly 403 and threads to the bracket 463. The outlet end 752 extends to the plug 744. A screw 733 secures the waterway 750, such as part of the outlet end 752, to the plug 744. The valve body 770 surrounds the outlet end 752 of the waterway 750, and a control member 775 surrounds and operatively couples to the valve body 770. Rotation of the control member 775 relative to the waterway 750 variably adjusts a flow rate of water through the valve 707 to the spray head 704. For example, rotation of the control member 775 can in-turn rotate the valve body 770 relative to the outlet end 752 to align/misalign exit ports in the outlet end 752 with inlet ports, which are defined at least in part by the valve body 770. When misaligned (e.g., by no overlapping area of the ports), no or very little water flows to the inlet ports from the exit ports. When fully aligned (e.g., by a maximum overlapping area of the ports), a maximum amount of water flows to the inlet ports from the exit ports. Upon rotation of the valve body 770 from the fully aligned, which can correspond to a first position, toward the misaligned, which can correspond to a second position, the flow of water decreases. According to at least one embodiment, the valve body 770 is infinitely configurable in any position between the first and second positions thereby providing variable flow adjustment of water to the spray head 704. According to other embodiments, the valve 707 is configurable having a plurality of disks, such as that discussed above.

According to at least one embodiment, assembly of the showerhead 701 involves the following method/process. A first step (e.g., first process) involves inserting and coupling the plug 744 into the base of the head 741. A second step involves inserting a detent and a detent spring of the detent assembly, if provided, into the pocket of the plug 744. This step is optional, since the features can be included or left out of the showerhead assembly. An additional optional third or earlier step involves lubricating and installing an O-ring 709 into a gland of the valve body 770 and/or a gland of the waterway 750. A fourth or earlier step involves sliding the control member 775 onto the valve body 770, such as by aligning features (e.g., "U" shaped pockets) to clock these elements. A fifth or earlier step involves sliding the coupled valve body 770 and control member 775 onto the outlet end 752 of the waterway 750, then this sub-assembly is aligned to the plug 744 via splines and pressed together until the waterway 750 is fully seated onto the plug 744. A sixth or earlier step involves inserting the screw 733 through a hole in the waterway 750 to secure the waterway 750 to the plug 744 with the valve components retained therebetween. The screw 733 can thread directly to the plug 744 or pass through a clearance hole in the plug 744 and threads directly into a boss (e.g., threaded bore therein) in the spray head 704 (e.g., the base of the head 741). An optional washer (e.g., fiber washer) can be is inserted onto the shank of the screw 733 prior to assembly to be positioned between the head of the screw 733 and the waterway 750 after assembly. A seventh or earlier step involves inserting the wave spring 460 and the first compressible member 461 (e.g., packing seal) into a bore/pocket in the waterway 750. An eighth or earlier step involves placing the second compressible member 462 (e.g., a bushing) onto the ball joint 430, then inserting them into the bracket 463. A ninth or earlier step involves coupling the coupled ball joint 430 and bracket 463 sub-assembly to the waterway 750 by threading the bracket 463 over threads on the waterway 750. A tenth or earlier step involves coupling the waterway cap 743 to the sprayface 746, such as using a welding or other suitable process. An optional O-ring can be lubricated and installed into any glands of the waterway cap 743 (two are shown in FIG. 34). Lastly, the waterway cap 743 and sprayface 746 sub-assembly couples to the sub-assembly including the remaining elements, such as by inserting a stem of the waterway cap 743 into an outlet pocket of the plug 744. Snap features or other fasteners retain the sprayface assembly to the sub-assembly including the remaining elements.

Figure 35:
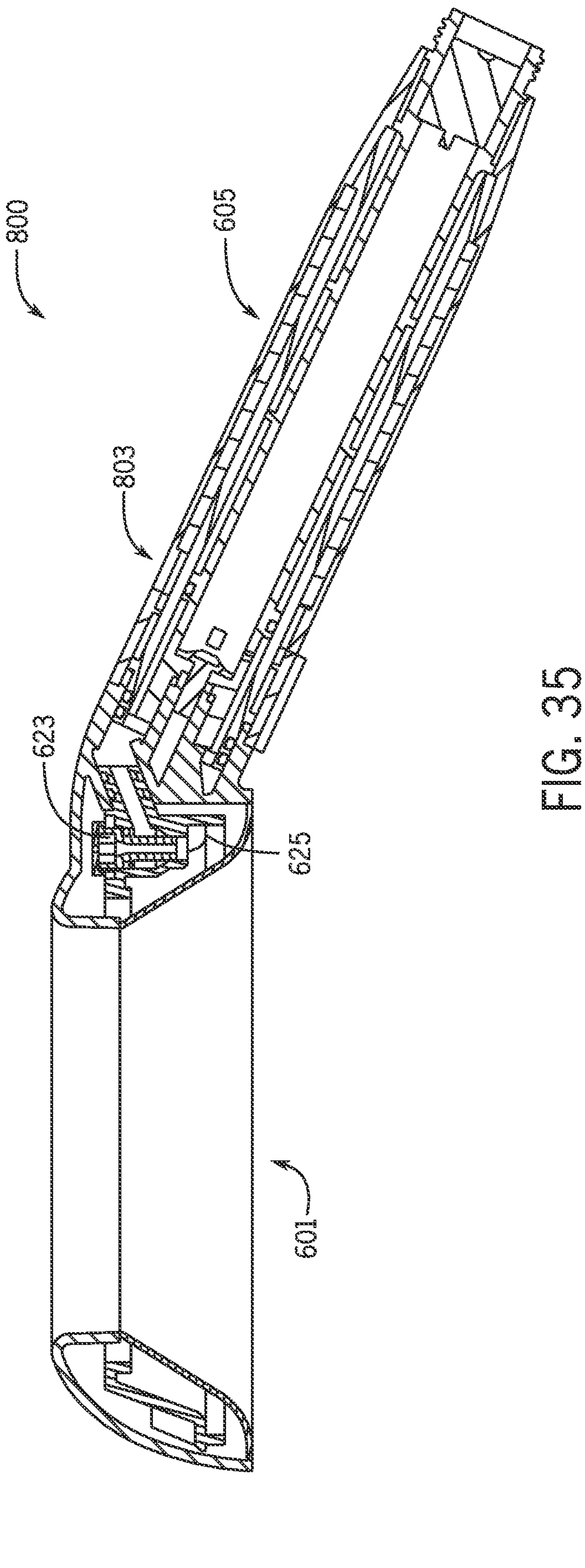
FIG. 35 is a cross-sectional view of an embodiment of a hand shower.
Figure 36:
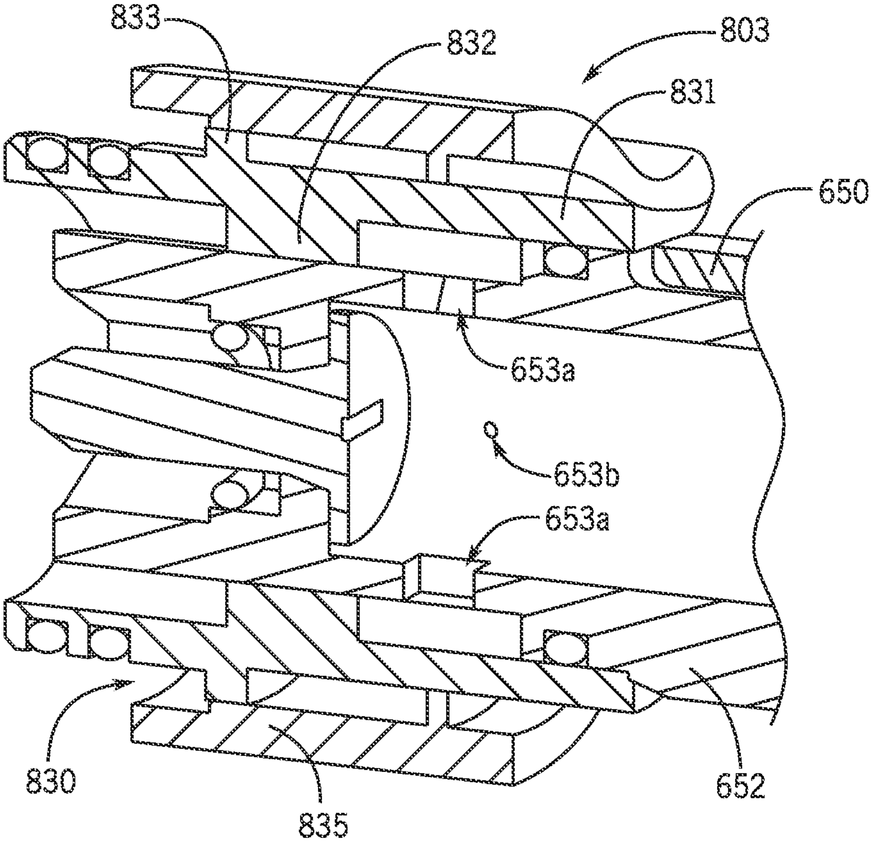
FIG. 36 is a cross-sectional view of a portion of the hand shower shown in FIG. 36.

FIGS. 35-39 illustrate an exemplary embodiment of a hand shower 800, which includes a spray head 601 and a handle 605 (e.g., handle assembly), each of which is similar to or the same as discussed above, except as noted. For example, the spray head 601 includes an air induction element 623 that introduces air into the fluid stream flowing to the nozzle, such as to provide a "Katalyst" spray. As shown in FIG. 35, the air induction element 623 couples to a connector 625 having an inlet, which fluidly connects to an outlet of the valve, and an outlet, which fluidly connects to the nozzles in the spray head 601. Also for example, the waterway 650 of the handle 605 includes at least one port for directing water flow. As shown in FIG. 36, the outlet end 652 of the waterway 650 includes a pair of opposing ports 653*a* (e.g., apertures, openings, etc.) for directing water flow. The waterway 650 may, optionally, include one or more bleed holes 653*b*, such as the bleed hole 653*b* shown in FIG. 36.

Figure 37:
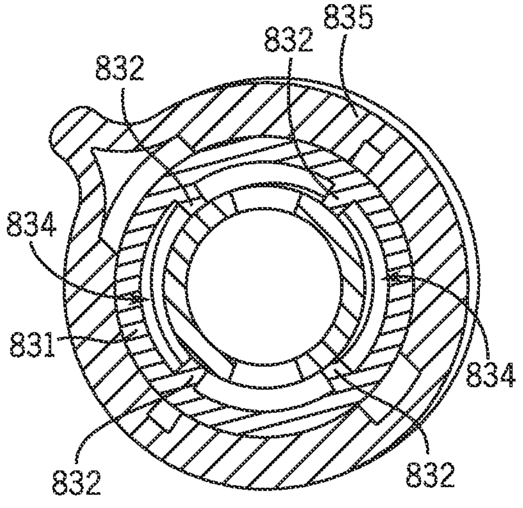
FIG. 37 is a cross-sectional view of a portion of the hand shower shown in FIG. 36.

The hand shower 800 includes a valve 803 having a valve body 830 that surrounds at least port of the outlet end 652 of the waterway 650. As shown in FIGS. 36-39, the valve body 830 includes an elongated wall 831, an inner projection 832, and an outer shoulder 833, which cooperates with a control member, if provided. The wall 831 extends in a longitudinal direction and surrounds the portion of the outlet end 652 having the ports 653*a*. As shown in FIG. 36, the wall 831 includes two channels extending radially inward from an outer surface of the wall 831, where each channel receives one O-ring for sealing the valve 803 with the spray head 601. As shown in FIGS. 36 and 37, the valve body 830 includes four inner projections 832 extending radially inwardly from four spaced apart locations along an inner surface of the wall 831. The four projections 832 form two pairs of projections 832, where each pair cooperates to retain an associated seal (e.g., an EPDM), which is shown having a semi-annular shape and is located between the wall 831 and the waterway 650. Each seal rotates with the valve body 830 (e.g., relative to the waterway 650) to seal one of the two ports 653*a* in a closed position (e.g., a second position) and to completely/fully unseal the associate port 653*a* in a full open position (e.g., first position). Thus, each seal aligns with and fully covers the associated port 653*a* in the closed position; and each seal fully misaligns with and fully uncovers the associated port 653*a* in the full open position. Rotation of the valve body 830 between these positions causes each seal to partially misalign with and partially uncover the associate port 653*a* thereby allowing a metered flow between full flow and no or very little flow. Also shown in FIG. 37, the projections 832 define with the waterway 650 a fluid path 834 that is associated with each port 653*a*. In the full open position, each fluid path 834 aligns with (e.g., over, radially in-line with, etc.) its associated port 653*a* allowing water to exit the port 653*a* into the fluid path 834.

The valve 803 also includes control member 835, which is the same as or similar to the control member 635. The control member 835 surrounds and operatively couples to the valve body 830, such that rotation of the control member 835 relative to the waterway 650 variably adjusts a flow rate of water through the valve 803 to the spray head 601. Rotation of the control member 835 in-turn rotates the valve body 830 relative to the waterway 650 to align/misalign the (exit) ports 653*a* in the outlet end 652 with the seals and/or the fluid paths 834. When the ports 653*a* are aligned with the seals (and misaligned with the fluid paths 834), no or very little water flows to the inlet ports from the exit ports. "Very little water" generally means a flow of less than or equal to 0.5 gpm at approximately 80 psi, which is the definition of a "pause mode" in plumbing. For embodiments having the optional bleed hole(s) 653*b*, a flow of up to 0.5 gpm is achievable through the bleed hole(s) when the seals align with the ports 653*a*. When the fluid paths 834 fully align with the ports 653*a*, a maximum amount of water flows to each fluid path 834 from the associated exit port 653*a*. Upon rotation of the valve body 830 from full alignment, which corresponds to the first position, toward misalignment, which corresponds to the second position, the flow of water decreases. According to at least one embodiment, the valve body 830 is infinitely configurable in any number of positions between the first and second positions thereby providing variable flow adjustment of water to the spray head 601. According to other embodiments, the valve 803 can include any number of hard stops between the first and second positions, which can correspond to a predetermined flow rate. For example, the valve 803 can utilize a detent assembly, such as disclosed above, to provide such hard stops. Also for example, one of the valve body 730 and the waterway 650 can include a projection extending radially toward the other element to engage one or more dimples in the other element in preset intermediate positions.

Figure 38:
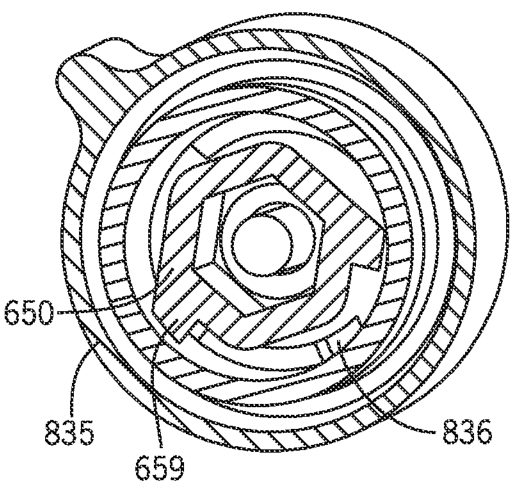
FIG. 38 is a cross-sectional view of a portion of the hand shower shown in FIG. 36.
Figure 39:
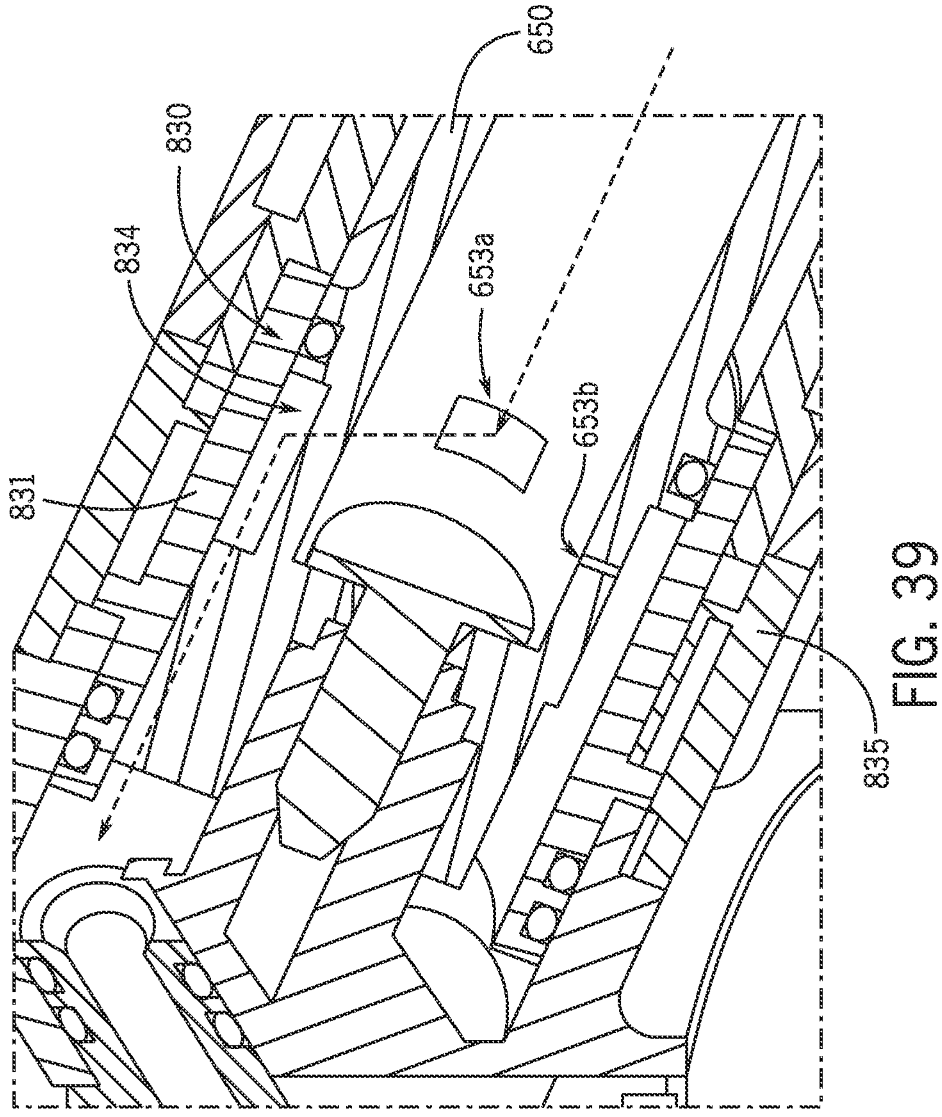
FIG. 39 is a cross-sectional view of a portion of the hand shower shown in FIG. 36.

One or more control stops can be employed to control (e.g., limit) movement of the valve body 830 relative to the waterway 650. As shown in FIG. 38, the waterway 650 includes two control stops 659 that cooperate with a projection 836, which extends radially inward from the wall 831, to limit rotational travel of the valve body 830 relative to the waterway 650. Each control stop 659 is in the form of a tab or ear that contacts the projection 836 in one of the first or second positions. As shown, the projection 836 limits rotation of the valve body 830 to approximately 60° (e.g., 30° in each rotational direction away from top dead center). Further, each projection 836 corresponds to one position (e.g., full open, paused or closed).

Figure 40:
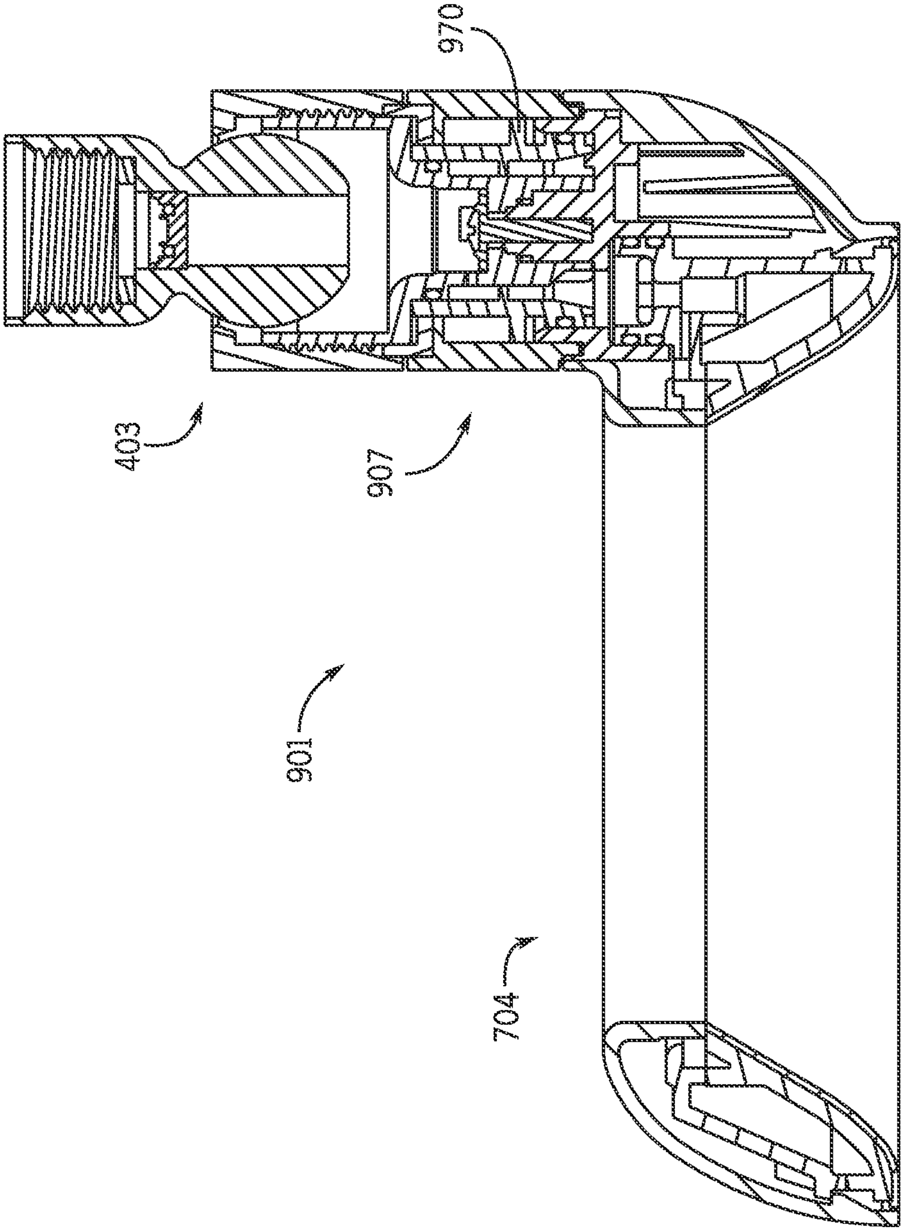
FIG. 40 is a cross-sectional view of an embodiment of a showerhead.
Figure 42:
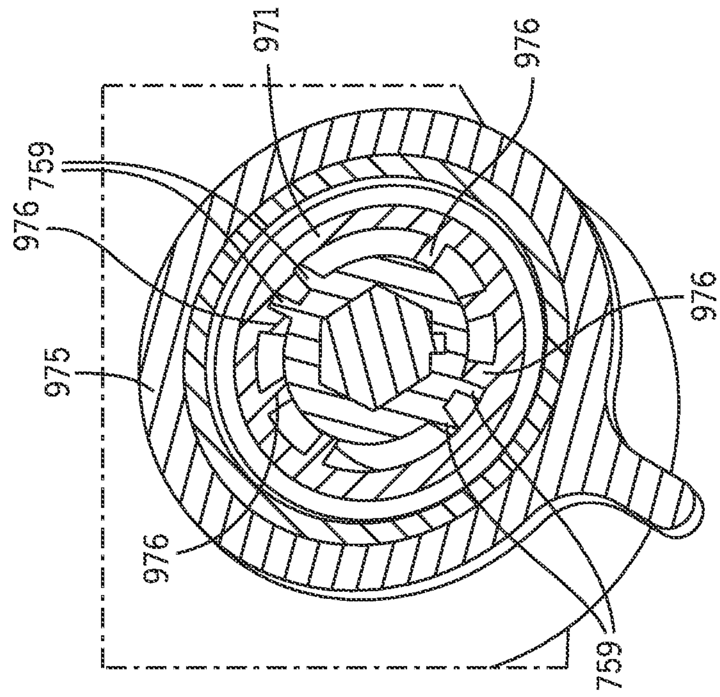
FIG. 42 is a cross-sectional view of a portion of the showerhead shown in FIG. 40.
Figure 41:
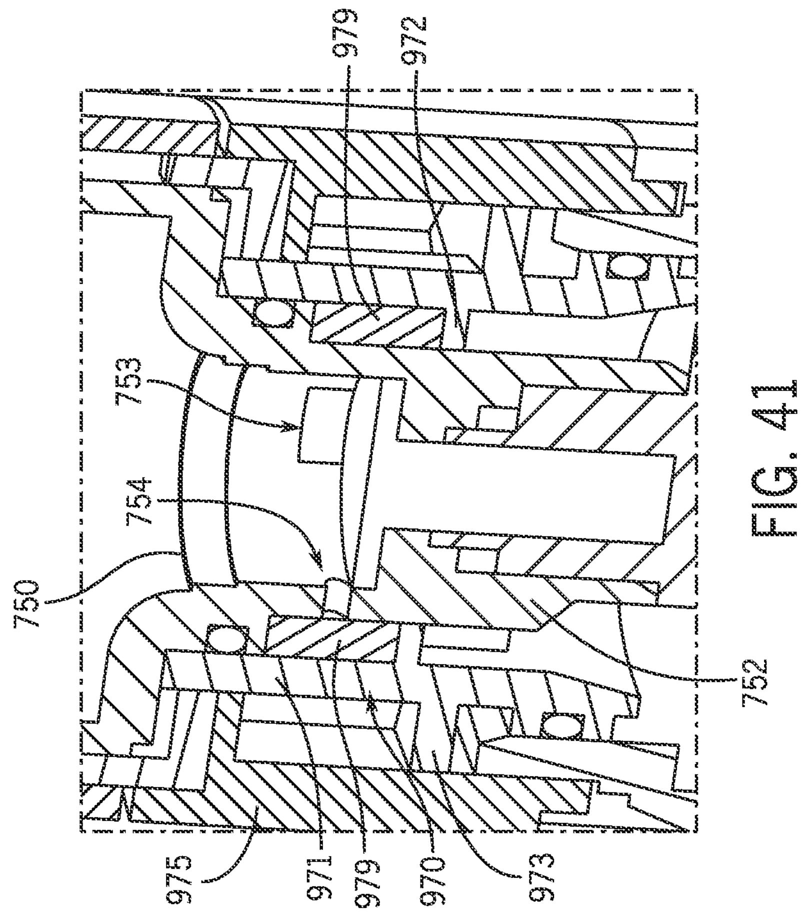
FIG. 41 is a cross-sectional view of a portion of the showerhead shown in FIG. 40.

FIGS. 40-42 illustrate an exemplary embodiment of a showerhead 901, which includes a spray head 704 and an inlet assembly 403, each of which is similar to or the same as discussed above, except as noted. For example, the showerhead, optionally, includes an air induction element. Also for example, the waterway 750 includes at least one port for directing water flow into the valve. As shown in FIG. 41, the waterway 750 includes a port 753 (e.g., exit port, aperture, opening, etc.) extending through a wall of the waterway 750. The waterway 750 may include more than one port, such as a pair of opposing ports 753 for directing water flow to the valve. The waterway 750, optionally, includes one or more bleed holes 754, such as the bleed hole 754 shown in FIG. 41.

The showerhead 901 includes a valve 907 having a valve body 970 surrounding at least part of the outlet end 752 of the waterway 750. As shown in FIGS. 41 and 42, the valve body 970 includes an elongated wall 971, an inner projection 972, and an outer shoulder 973. The outer shoulder 973 can cooperate with a control member thereby operatively coupling the valve body 970 and the control member. The wall 971 extends in a longitudinal direction and surrounds the portion of the outlet end 752 having the ports 753. According to at least one embodiment, the valve body 970 includes four inner projections 972 extending radially inwardly from four spaced apart locations along an inner surface of the wall 971. The four projections 972 form two pairs of projections 972, where each pair cooperates to retain an associated seal 979 (e.g., an EPDM), which has a semi-annular shape and is disposed between the wall 971 and the waterway 750. Each seal 979 rotates with the valve body 970 (e.g., relative to the waterway 750) to seal one of the two ports 753 in a closed position (e.g., a second position) and to completely/fully unseal the associate port 753 in a full open position (e.g., first position). Thus, each seal 979 aligns with and fully covers the associated port 753 in the closed position; and each seal 979 fully misaligns with and fully uncovers the associated port 753 in the full open position. Rotation of the valve body 970 between these positions causes each seal 979 to partially misalign with and partially uncover the associate port 753 thereby allowing a metered flow between full flow and no or very little flow. The projections 972 together with the waterway 750 define a fluid path 974 that is associated with each port 753. In the full open position, each fluid path 974 aligns with (e.g., over, radially in-line with, etc.) its associated port 753 allowing water to exit the port 753 into the fluid path 974.

The valve 907 also includes control member 975, which is the same as or similar to the control member 775. The control member 975 surrounds and operatively couples to the valve body 970, such that rotation of the control member 975 relative to the waterway 750 variably adjusts a flow rate of water through the valve 907 to the nozzles in the showerhead 901. Rotation of the control member 975 in-turn rotates the valve body 970 relative to the waterway 750 to align/misalign the (exit) ports 753 with the seals 979 and/or the fluid paths 974. When the ports 753 are aligned with the seals 979 (and misaligned with the fluid paths 974), no or very little water flows to the inlet ports from the exit ports. For embodiments having the optional bleed hole(s) 754, a flow of up to 0.5 gpm is achievable through the bleed hole(s) when the seals 979 align with the ports 753. When the fluid paths 974 fully align with the ports 753, a maximum amount of water flows to each fluid path 974 from the associated exit port 753. Upon rotation of the valve body 970 from full alignment, which corresponds to the first position, toward misalignment, which corresponds to the second position, the flow of water decreases. According to at least one embodiment, the valve body 970 is infinitely configurable in any number of positions between the first and second positions thereby providing variable flow adjustment of water to the showerhead 901. According to other embodiments, the valve 907 can include any number of hard stops between the first and second positions, where each hard stop corresponds to a predetermined flow rate.

One or more control stops can be employed to control (e.g., limit) movement of the valve body 970 relative to the waterway 750. As shown in FIG. 42, the waterway 750 includes two control stops 759 that cooperate with projections 976, which extends radially inward from the wall 971, to limit rotational travel of the valve body 970 relative to the waterway 750. Each control stop 759 is in the form of a tab or finger that contacts the projection 976 in one of the first or second positions. The projections 976 limit rotation of the valve body 970 by a predetermined rotational angle.

Figure 47:
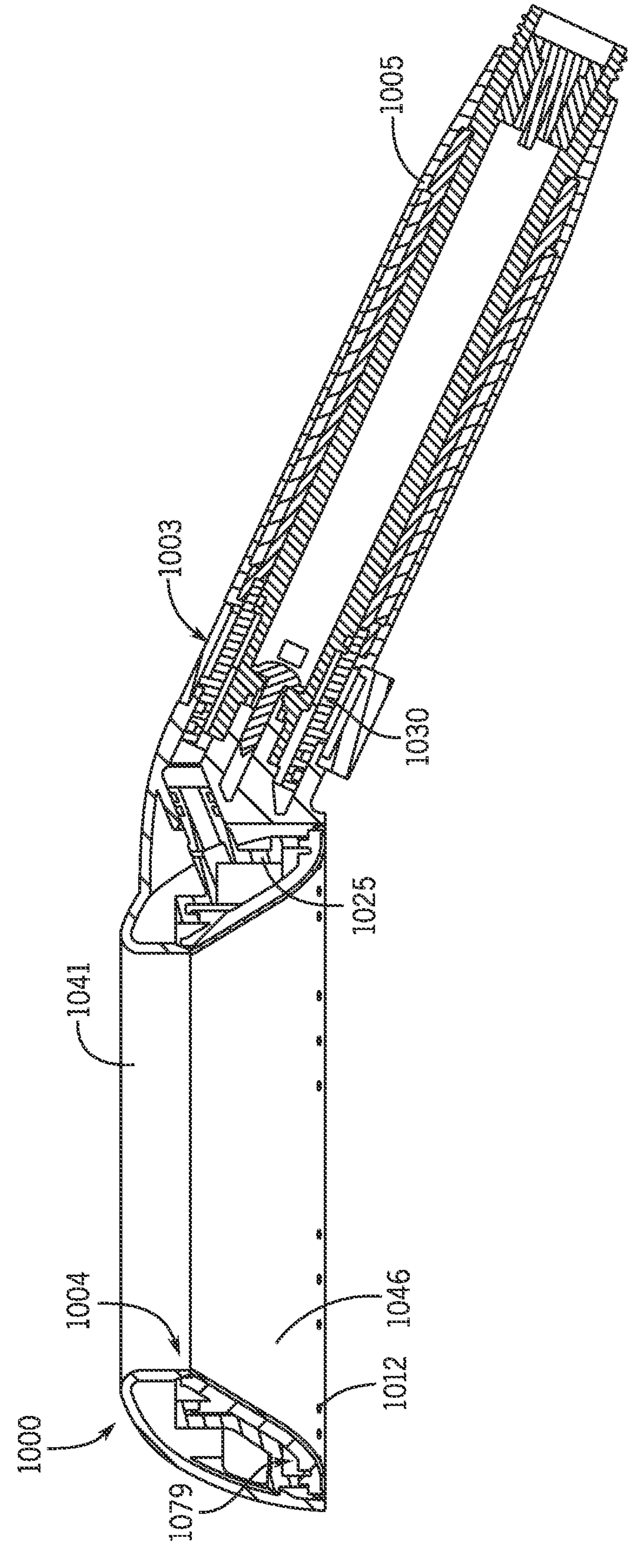
FIG. 47 is a side cross-sectional view of the hand shower of FIG. 45.
Figure 48:
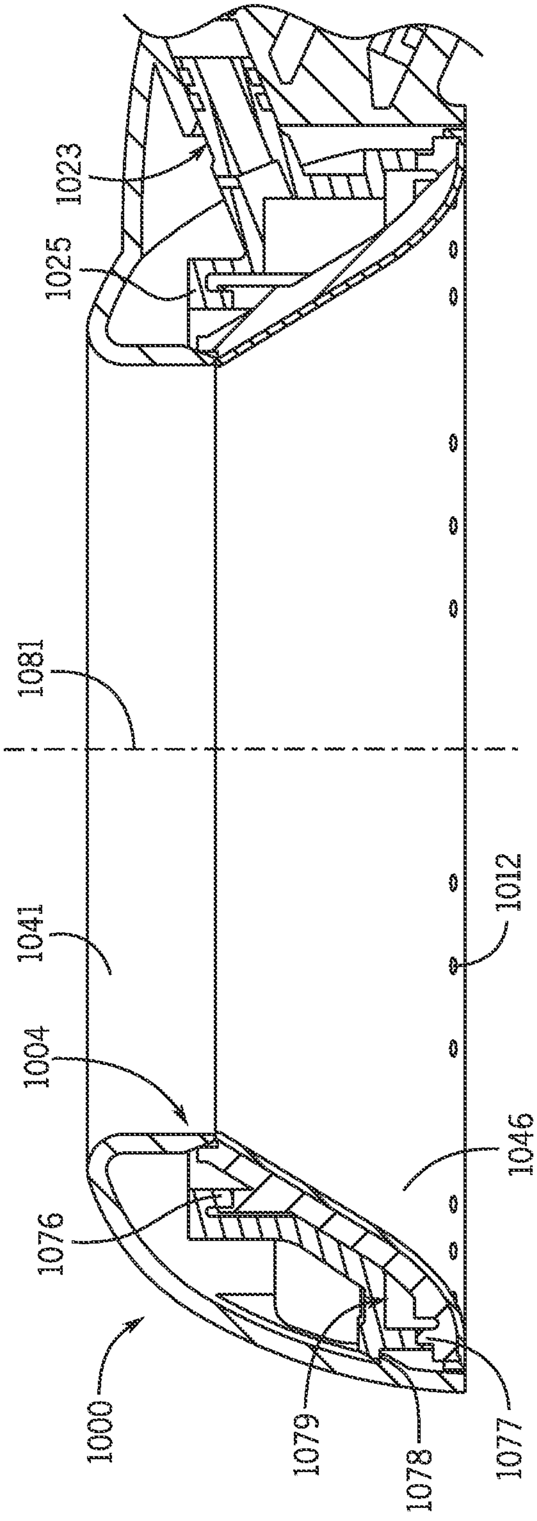
FIG. 48 is a side cross-sectional view of a spray head portion of the hand shower of FIG.

The design of the various components of the hand showers and showerheads described above should not be considered limiting. Many combinations and alterations are possible without departing from the inventive concepts disclosed herein. For example, FIGS. 45-53 show a hand shower 1000 that includes a single piece venturi. The hand shower 1000 also includes a modified sprayface 1046 design to improve aim consistency of the water delivered from the hand shower 1000. The hand shower 1000 includes a spray head 1004, a handle 1005 (e.g., handle assembly), and a valve 1003. The valve 1003 includes a rotatable valve body 1030 that is of similar construction to the valve 803 described with reference to FIGS. 36-39. As shown in FIGS. 47-48, the spray head 1004 includes a head 1041 (e.g., body, rear body, outer body, etc.); a sprayface 1046 mounted to the head 1041; and a base, which couples the spray head 1004 to the valve 1003. The spray head 1004 also includes a connector 1025 (e.g., inner body, etc.) that is “sandwiched” or otherwise disposed between the head 1041 and the sprayface 1046 and facilitates coupling between the head 1041 and the sprayface 1046.

Figure 49:
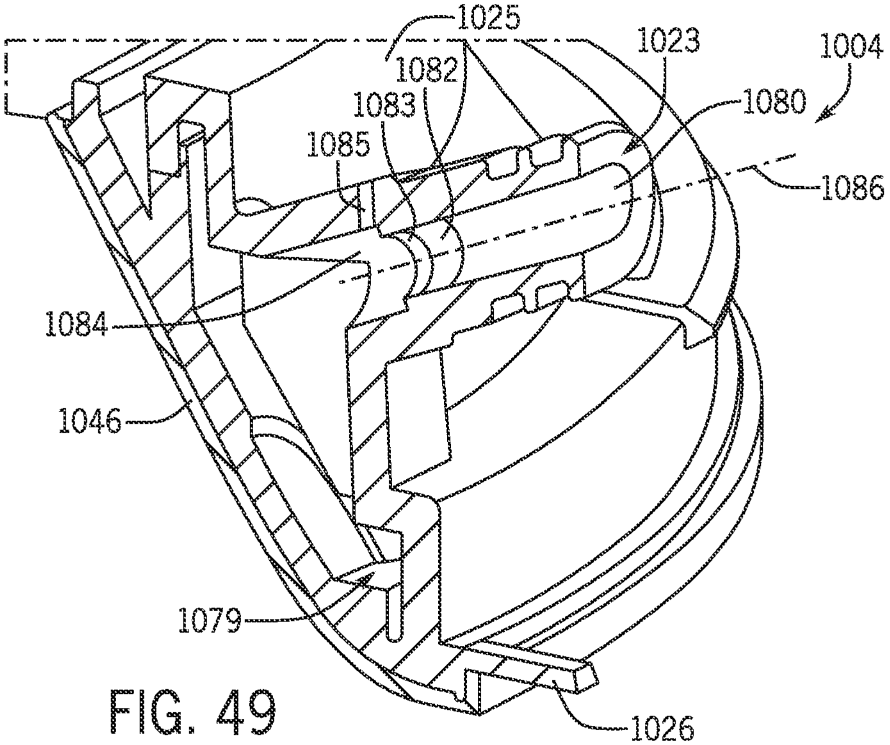
FIG. 49 is a partial perspective view of a venturi portion of the hand shower of FIG. 45.

As shown in FIG. 48, the connector 1025 is welded (e.g., friction welded, spin welded, etc.) to the sprayface 1046 in at least two locations, forming an upper weld joint 1076 that extends in a circumferential direction along a perimeter of the sprayface 1046 near an upper end of the sprayface 1046; and a lower weld joint 1077 that extends in a circumferential direction along a perimeter of the sprayface 1046 near a lower end of the sprayface 1046. In some embodiments, as shown in FIG. 49, the sprayface 1046 also includes at least one alignment element, shown as tab 1026 to facilitate alignment between the connector 1025 and the sprayface 1046 prior to the welding operation. In some embodiments, the tab 1026 is removed after welding (e.g., prior to assembly of the head 1041 to the sprayface 1046, etc.). As shown in FIG. 48, the head 1041 is engaged with the sprayface 1046 at both an inner perimeter edge and an outer perimeter edge of the sprayface 1046 by means of snap fits via connector 1025. A chamfered perimeter ledge of connector 1025 engages with one or more tangs 1078 (e.g., tab, latch, etc.) extending from an inside perimeter of the head 1041.

As shown in FIGS. 47-48, the sprayface 1046 and the connector 1025 together form a ring-shaped fluid passage 1079 that extends in a circumferential direction within the spray head 1004. The connector 1025 is structured to (i) receive water from the valve 1003, (ii) introduce and mix a flow of ambient air into the water entering the fluid passage 1079, and (iii) direct the air-water mixture through the fluid passage 1079 and into nozzles 1012 in the sprayface 1046. As shown in FIG. 48, the connector 1025 includes a venturi, shown as air induction element 1023 that is integrally formed with the connector 1025 as a single unitary body. The air induction element 1023 extends away from the connector 1025 at an oblique angle relative to a central axis 1081 of the spray head 1004. In other embodiments, the connector 1025 extends away from the connector 1025 in a substantially axial direction relative to the central axis 1081

(e.g., parallel to the central axis 1081) or a substantially radial direction relative to the central axis 1081 (e.g., perpendicular to the central axis 1081).

The air induction element 1023 fluidly connects the connector 1025 to an outlet of the valve 1003 and routes water from the valve 1003 into the fluid passage 1079. As shown in FIG. 49, the air induction element 1023 defines a pill-shaped inlet passage 1080 that extends between an inlet of the air induction element 1023 and an orifice 1082 (e.g., a restriction downstream of the inlet passage 1080). According to an exemplary embodiment, the orifice 1082 is an abrupt change in cross-sectional diameter of the inlet passage 1080. In the embodiment of FIG. 49, the orifice 1082 is a wall that includes a circular opening 1083. The wall separates the inlet passage 1080 from an outlet passage 1084, which has a larger inner diameter than the circular opening 1083, and routes water from the circular opening 1083 into the fluid passage 1079. As shown in FIG. 49, each of the inlet passage 1080, the orifice 1082, and the outlet passage 1084 are positioned in substantially coaxial arrangement. However, it will be appreciated that the orifice 1082 and/or outlet passage 1084 may be arranged off-center from the inlet passage 1080 in various exemplary embodiments.

Figure 50:
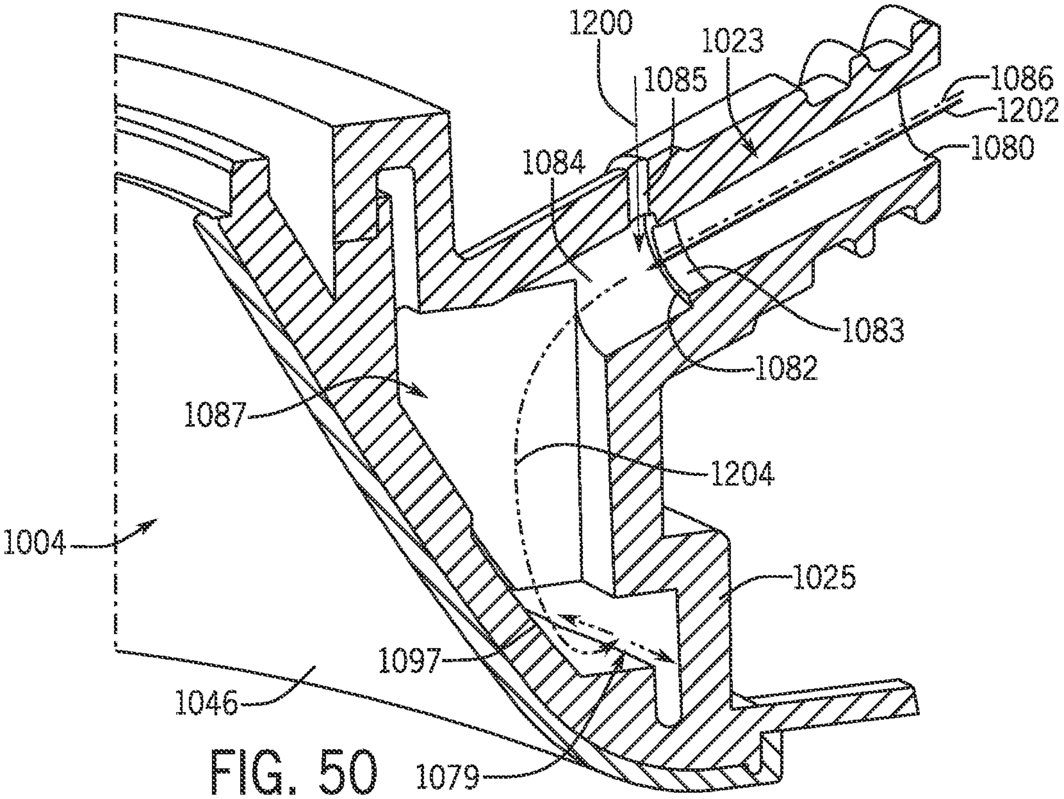
FIG. 50 is another partial perspective view of the venturi portion of FIG. 49.

According to an exemplary embodiment, the air induction element 1023 is configured to introduce ambient air into the water entering the connector 1025. As shown in FIGS. 49-50, the air induction element 1023 includes a cross-hole opening 1085 that extends from the outlet passage 1084 through the connector 1025 in a substantially radial direction relative to a central axis 1086 of the air induction element 1023 (e.g., in substantially parallel orientation relative to the central axis 1081 of the spray head 1004). The cross-hole opening 1085 is disposed immediately downstream of the orifice 1082 and fluidly connects the outlet passage 1084 to an environment surrounding the spray head 1004. In particular, the cross-hole opening 1085 fluidly connects the outlet passage 1084 to a hollow space formed between the head 1041 and the connector 1025 (see FIG. 48).

Figure 51:
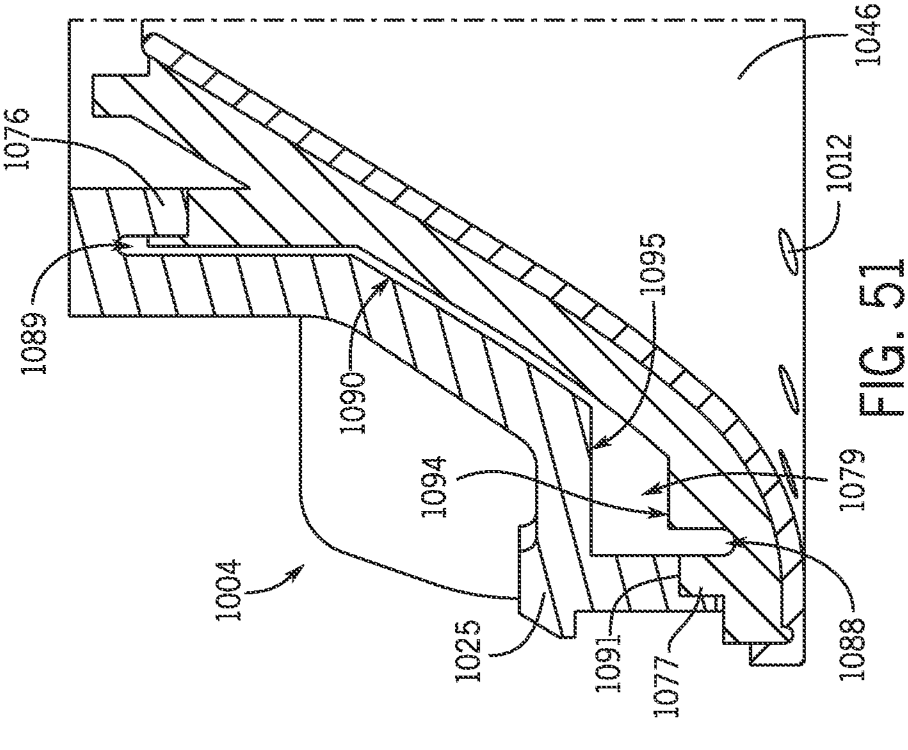
FIG. 51 is a side cross-sectional view of a waterway portion of the hand shower of FIG.

As shown in FIG. 50, during operation, water passing from the inlet passage 1080 through the orifice 1082 causes a reduction in pressure (e.g., below ambient pressure) in the outlet passage 1084 immediately downstream of the orifice 1082. The reduction in pressure draws air 1200 through the cross-hole opening 1085 and into the outlet passage 1084, where it mixes with the water 1202 to form an air-water mixture 1204. The air-water mixture 1204 passes through the outlet passage 1084 and into a fluid plenum 1087 (e.g., chamber, volume, etc.), which delivers the air-water mixture 1204 into the fluid passage 1079, where the air-water mixture 1204 is distributed to the nozzles 1012 in the sprayface 1046. The fluid plenum 1087 provides a mixing space for the air 1200 to more fully mix with the water 1202. As shown in FIGS. 50-51, the fluid plenum 1087 is aligned with a depression 1097 in the upper surface of the sprayface 1046 to promote flow uniformity throughout the fluid passage 1079 and reduce pressure drop through the spray head 1004. Among other benefits, incorporating the venturi into the connector 1025 increases reliability and reduces manufacturing complexity as compared to a multi-component venturi assembly that includes a separate air induction element (e.g., a multi-component venturi assembly that requires precise alignment of a separate air inlet tube and the flow path axis through the venturi, as described with reference to FIGS. 35-39).

Figure 52:
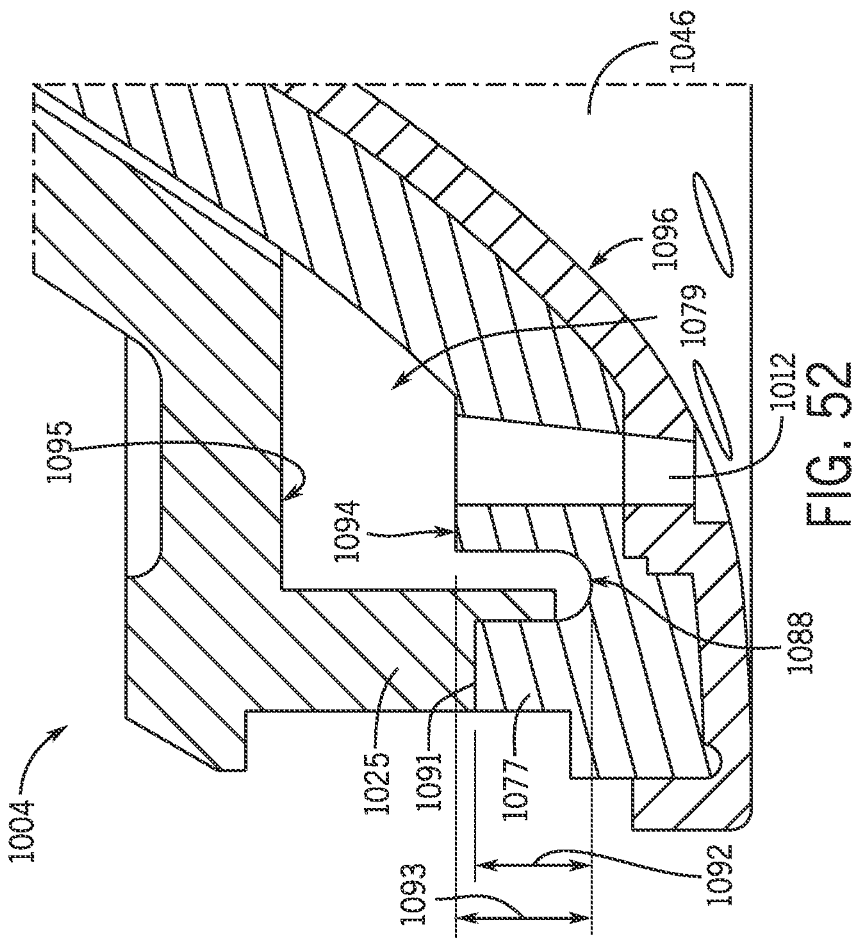
FIG. 52 is a side cross-sectional view of a nozzle portion of the hand shower of FIG. 45.

The spray head 1004 is also designed to reduce flow noise and improve overall aim consistency of the air-water mixture leaving the sprayface 1046. As shown in FIGS. 51-52, the sprayface 1046 and the connector 1025 form traps, shown as lower trap 1088 and upper trap 1089, on opposite ends of the fluid passage 1079, proximate to the lower weld joint 1077 and the upper weld joint 1076, respectively (e.g., inboard of the weld joints, at a lower end and an upper end of the fluid passage 1079, etc.). The lower trap 1088 and the upper trap 1089 are structured to receive weld flash produced during the welding operation between the connector 1025 and the sprayface 1046 and to substantially prevent weld flash from interfering with nozzle operation and/or fluid flow throughout the fluid passage 1079. The lower trap 1088 is a “U” shaped channel (e.g., groove, recessed area, etc.) formed into an upper surface of the sprayface 1046, outboard of the nozzle 1012. As shown in FIG. 52, the lower trap 1088 is spaced apart from the nozzle 1012 and is contiguous with a seam of the lower weld joint 1077, such that any excessive weld flash produced by the lower weld joint 1077 is directed into the lower trap 1088. According to an exemplary embodiment, the lower trap 1088 is sized to substantially accommodate all of the weld flash produced during the welding operation, such that the lower trap 1088 is substantially closed off to fluid flow after the welding operation.

Additionally, the weld plane 1091 (e.g., upper surface of the sprayface 1046 outboard of the lower trap 1088) is positioned to reduce the amount of weld flash that is generated during assembly of the connector 1025 to the sprayface 1046. In particular, a height 1092 of the weld plane 1091, in a direction that is substantially parallel to the central axis 1081 of the spray head 1004 (see FIG. 48) is less than a height 1093 of a nozzle entrance plane 1094 (e.g., an upper surface of the sprayface 1046 that defines an entrance to the nozzles 1012). As shown in FIG. 52, the nozzle entrance plane 1094 is arranged in a substantially perpendicular orientation relative to the central axis 1081 (see FIG. 48) of the spray head 1004 (e.g., the nozzle entrance plane 1094 is substantially planar), which, advantageously, improves aim consistency of water delivery through the nozzles 1012 as compared to a nozzle entrance plane that is oriented at an oblique angle relative to the central axis 1081 of the spray head 1004.

As shown in FIG. 51, the upper trap 1089 is formed into a lower surface of the connector 1025. The upper trap 1089 is contiguous with a seam of the upper weld joint 1076, such that any excessive weld flash produced by the upper weld joint 1076 is directed into the upper trap 1089. According to an exemplary embodiment, the upper trap 1089 is sized to substantially accommodate all of the weld flash produced during the welding operation, such that the upper trap 1089 is substantially closed off to fluid flow after the welding operation. The upper trap 1089 is at least partially isolated from the nozzle 1012 by a narrow channel 1090 that extends between the nozzle 1012 and the upper trap 1089. According to an exemplary embodiment, the connector 1025 is matingly engaged with the sprayface 1046 along the narrow channel 1090 such that the connector 1025 contacts the sprayface 1046 along facing surfaces of the narrow channel 1090. In the embodiment of FIG. 51, the width between surfaces of the connector 1025 and the sprayface 1046 within the narrow channel 1090 is limited by the welding operation between the connector 1025 and the sprayface 1046. In some embodiments, the width of the narrow channel 1090 is less than or equal to approximately 0.01 inches.

The fluid passage 1079 forms a waterway through the spray head 1004 and distributes water to the plurality of nozzles 1012. As shown in FIGS. 51-52, a cross-sectional area of the fluid passage 1079 normal to the flow direction through the fluid passage 1079 (e.g., a flow area, etc.) is reduced relative to the internal flow path through the spray head 601 that was described with reference to FIGS. 31-32. In particular, the fluid passage 1079 is substantially limited to a volume at the lower end of the fluid passage 1079, in a space between the nozzle entrance plane 1094 and a lower planar surface 1095 of the connector 1025. Among other benefits, reducing the cross-sectional area of the fluid passage 1079 to the region just above the nozzle entrance plane 1094 eliminates air gaps in the flow and increases the velocity of water flowing through the fluid passage 1079. The reduction in the volume of the fluid passage 1079 substantially prevents separation of the air-water mixture and the associated noise (e.g., squeaking, air noise, etc.).

As shown in FIG. 52, each nozzle 1012 is a flow passage that extends from the nozzle entrance plane 1094 to a lower surface 1096 of the sprayface 1046. An inner diameter of the flow passage decreases gradually from the nozzle entrance plane 1094 to the lower surface 1096, to a cylindrically-shaped recessed area (e.g., depression, slot, etc.) in the lower surface 1096. A length of the nozzles 1012 in a direction substantially parallel to the central axis 1081 (e.g., in a flow direction) of the spray head 1004 is greater than a length of the nozzles of the spray head 601 of FIGS. 31-32. The increased length of the nozzles 1012 improves nozzle aim and facilitates a more uniform flow distribution throughout the fluid passage 1079.

Figure 53:
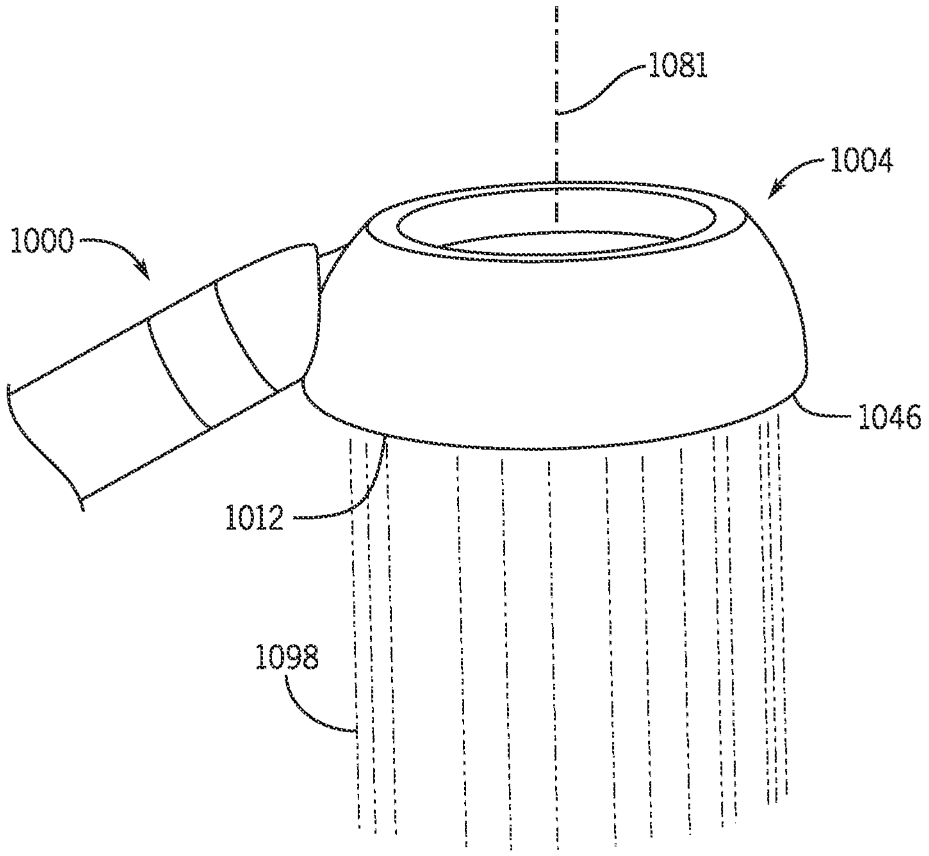
FIG. 53 is a top perspective view of the hand shower of FIG. 45 in operation.
Figure 54:
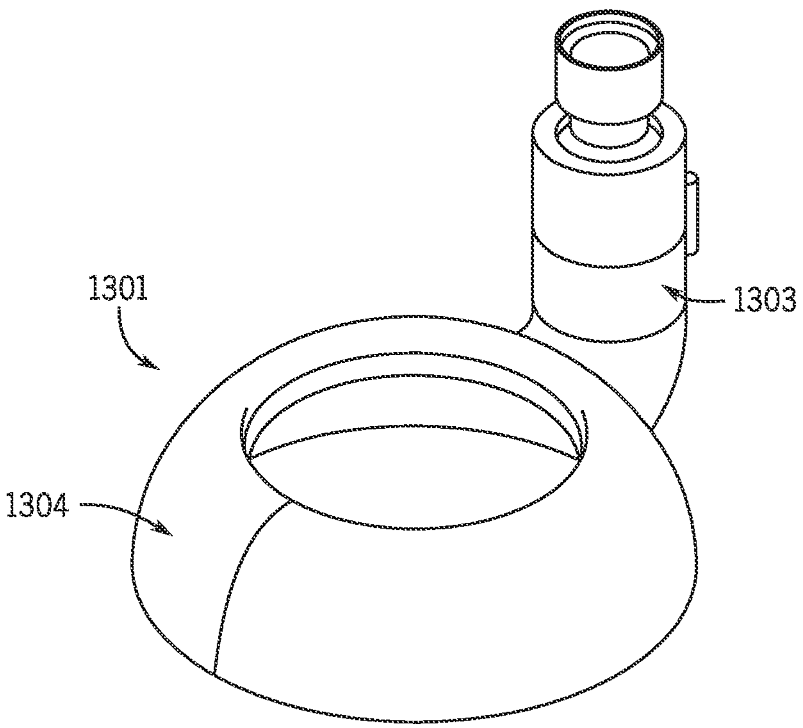
FIG. 54 is top perspective view of another embodiment of a showerhead.
Figure 55:
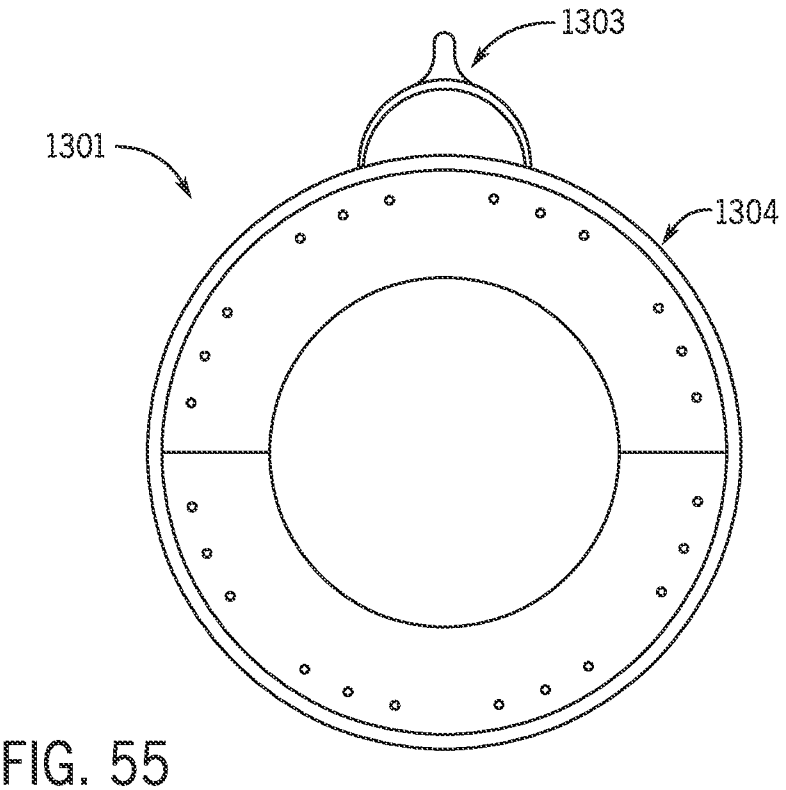
FIG. 55 is a bottom perspective view of the showerhead of FIG. 54.

FIG. 53 shows the distribution of flow leaving through the nozzles 1012 (see FIG. 52) of the hand shower 1000. Each water jet 1098 leaving the sprayface 1046 is oriented substantially parallel to the central axis 1081 of the spray head 1004. The flow rate of water through each of the nozzles 1012 is substantially equal. The plurality of nozzles 1012 together produces a-spray pattern of two concentric circles. In other embodiments, the shape of the spray head and the spray pattern produced by the spray head may be different.

Figure 56:
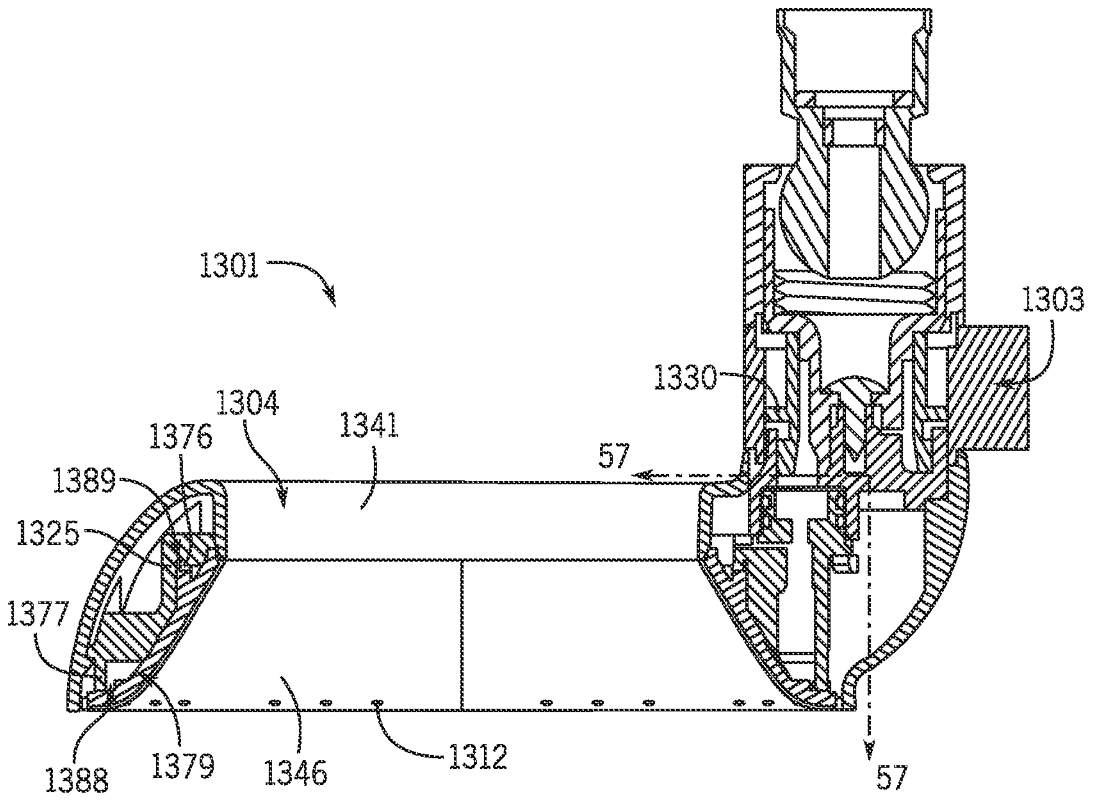
FIG. 56 is a side cross-sectional view of the showerhead of FIG. 54.

FIGS. 54-59 show an embodiment of a showerhead 1301 including a spray head 1304 that is similar to the spray head 1004 of FIGS. 45-53. As shown in FIG. 56, the showerhead 1301 includes a valve 1303 that includes a rotatable valve body 1330. The valve 1303 is disposed between the spray head 1304 and an inlet connection assembly, which pivotally secures the valve 1303 and spray head 1304 to an inlet waterway.

Figure 57:
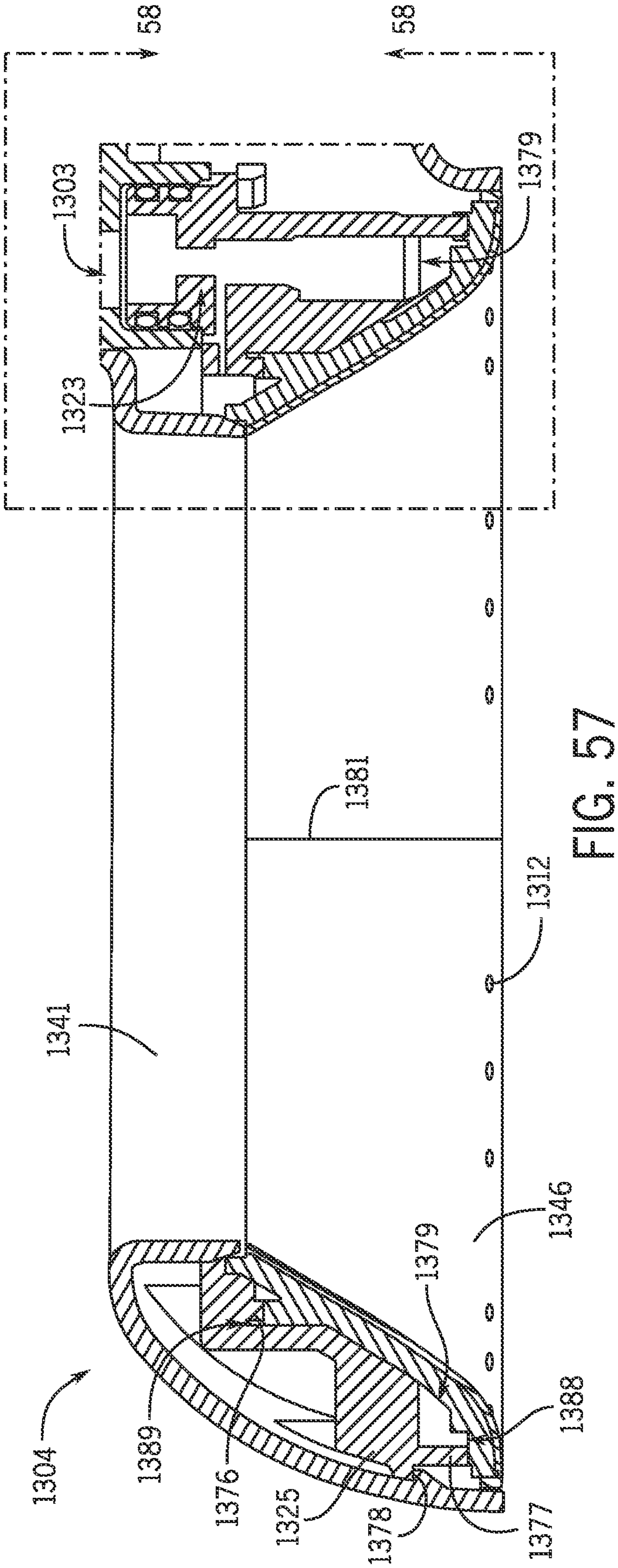
FIG. 57 is a side cross-sectional view of a spray head portion of the showerhead of FIG. 54.

FIGS. 56-57 show cross-sectional views through the spray head 1304. Similar to the spray head 1004 of FIGS. 45-53, the spray head 1304 of FIGS. 56-57 includes a head 1341 (e.g., body, rear body, etc.) and a sprayface 1346 mounted to the head 1341. The spray head 1304 also includes a connector 1325 that is "sandwiched" or otherwise disposed between the head 1041 and the sprayface 1046. As shown in FIGS. 56-57, the connector 1325 is welded (e.g., friction welded, spin welded, etc.) to the sprayface 1046 in at least two locations, forming an upper weld joint 1376 that extends in a circumferential direction along a perimeter of the sprayface 1346 near an upper end of the sprayface 1346; and a lower weld joint 1377 that extends in a circumferential direction along a perimeter of the sprayface 1346 near a lower end of the sprayface 1346. The head 1341 is engaged with the sprayface 1346 at both an inner perimeter edge and an outer perimeter edge of the sprayface 1346 by means of snap fits via connector 1325. A chamfered perimeter ledge of connector 1325 engages with one or more tangs 1378 (e.g., tab, latch, etc.) extending from an inside perimeter of the head 1341.

Similar to the spray head 1004 described with reference to FIGS. 45-53, the sprayface 1346 and the connector 1325 of the spray head 1304 of FIGS. 56-57 together form traps, shown as lower trap 1388 at a lower end of the fluid passage 1379, and an upper trap 1389 at an upper end of the fluid passage 1379. The lower trap 1388 and the upper trap 1389 are sized and positioned to receive weld flash produced during the welding operation between the connector 1325 and the sprayface 1346 and to substantially prevent weld flash from interfering with nozzles 1312 and/or fluid flow throughout the fluid passage 1379 between the connector 1325 and the sprayface 1346.

As shown in FIGS. 56-57, the sprayface 1346 and the connector 1325 together form a ring-shaped fluid passage 1379 that extends in a circumferential direction within the spray head 1304. The connector 1325 is structured to (i) receive water from the valve 1303, (ii) introduce and mix a flow of ambient air into the water entering the fluid passage 1379, and (iii) direct the air-water mixture through the fluid passage 1379 and into nozzles 1312 in the sprayface 1346. As shown in FIG. 57, the connector 1325 includes a venturi, shown as air induction element 1323 that is integrally formed with the connector 1325 as a single unitary body. The air induction element 1323 extends upwardly from the connector 1325, from an intermediate position between an inner perimeter and an outer perimeter of the connector 1325. The air induction element 1323 defines fluid passages that extend upwardly from the sprayface 1346 in a substantially parallel orientation relative to a central axis 1381 of the spray head 1304.

Figure 58:
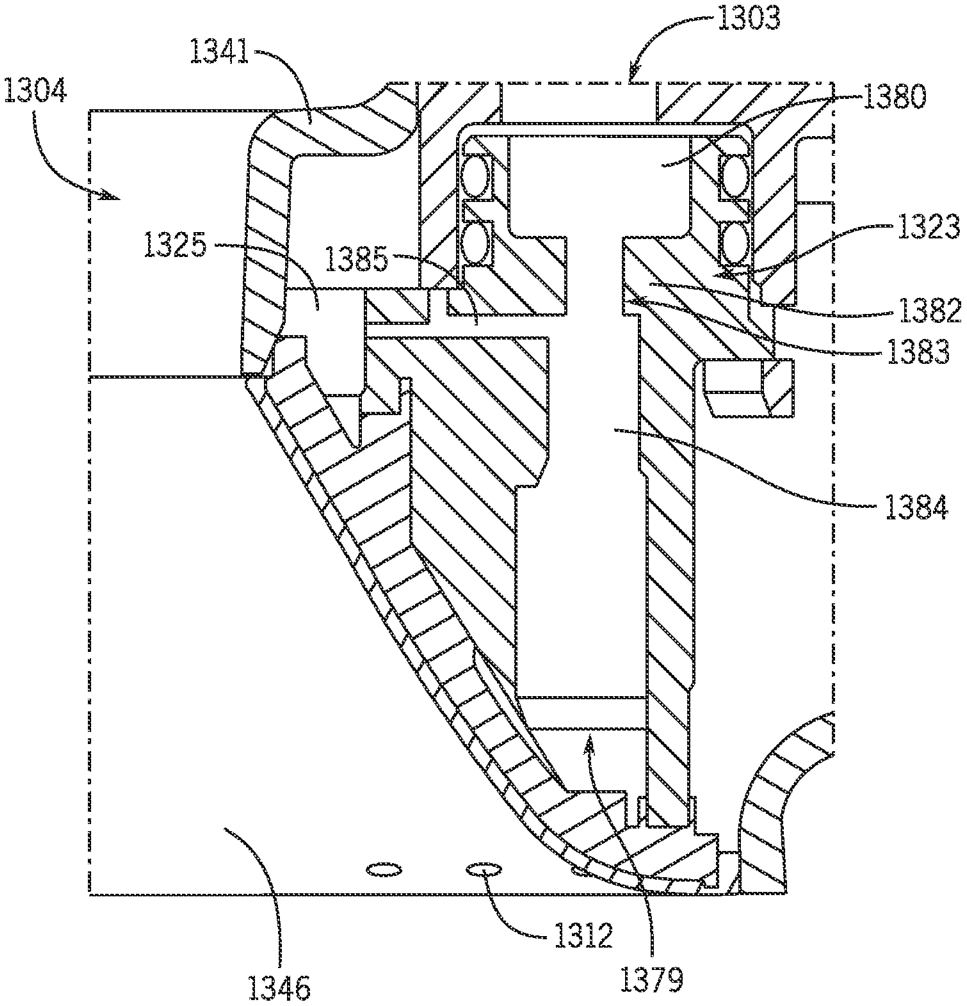
FIG. 58 is a side cross-sectional view of a venturi portion of the showerhead of FIG. 54.

The air induction element 1323 fluidly connects the connector 1325 to an outlet of the valve 1303 and routes water from the valve 1303 into the fluid passage 1379. As shown in FIG. 58, the air induction element 1323 defines a cylindrically-shaped inlet passage 1380 that extends between an inlet of the air induction element 1323 and an orifice 1382 (e.g., a restriction downstream of the inlet passage 1380). In the exemplary embodiment of FIG. 58, the orifice 1382 is a wall defining a circular opening 1383 that has an inner diameter that is less than an inner diameter of the inlet passage 1380. A central axis of the circular opening 1383 is offset from a central axis of the inlet passage 1380, although the circular opening 1383 and the inlet passage 1380 may be substantially coaxial in other exemplary embodiments.

As shown in FIG. 58, the air induction element 1323 includes a cross-hole opening 1385 that extends from an outlet passage 1384 of the air induction element 1323 through the connector 1325 in a substantially radial direction relative to a central axis 1386 (see also FIG. 57) of the outlet passage 1384 (e.g., in a substantially perpendicular orientation relative to the central axis 1381 of the spray head 1304). The cross-hole opening 1385 is disposed immediately downstream of the orifice 1382 and fluidly connects the outlet passage 1384 to an environment surrounding the spray head 1304. In particular, the cross-hole opening 1385 fluidly connects the outlet passage 1384 to a hollow space formed between the head 1341 and the connector 1325. In some embodiments, the cross-hole opening 1385 may branch off in multiple direction and/or to multiple regions of the hollow space.

Figure 59:
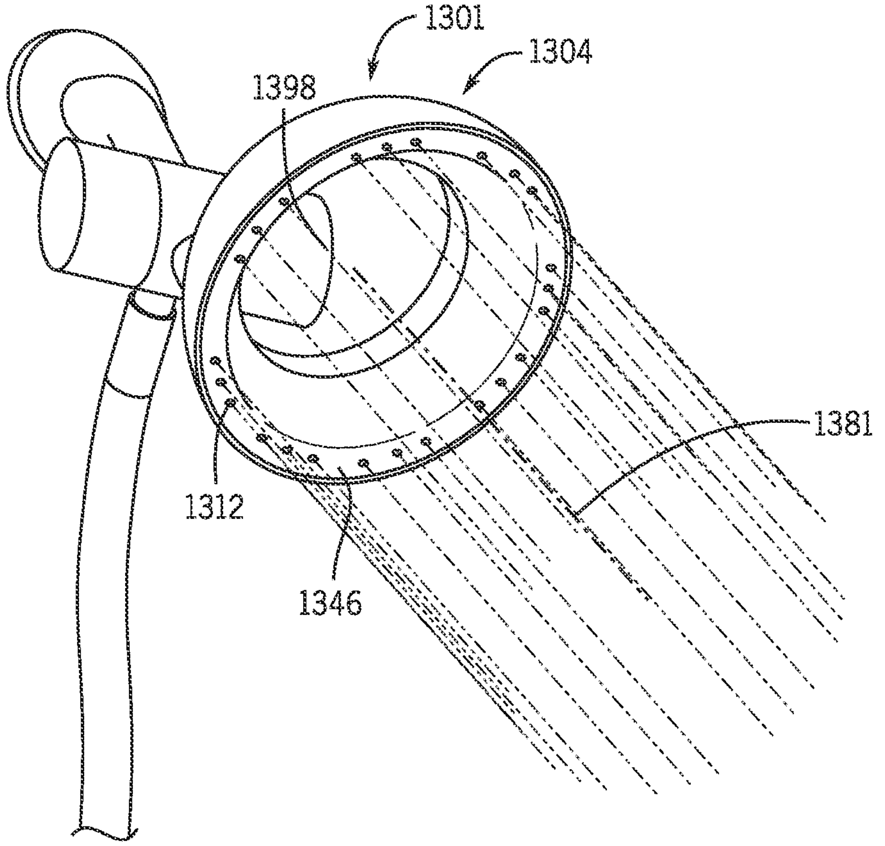
FIG. 59 is a bottom perspective view of the showerhead of FIG. 54 in operation.

The arrangement of nozzles 1312 within the sprayface 1346 may be the same as or similar to the arrangement of nozzles 1012 described with reference to the sprayface 1046 of FIG. 52. FIG. 59 shows the distribution of flow leaving through the nozzles 1312 of the showerhead 1301. Each water jet 1398 leaving the sprayface 1346 is oriented substantially parallel to the central axis 1381 of the spray head 1304. The flow rate of water through each of the nozzles 1312 is substantially equal. The plurality of nozzles 1312 together produces a spray pattern of two concentric circles. In other embodiments, the shape of the spray head and the spray pattern produced by the spray head may be different.

The hand showers (e.g., hand shower 600, 800, 1000) and showerheads (e.g., showerhead 701, 901, 1301) disclosed herein provide numerous advantages, some of which are as follows. A steel-core handle can be provided to allow for magnetic docking with a matching holder/arm (e.g., of a docking system). An internal valve can provide variable control of flow rate from a lower flow rate (e.g., ADA trickle mode (≤0.5 gallons per minute (gpm)) up to maximum regulated flow (e.g., 1.5 gallons per minute (gpm)). A high design life valve, e.g., with no physically touching surfaces required to meter flow, just rotating seals to prevent external leakage. The system design provides zero-backlash control of the valve. The pass-through design of valve assembly can be assembled with a single screw. A waterway cap contains a venturi to introduce air into the water stream to create a "Katalyst" spray, and/or the venturi inlet can include a duck-bill check valve to prevent leakage (if nozzles are blocked). In some embodiments, the venturi is integrally formed with another component of the spray head to increase reliability and reduce manufacturing complexity. In some embodiments, the spray head of the hand shower and/or showerhead includes weld traps to prevent weld flash that is produced during the manufacturing process from interfering with the flow of water through the spray head.

According to at least one embodiment of this application, a shower assembly is provided that includes a hand shower having an elongated handle body, a spray head, and a valve. The handle body has an inlet end, an outlet end, and an internal fluid passage extending from the inlet end to the outlet end. The spray head includes a base and a head, which mounts on the base and emits water. The valve controls a flow rate of water from the internal fluid passage to the spray head, and the valve includes a housing, a control member, and one or more disks. The housing has a first part, which couples to the outlet end of the handle body, a second part, which couples to the base of the spray head, and a through bore extending through the first and second parts. The control member has a collar that extends along a longitudinal axis, is disposed around an external portion of the housing, and is disposed between the base and the handle body. The control member includes an inner wall that extends radially inward from the collar to the through bore. The one or more disks may include a rotatable disk having a port and/or a stationary disk having a port. A rotation of the control member about the longitudinal axis relative to the housing provides a variable flow rate adjustment of water to the spray head by rotating the rotatable disk (and, thus, the port in the rotatable disk) through the inner wall relative to the port in the stationary disk. By changing the amount of overlap (e.g., overlapping area) between the ports of the rotatable and stationary disks, the flow rate is changed.

The valve can include a driving member located within the through bore; and the driving member can include an annular base having a bore for receiving the rotatable disk, a body extending from a side of the base, a male keyway extending radially outward from the body, wherein the male keyway operatively couples to a female keyway defined by the inner wall of the control member, such that the driving member rotates with the control member through the keyways, and/or a fluid passage extending through the body and the base of the driving member. A rib can be disposed on one of the base of the driving member or the rotatable disk. A notch can be disposed in the other of the base and the rotatable disk, and the notch can receive the rib such that the rotatable disk rotates with the driving member.

The valve can include a valve cap that is disposed in the through bore of the housing and couples to the first part of the housing to retain the rotatable disk and the stationary disk between the driving member and the valve cap. A tab can be disposed on one of the valve cap or the first part of the housing. A recess can be disposed in the other of the valve cap and the first part of the housing, and the tab can engage the recess to prevent relative rotation between the valve cap and the first part of the housing. The valve cap can include an internal bore that fluidly connects to the internal fluid channel of the handle body. A rotational position of the rotatable disk relative to the stationary disk controls the flow rate of water through the fluid passage in the driving member and to the spray head.

The inner wall of the control member can include a slotted hole that receives an annular projection of the first part of the housing. Each end of the slotted hole can act as a travel stop to the annular projection to control a range of motion of the control member relative to the housing. The valve can include a detent assembly comprising a detent, which is received in a detent bore in the housing, and a spring that biases the detent toward the inner wall of the control member. The inner wall can include an indentation that receives the detent in a predetermined position of the valve.

The shower assembly can include a fixed part having a water inlet, a water outlet fluidly connected to the water inlet, and a holder; and/or a flexible hose having a first end, which is fluidly connected to the water outlet, and a second end, which is fluidly connected to the inlet end of the handle body. The hand shower can moveably couple to the fixed part through the flexible hose and the handle body slideably docks to the holder.

The handle body can include a waterway having the internal fluid channel; and a cylindrical layer surrounding the waterway. The handle body can slide within the holder between a first position and a second position. The handle body is retainable in the first position, the second position, or any position between the first and second positions by a coupling, such as a magnetic coupling. The magnetic coupling can include a magnetic element disposed in the holder that magnetically attracts the ferromagnetic layer of the handle body. The ferromagnetic layer disposed of in the handle body may be cylindrical in shape, comprised of one or more pieces of ferromagnetic material, or a single component, whose shape forms a substantially enclosed form (e.g., a cylinder/pipe, C-shape, U-shape).

According to at least one embodiment of this application, a showerhead is provided that includes an inlet assembly, a spray head, and a valve. The inlet assembly receives water, such as from a source. The spray head includes a base and a head, which mounts on the base and emits water. The valve controls a variable flow rate of water from the inlet assembly to the spray head, and the valve includes a housing, a control member, and at least one disk. The housing has a first part coupled to the inlet assembly, a second part coupled to the base of the spray head, and a through bore extending through the first and second parts. The control member has a collar, which extends along a longitudinal axis and is disposed around at least a portion of an outside of the housing. The control member includes an inner wall that extends radially inward from the collar to the through bore. The at least one disk can include a rotatable disk having a port and a stationary disk having a port. Rotation of the control member about the longitudinal axis relative to the housing provides a variable flow rate adjustment of water to the spray head by rotating the rotatable disk and the port of the rotatable disk through the inner wall relative to the stationary disk and the port of the stationary disk.

The second part can be separate from the first part, such as where the first and second parts couple together by a fastener.

The inner wall of the control member can extend sandwiched between an end of the first part and an end of the second part. An annular projection can extend from the end of one of the first and second parts to contact the end of the other of the first and second parts. The annular projection can extend through a slotted hole in the inner wall of the control member, and the slotted hole can act as a travel stop to the annular projection to control a range of motion of the control member relative to the housing.

The valve can include a valve cap that is disposed in the through bore of the housing and retains the rotatable disk and the stationary disk in the through bore. The valve can include a driving member located within the through bore of the housing. The driving member can include a base located in the through bore and having a bore for receiving the rotatable disk; a body extending from a side of the base; a male keyway extending radially outward from the body, wherein the male keyway operatively couples to a female keyway defined by the inner wall of the control member, such that the driving member rotates with the control member through the keyways; and a fluid passage extending through the body and the base. The fluid passage can fluidly connect to an inner body of the head. The rotatable disk and the stationary disk can sandwich between the base of the driving member and the valve cap. The valve cap can include an internal bore that receives the stationary disk and fluidly connects to the inlet assembly. Thus, a relative rotational position of the rotatable disk to the stationary disk controls the flow rate of water from the internal bore in the valve cap to the fluid passage in the driving member and to the spray head through the inner body of the head.

The inlet assembly can include a bracket having an outer wall, which couples to the first part of the housing, and an inner wall extending radially inward from an end of the outer wall. The inlet assembly can include a ball joint having a spherical element, a connector configured to couple to a water pipe, and a fluid passage extending through the spherical element and the connector. The spherical element can be retained between the inner wall and the first part.

The collar is locatable between an inlet end of the base of the spray head and the bracket of the inlet assembly. An outer diameter of the collar is substantially the same as an outer diameter of each of the inlet end of the base and the outer wall of the bracket. The control member can include a lever extending radially outward from the outer diameter of the collar to facilitate rotation of the control member relative to the housing by moving the lever rotationally.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. All such variations are within the scope of the disclosure.

It is important to note that the construction and arrangement of the shower assemblies (e.g., showerheads, hand showers, etc.) and the components/elements, as shown in the various exemplary embodiments, are illustrative only. Additionally, any element disclosed in one embodiment may be incorporated or utilized with any other embodiment disclosed herein. For example, each valve, valve component, holder, etc. described herein may be incorporated into any other embodiment of this application. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A shower device, comprising:

a waterway extending in a longitudinal direction;

a spray head fluidly coupled to the waterway and configured to emit water; and a valve comprising a control member, the control member having a collar that is disposed around at least a portion of the waterway, the collar configured to rotate relative to the waterway between a first position and a second position, the valve configured to allow adjustment of a water flow rate through the spray head to any flow rate between a first flow rate at the first position and a second flow rate at the second position.

2. The shower device of claim 1, wherein the waterway includes a port extending radially therethrough relative to the longitudinal direction.

3. The shower device of claim 1, wherein the valve further includes a plurality of projections extending radially inward from the collar, the plurality of projections defining at least one fluid path between the collar and the waterway.

4. The shower device of claim 3, wherein the valve comprises a seal located between the collar and the waterway radially and located between a first projection and a second projection of the plurality of projections angularly, wherein the seal rotates with the control member, and wherein the seal covers a port extending from the waterway in a closed position of the valve.

5. The shower device of claim 1, wherein the waterway is at least partially defined by an inlet assembly configured to receive water, the collar disposed between the inlet assembly and the spray head and coupled to the inlet assembly and the spray head.

6. The shower device of claim 1, wherein the valve is configured to allow continuous adjustment of the water flow rate between the first flow rate the second flow rate.

7. The shower device of claim 1, wherein the waterway is part of a handle of a hand shower, further comprising:

an intermediate layer surrounding at least a portion of the waterway and comprising a first material; and an outer layer surrounding at least a portion of the intermediate layer and comprising a second material.

8. The shower device of claim 7, wherein the first material of the intermediate layer comprises a ferromagnetic material configured to magnetically couple the handle to a docking element, and the second material of the outer layer comprises a non-magnetic material that forms a grip of the hand shower.

9. The shower device of claim 1, wherein the spray head comprises a base and a head that mounts on the base, the base comprising:

an outer body extending between the head and the control member; and an inner body disposed within the outer body and fluidly connecting the waterway to the spray head, wherein one of the inner body and the outer body couples to the valve.

10. The shower device of claim 9, further comprising an inlet assembly comprising an inlet member configured to couple to an inlet pipe to receive the water therefrom, the inlet member having a fluid passage that is in fluid communication with the waterway.

11. The shower device of claim 10, wherein the inlet member is a ball joint having a spherical element and a cylindrical connector, a center of the spray head being radially offset from the ball joint so that rotation of the spray head about the ball joint changes a height of the spray head.

12. A shower device, comprising:

a waterway extending in a longitudinal direction;

a spray head configured to emit water; and a valve comprising:

a valve body surrounding at least a portion of the waterway, the valve body and the waterway together defining a fluid path therebetween in fluid communication with the spray head; and a seal between the valve body and the waterway, the valve body configured to rotate the seal relative to the waterway to selectively fluidly couple the waterway with the spray head.

13. The shower device of claim 12, further comprising a fastener coupling the waterway to an inner body of the spray head, wherein at least part of the fastener is disposed within the waterway.

14. The shower device of claim 12, wherein the valve body rotates about the longitudinal direction between a first position and a second position, and wherein the valve is configured to allow adjustment of a water flow rate to the spray head to any flow rate between a first flow rate at the first position and a second flow rate at the second position.

15. The shower device of claim 12, wherein the waterway is at least partially defined by an inlet assembly configured to receive water, the valve body disposed between the inlet assembly and the spray head and coupled to the inlet assembly and the spray head.

16. The shower device of claim 15, further comprising a ball joint having a spherical element and a cylindrical connector, the ball joint defining a fluid passage that is in fluid communication with the waterway, a center of the spray head being radially offset from the ball joint so that rotation of the spray head about the ball joint changes a height of the spray head.

17. A shower device, comprising:

an inlet assembly configured to receive water;

a spray head configured to emit water; and a valve comprising a control member and a plurality of disks, the control member configured to rotate a disk of the plurality of disks about a longitudinal axis relative to the inlet assembly to provide variable adjustment of a water flow rate to the spray head.

18. The shower device of claim 17, wherein the valve further comprises a housing having a first part coupled to the inlet assembly and a second part coupled to the spray head.

19. The shower device of claim 18, wherein the control member includes a collar, which extends along the longitudinal axis and is disposed around at least a portion of an outside of the housing.

20. The shower device of claim 17, wherein the valve further comprises a driving member comprising:

an annular base defining a fluid passage extending therethrough for receiving a rotatable disk of the plurality of disks; and a male keyway extending radially away from the annular base, the male keyway operatively coupled to a female keyway defined by the control member, such that the driving member rotates with the control member through the male keyway and the female keyway.

* * * * *